(12) United States Patent
Lee et al.

(10) Patent No.: US 7,062,418 B2
(45) Date of Patent: Jun. 13, 2006

(54) COMPUTER AIDED DESIGN METHOD AND SYSTEM FOR DEVELOPING A MICROFLUIDIC SYSTEM

(75) Inventors: Michael Lee, Lake Oswego, OR (US); Gajus Worthington, Portola Valley, CA (US)

(73) Assignee: Fluidigm Corporation, South San Francisco, CA (US)

( * ) Notice: Subject to any disclaimer, the term of this patent is extended or adjusted under 35 U.S.C. 154(b) by 923 days.

(21) Appl. No.: 09/894,862

(22) Filed: Jun. 27, 2001

(65) Prior Publication Data

US 2002/0183996 A1 Dec. 5, 2002

Related U.S. Application Data

(60) Provisional application No. 60/214,595, filed on Jun. 27, 2000.

(51) Int. Cl.
*G06F 17/50* (2006.01)
*G06F 9/45* (2006.01)

(52) U.S. Cl. ............... 703/2; 703/7; 716/5; 716/11
(58) Field of Classification Search ............. 703/2, 703/13, 7, 9; 716/5, 11; 435/5, 6; 422/68.1, 422/98, 100, 96; 204/450; 707/102
See application file for complete search history.

(56) References Cited

U.S. PATENT DOCUMENTS

| | | | |
|---|---|---|---|
| 4,797,842 A | 1/1989 | Nackman et al. | |
| 4,965,743 A | 10/1990 | Malin et al. | |
| 5,487,003 A | 1/1996 | Iwasawa et al. | |
| 5,574,893 A | 11/1996 | Southgate et al. | |
| 5,812,394 A | 9/1998 | Lewis et al. | |
| 5,867,399 A | 2/1999 | Rostoker et al. | |
| 6,048,498 A | 4/2000 | Kennedy | |
| 6,056,428 A | 5/2000 | Devoino et al. | |
| 6,149,870 A | 11/2000 | Parce et al. | |
| 6,182,020 B1 | 1/2001 | Fairbanks | |
| 6,235,175 B1 | 5/2001 | Dubrow et al. | |
| 6,274,337 B1 | 8/2001 | Parce et al. | |
| 6,500,323 B1 * | 12/2002 | Chow et al. | 204/450 |
| 6,569,382 B1 * | 5/2003 | Edman et al. | 422/68.1 |
| 6,637,463 B1 * | 10/2003 | Lei et al. | 137/803 |
| 6,829,753 B1 * | 12/2004 | Lee et al. | 716/5 |

(Continued)

OTHER PUBLICATIONS

Chou, Hou-Pu, et al., "Microfabricated Devices for Sizing DNA and Sorting Cells," *Micro- and Nanofabricated Structures and Devices for Biomedical Environmental Applications*, (1998) vol. 3258:pp 187-7.

(Continued)

*Primary Examiner*—Thai Phan
(74) *Attorney, Agent, or Firm*—Townsend & Townsend and Crew LLP

(57) ABSTRACT

The present invention generally relates to design automation techniques and more particularly to the design of customized microfluidic systems using a microfluidic computer aided design system. In one embodiment of the present invention the system includes a synthesis module for synthesizing software of a design into a component level description of the design. The design has a plurality of microfluidic components, and the component level description has symbols associated with the plurality of microfluidic components. The system further includes a design capture module, including a schematic entry tool, for placing and connecting the symbols on a schematic according to the design; and a functional analysis module for functionally simulating selected symbols of the schematic.

57 Claims, 23 Drawing Sheets

U.S. PATENT DOCUMENTS

| | | | |
|---|---|---|---|
| 6,885,982 B1* | 4/2005 | Harris et al. | 703/9 |
| 2002/0037499 A1* | 3/2002 | Quake et al. | 435/5 |
| 2002/0108097 A1* | 8/2002 | Harris et al. | 716/11 |
| 2002/0197603 A1* | 12/2002 | Chow et al. | 435/6 |
| 2004/0096960 A1* | 5/2004 | Mehta et al. | 435/287.2 |

OTHER PUBLICATIONS

Chou, Hou-Pu, et al. "Disposable Microdevices for DNA Analysis and Cell Sorting," *Proc. Solid-State Sensor and Actuator Workshop*, (Jun. 1998) pp:11-14.

Chou, Hou-Pu, et al., "A Microfabricated Device for Sizing and Sorting DNA Molecules," *Proc. Natl. Acad. Sci. USA*, (Jan. 1999) vol. 96:pp 11-13.

Chou, Hou-Pu, et al., "Integrated Elastomer Fluidic Lab-on-a-Chip-Surface Patterning and DNA Diagnostics," *Departments of Electrical Engineering and Applied Physics*, Caltech, Pasadena, California 91125, USA.

Fu, Anne Y., et al., "A Microfabricated Fluorescence-Activated Cell Sorter," *Nature Biotechnology*, (Nov. 1999) vol. 17:pp 1109-1111.

Quake, Stephen R., et al., "From Micro- to Nanofabrication with Soft Materials," *Science* (Nov. 2000) vol. 290:pp 1536-1540.

Thorsen, Todd, et al., "Dynamic Pattern Formation in a Vesicle-Generating Microfluidic Device," *Physical Letters Review* (Apr. 2001) vol. 86. No. (18):pp 4163-4166.

Unger, Marc A., et al., "Monolithic Microfabricated valves and Pumps by Multilayer Soft Lithography," *Science* (Apr. 2000) vol. 288:pp 113-116.

Weigl, Bernhard H., "Microfluidics-Based Lab-on-a-Chip Systems," www.devicelink.cm/archive/00/11/008.h.

* cited by examiner

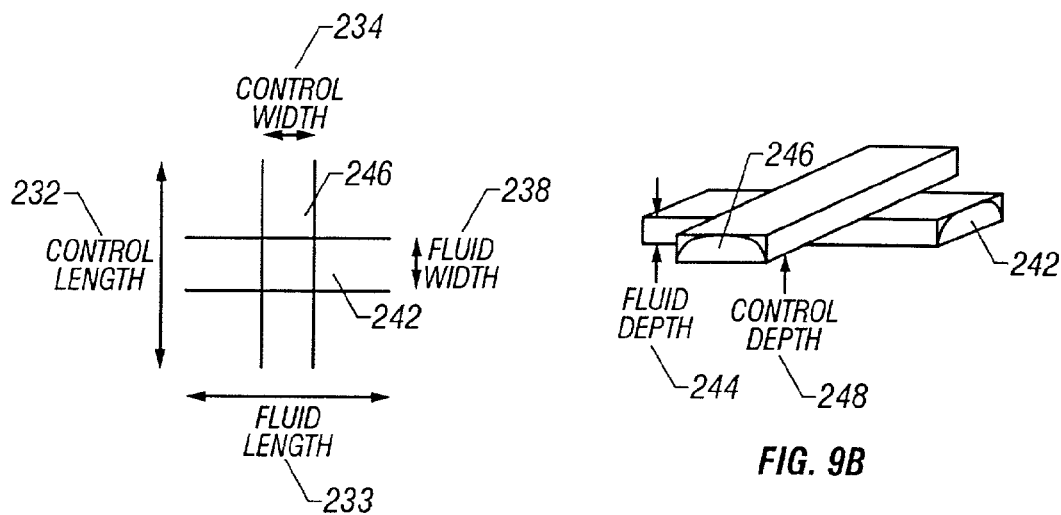
FIG. 9A
FIG. 9B
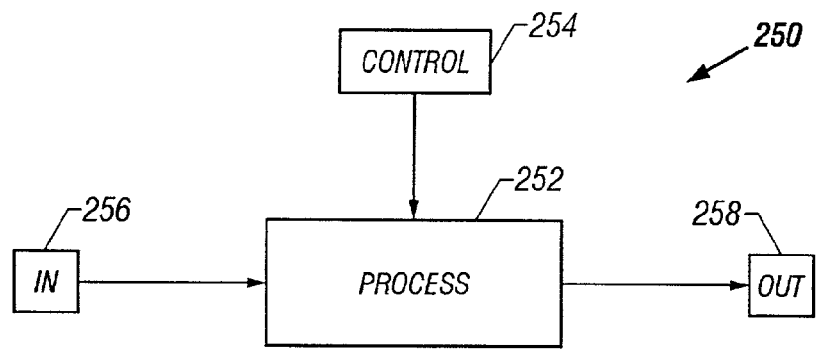
FIG. 10
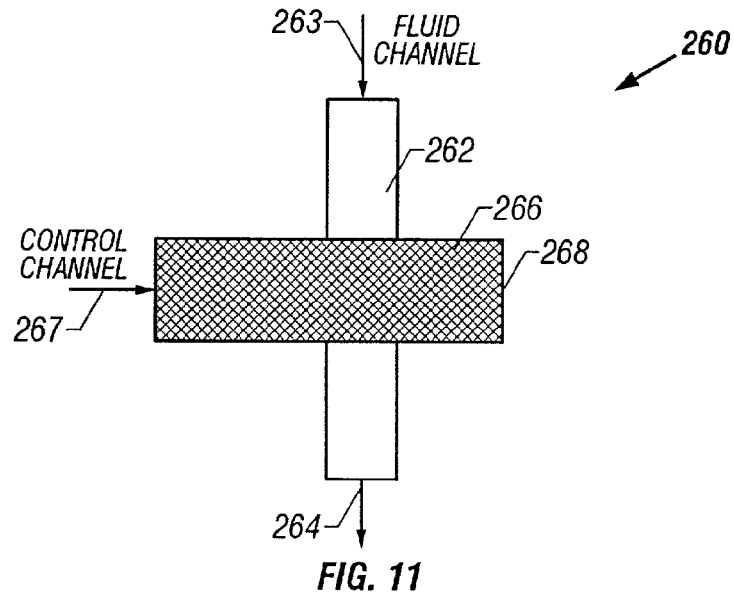
FIG. 11 a b c d e f

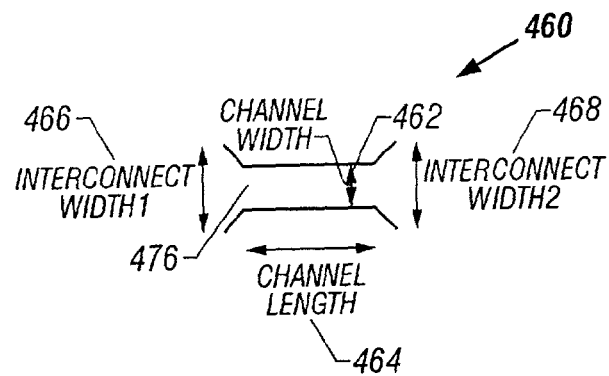
FIG. 17A
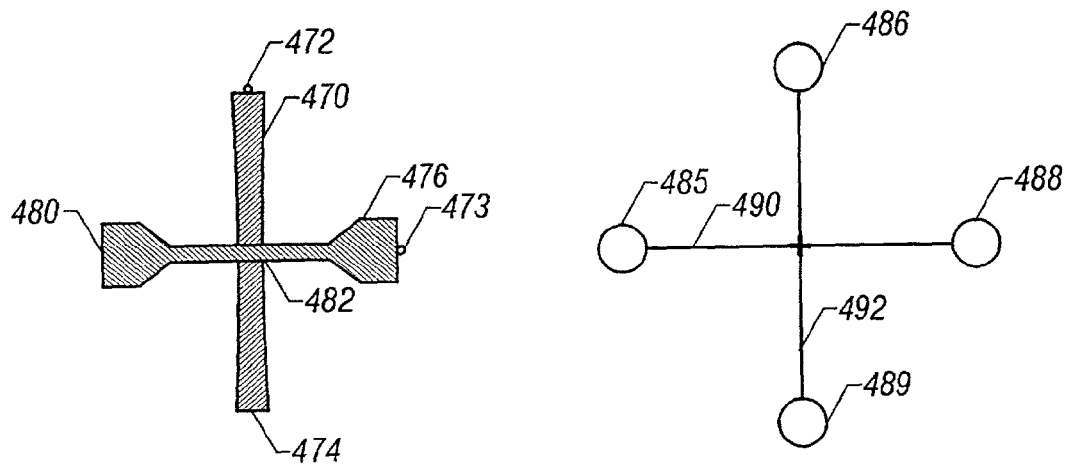
FIG. 17B
FIG. 18A
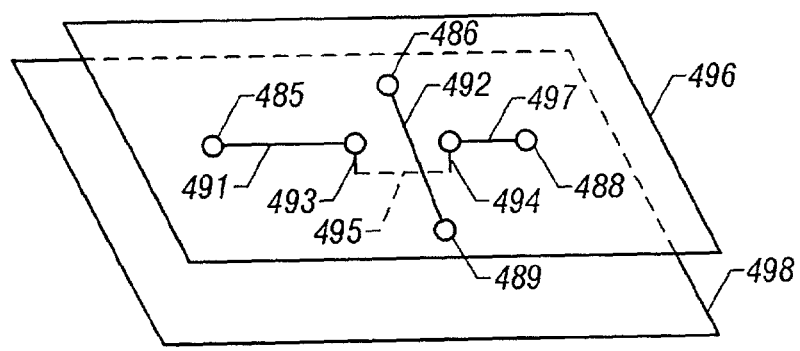
FIG. 18B

COMPUTER AIDED DESIGN METHOD AND SYSTEM FOR DEVELOPING A MICROFLUIDIC SYSTEM

CROSS-REFERENCES TO RELATED APPLICATIONS

This application claims priority from and incorporates by reference in its entirety U.S. Provisional Patent Application No. 60/214,595, titled "Biological Design Automation System," by Michael Lee, et. al., filed Jun. 27, 2000.

The following concurrently filed, commonly owned, patent applications are incorporated herein by reference in their entirety:

U.S. patent application Ser. No. 09/894,857, entitled "A Microfluidic Design Automation Method And System," by Michael Lee, et. at., now U.S. Pat. No. 6,829,753.

U.S. patent application Ser. No. 09/894,858, entitled "An Object Oriented Microfluidic Design Method And System," by Gregory Harris, et. al., now U.S. Pat. No. 6,885,982.

The following references are incorporated herein by reference each in its entirety:

PCT Patent Application No. PCT/US00/17740, entitled "Microfabricated Elastomeric Valve and Pump Systems," filed Jun. 27, 2000 (U.S. patent application Ser. No. 09/605, 520);

PCT Patent Application No. PCT/US99/13050, entitled "Microfabricated Sorter for Biological and Chemical Materials" filed May 21, 1999; and U.S. Provisional Patent Application No. 60/282,253, entitled "Microfabricated Fluidic Circuit Elements and Applications," filed Apr. 6, 2001.

BACKGROUND OF THE INVENTION

The present invention generally relates to microfluidics and more particularly to the design of customized microfluidic systems using a microfluidic computer aided design system. Such customized microfluidic systems may be used, for example, for fluid analysis of biological samples.

Typically microfluidic systems for processing fluid samples employ a series of chambers each configured for subjecting the fluid sample to a specific processing step. As the fluid sample flows through the system sequentially from chamber to chamber, the fluid sample undergoes the processing steps according to a specific protocol. Because different protocols require different configurations, the design and manufacturing of such microfluidic systems can be time-consuming and costly.

Conventional computer aided design tools such as AutoCAD® are inadequate for the design and layout of microfluidic systems. For instance, AutoCAD® is a general tool, and has no drawing constraints and provides no specific microfluidic design information associated with a component.

Thus there is a need for computerized design techniques which allow the quick and easy formation of microfluidic systems with different configurations and utilizing different protocols.

BRIEF SUMMARY OF THE INVENTION

The present invention provides for the design of a microfluidic system, including a microfluidic chip or circuit, using a microfluidic computer aided design (CAD) system. The microfluidic CAD system, henceforth referred to as the "MCAD" system, provides the user with the tools to design, analyze, and implement a customized microfluidic system using a plurality of building block microfluidic components. The MCAD system overcomes the disadvantages of conventional CAD tools by providing, for instance, drawing constraints, design information associated with components, I/O ports, and connectivity to I/O ports, as well as easy layout and manipulation of multilayered components.

In one embodiment the microfluidic system may include a network of single or multi-layer elastomeric structures. In an alternate embodiment some or all the structures may include rigid materials (e.g., silicon-based materials). In yet another embodiment some of the structures may include a mixture of flexible materials, (e.g., elastomeric materials) with the rigid material. Utilization of such an MCAD system can lead to quick and easy implementation of simple to highly complex networks for use in general microfluidic transfer control systems, biological diagnostics systems, etc.

In one embodiment of the present invention a microfluidic device or chip is created from a plurality of microfluidic components according to a design. First a template is selected. Next, the components are placed on the template, manually or automatically, using a placement tool. The components include multilayered components. The components are then routed, manually or automatically, using a routing tool based on preset design rule constraints to achieve a physical layout. Functional analysis (e.g., logical microfluidic flow simulation) and/or physical analysis, (e.g., dynamic microfluidic flow simulation) may then be performed on the physical layout. Following the optional functional analysis and/or physical analysis, the physical layout is used to create the chip layout file, which is later used for fabricating the microfluidic device or chip.

In one embodiment of the present invention a microfluidic circuit design system is provided. The system includes: a synthesis module for synthesizing software of a design into a component level description of the design. The design has a plurality of microfluidic components, and the component level description has symbols associated with the plurality of microfluidic components. The system further includes a design capture module, including a schematic entry tool, for placing and connecting the symbols on a schematic according to the design; and a functional analysis module for functionally simulating selected symbols of the schematic.

In another embodiment of the present invention a method, using a computer system, for designing a microfluidic circuit schematic including a plurality of microfluidic component symbols associated with a plurality of microfluidic components is provided. The method includes: placing a first component symbol of the plurality of microfluidic component symbols on a schematic; placing a second component symbol of the plurality of microfluidic component symbols on the schematic; and connecting the first component symbol to the second component symbol.

In another embodiment of the present invention a method for capturing a design of a microfluidic system using a computer aided design tool is provided. A first symbol representing a first component of a plurality of microfluidic components is placed on a schematic, where the first component includes a first fluid channel and a first control channel. Next a second symbol representing a second component of the plurality of microfluidic components, is placed on the schematic, where the second component includes a second fluid channel and a second control channel. Then the first symbol is connected to the second symbol.

An alternative embodiment of the present invention discloses a design capture system for capturing a microfluidic circuit including a plurality of microfluidic components. The design capture system includes: a component library including information and symbols associated with the plurality of microfluidic components; and a schematic entry module used for placing and connecting the symbols.

Another embodiment of the present invention discloses a method for synthesizing a network model of a microfluidic circuit including a plurality of microfluidic components. First, a synthesis program is stored in a computer readable medium. Next component models associated with the plurality of microfluidic components are selected from a database. And using the component models and the synthesis program, the network model is generated. Where in the network model, the component models are connected together.

In yet another embodiment of the present invention a synthesis system for creating a schematic of a microfluidic circuit having a plurality of microfluidic components, is provided. The synthesis system includes: a memory for storing synthesis code related to the schematic; a design library having a plurality of indications associated with the plurality of microfluidic components, wherein selected indications are selected using the synthesis code; and a synthesis module for creating the schematic by connecting the selected indications.

An embodiment of the present invention provides a method for functionally analyzing a schematic of a microfluidic circuit including a plurality of microfluidic components. The method includes: selecting a functional model for a component of the plurality of microfluidic components; determining a logic control test sequence for the schematic; and using the functional model in the schematic and the logic control test sequence, functionally simulating the schematic.

An advantage of the present invention is the reduction in time needed to complete the design and implementation of a microfluidic circuit. For example, in one embodiment of the present invention, synthesis, schematic capture, and functional simulation allow an efficient and expedient process of creating and validating an initial design, the physical layout tool allows easy placement and routing of multilayered components on a predefined template, the physical simulation allows the reduction in errors before fabrication, and the die placement tool allows faster wafer mask generation.

The uses and results generated by the present invention include, cell based assays (including micro cell sorting, genomic analysis, such as DNA sizing, hybridization, sequencing, quantification, and amplification); protein analysis, crystallization and purification; MS-interface; biochemical and electrophysiological assays, gene expressions; differential display analysis; integrated biological sample preparation; single molecule analysis; drug delivery; diagnostics; and other uses and products related to the chemical, biochemical, biological, electronic, computer, appliance, pharmaceutical, medical, or power industries.

These and other embodiments of the present invention are described in more detail in conjunction with the text below and attached figures.

BRIEF DESCRIPTION OF THE DRAWINGS

FIGS. 9a and 9b show simplified top plan view and perspective view of an on-off valve component of an embodiment of the present invention;

FIG. 10 shows an IDEF0 diagram representing a microfluidic component of an embodiment of the present invention;

FIG. 11 shows a microfluidic valve symbol of an embodiment of the present invention;

FIG. 17A shows the physical dimensions for an interconnect bridge channel of an embodiment of the present invention;

FIG. 17B shows a symbol for an interconnect bridge of one embodiment of the present invention;

FIG. 18A shows a simplified view of a crossing of two channels located on the same layer;

FIG. 18B shows a simplified view of an interconnect bridge channel using vias of an embodiment to of the present invention;

DESCRIPTION OF THE SPECIFIC EMBODIMENTS

Figure 1:
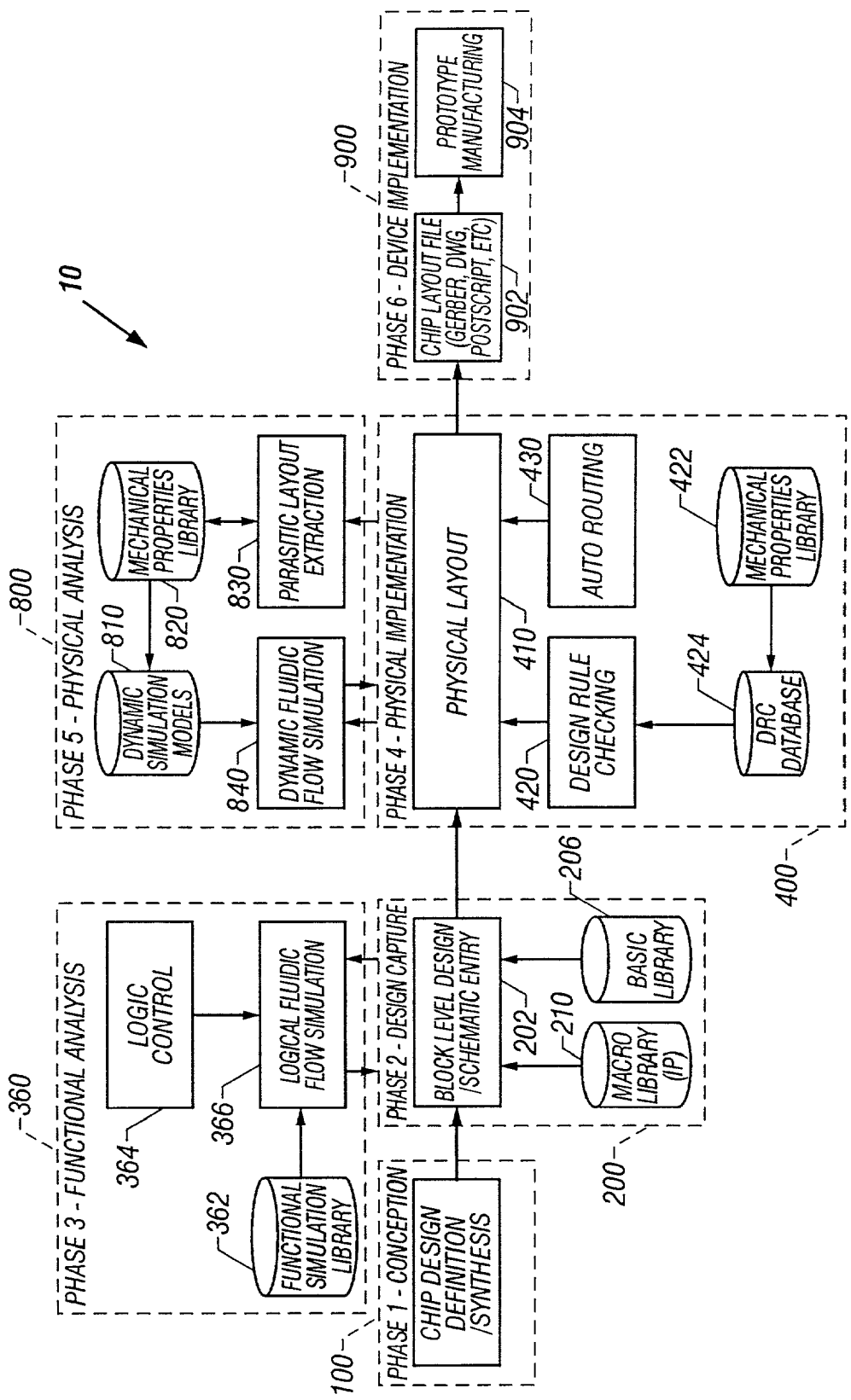
FIG. 1 shows a simplified block diagram of the MCAD system of an embodiment of the present invention.

Embodiments of the present invention are directed to the design of customized microfluidic systems using a microfluidic computer aided design (MCAD) system. The MCAD system provides the user with the tools to design, analyze, and implement a customized microfluidic system using a plurality of building block microfluidic components.

In one embodiment of the invention, the MCAD system includes a design capture module including a schematic entry tool for selecting and connecting microfluidic components according to a design. The system further includes a functional analysis module for functionally simulating selected microfluidic components of the design, a physical implementation module for arranging the microfluidic components into a physical layout according to the design, and a physical analysis module for physically simulating the microfluidic components in the physical layout.

In some embodiments, the modules comprise computer instructions or code stored in a computer-readable medium. The computer-readable medium is operatively coupled to a network (e.g., an internal computer bus, an external Local Area Network (LAN), or the Internet) to permit access to the instructions via the network.

The microfluidic components may be selected from a library or libraries having, for example, channels, pumps, valves, chambers, and layer interconnects (or vias). The library or libraries include normalized, custom, pre-defined, and/or user-defined, microfluidic components. The microfluidic components are connected according to preset design rules. The microfluidic components may be assigned physical scaling and physical properties. The selected components are typically active fluidic components.

The microfluidic components may include conventional microfluidic structures composed of hard, inflexible materials (such as silicon) or microfluidic structures made out of various layers of elastomer bonded together. An embodiment of the present invention uses a multi-layer soft lithography process to build integrated (i.e., monolithic) microfabricated elastomeric structures. Advantages of fabricating the elastomeric structures by binding together layers of soft elastomeric materials include the fact that the resulting devices are reduced by more than two orders of magnitude in size as compared to silicon-based devices. Further advantages of rapid prototyping, ease of fabrication, and biocompatability are also achieved. Further details may be found in PCT Patent Application No. PCT/US00/17740, entitled "Microfabricated Elastomeric Valve And Pump Systems," filed Jun. 27, 2000; Hou-Pu Chou et al., "Integrated Elastomer Fluidic Lab-on-a-chip-Surface Patterning and DNA Diagnostics," Proceedings of the Solid State Actuator and Sensor Workshop, Hilton Head, S.C. (2000); Stephen R. Quake and Axel Scherer, "From Micro- to Nanofabrication with Soft Materials," Science 290: 1536–40 (2000); and M. A. Unger et al., "Monolithic Microfabricated Valves and Pumps by Multilayer Soft Lithography," Science 288: 113–116 (2000). These are incorporated herein by reference each in its entirety.

The selected microfabricated components of the design may be functionally simulated by applying control stimuli to the control channels of selected active fluidic components to show functional connectivity of the design. In one embodiment of the functional simulation, components of the design are represented by Boolean expressions with operands based on connection ports of the control channels of the active fluidic components. Actuation of the active fluidic components is simulated using control stimulus generated by a Boolean based language with timing constraints. The design may be modified based on results of the functional simulation.

The microfluidic components in the physical layout may be physically analyzed. The physical analysis may include, for instance, analyzing dynamic volumetric flow rates in the components, analyzing component volumes, and analyzing volumetric capacitances of interconnecting and routing channels in the physical layout. Physically simulating the components of the physical layout may include simulating actuation of dynamic fluid flow in the components using control stimulus generated by a Boolean based language. The physical layout may be modified based on results of the physical simulation. The physical layout may be written to a layout file to be used for manufacturing.

For the purposes of this application a channel, for example, a control channel or a fluid/fluidic channel, may contain either a gas or a liquid. In one embodiment the control layer has pressurized air and the fluid layer has a liquid substance. Other embodiments have other combinations of gas-gas, liquid-gas, or liquid-liquid in two or more channels.

FIG. 1 shows a simplified block diagram of the MCAD system 10 of an embodiment of the present invention. There are four primary phases (phases 1, 2, 4, and 6) and two secondary phases (phases 3 and 5). Design conception 100 is the first step (phase 1) where the desired functionality of the microfluidic circuit is determined. Once the functionality has been determined, the second primary step 200 (phase 2) is to capture the resulting circuit schematically using basic predefined components 206, macro components 210, or user-defined components. The components may be microfluidic multilayered structures with at least one control channel and at least one fluid channel, where the control channel controls the fluid (liquid or gas) flow through the fluid channel. These channels may contain either a liquid or a gaseous substance. The third primary step 400 (phase 4) is the physical implementation of the design and involves the physical layout (i.e., placing and routing the components making up the circuit) either manually or automatically, from a two and/or three dimensional perspective. The fourth, and final, primary step 900 (phase 6) is the actual creation of the microfluidic chip. The two optional secondary phases 360 and 800 are shown as well and are used at different points of the MCAD system 10. These secondary phases involve, respectively, the functional analysis and physical analysis of the described design and layout. Functional analysis 360 (phase 3) aides the designer in verifying the desired function or behavior of the design. Examples of functional analysis are connectivity analysis to determine if the components are connected together or control channel analysis to determine that the proper control channels are activated in the right sequence. Physical analysis 800 (phase 5) allows the designer to verify and analyze the dynamic performance of the design. While functional and physical analyses are not critical for simple low component count design, they become important for moderately complex to highly complex designs by minimizing the need to empirically test and redesign until the desired network is achieved.

Conception (Phase 1)

The microfluidic circuit or chip design begins with the conception 100 of the desired functionality, outputs, or results to be achieved by inputting fluids into the microfluidic circuit or chip (phase 1).

One specific embodiment employs a black box analysis in which the inputs and outputs are first determined. A computer program using a synthesis language may then be written to simulate the generation of the outputs from the inputs. The synthesis language can be run through a synthesis compiler to generate a microfluidic circuit having a plurality of interconnected microfluidic components or structures. The synthesis compiler may also optimize a part of or all of the microfluidic circuit according to some criteria, such as minimum area. In such an embodiment, the design capture (phase 2) in effect is automatically done by the synthesis tool with access to the macro library 210 and basic library 206.

A fluidic synthesis language is like a synthesis language in the electrical arts in that certain programming language constructs map to certain structures or combinations of structures. For example, in electronic circuit design, a Hardware Description Language (HDL), such as VHSIC HDL (VHDL) or Verilog, is used to simulate the behavior of a circuit design at an abstract level (e.g., at the Register Transfer Language (RTL) level). Then, the VHDL or Verilog code is used by a synthesis tool (e.g., a tool available from Synopsys Inc. of Mountain View, Calif.) to produce an optimized gate level description of the circuit. As a simple illustration the operators in Boolean logic, such as "not," "and," or "or," map to an inverter, AND gate, and OR gate. Thus a Boolean expression may be mapped (and optimized) to a respective set of hardware logic gates. In a more complicated example a "case statement" in VHDL may be synthesized into a gate level implementation of a Finite State Machine (FSM).

In an embodiment of the present invention various microfluidic structures or components represent various digital and analog functions. Examples are given in U.S. Provisional Patent Application No. 60/282,253, entitled "Microfabricated Fluidic Circuit Elements and Applications," filed Apr. 6, 2001, which is incorporated herein by reference in its entirety. Some of the microfluidic structures or components disclosed may be configured to imitate the functionality of semiconductor circuits, such as ON/OFF switches, resistors, capacitors, logic gates, latches, switching regulators, and devices that perform mathematical functions. The microfabricated fluidic logic gates include AND gates, OR gates, NOR gates, NAND gates, inverters, and numerous other Boolean and logic functions. In addition the microfluidic components may also perform analog functions such as amplification or regulation. For example, analog components include switching regulators, capacitors, pressure multipliers, and pressure sources.

Figure 2A:
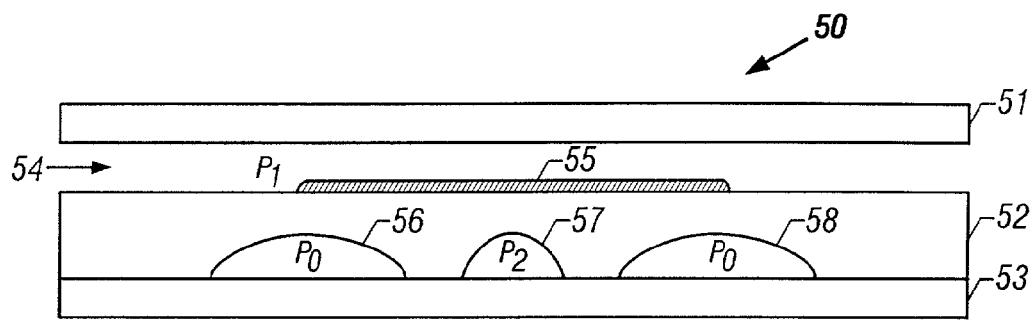
FIG. 2A is a simplified cross-sectional view of microfluidic switch along channel of an embodiment of the present invention.
Figure 2B:
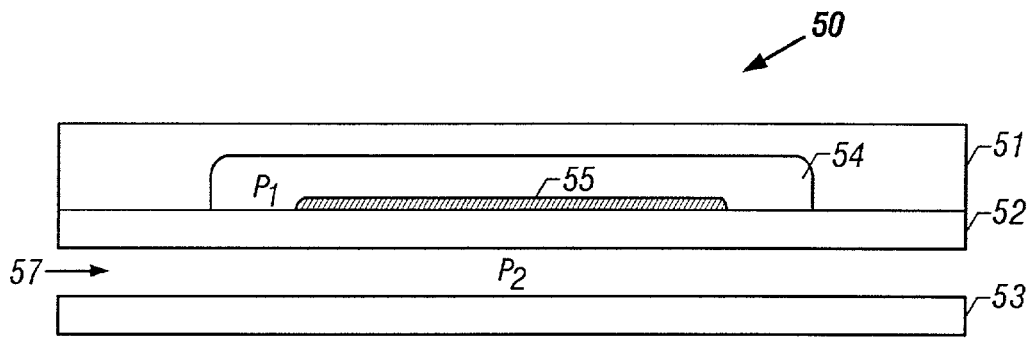
FIG. 2B is a simplified cross-sectional view of microfluidic switch along channel of an embodiment of the present invention.
Figure 3:
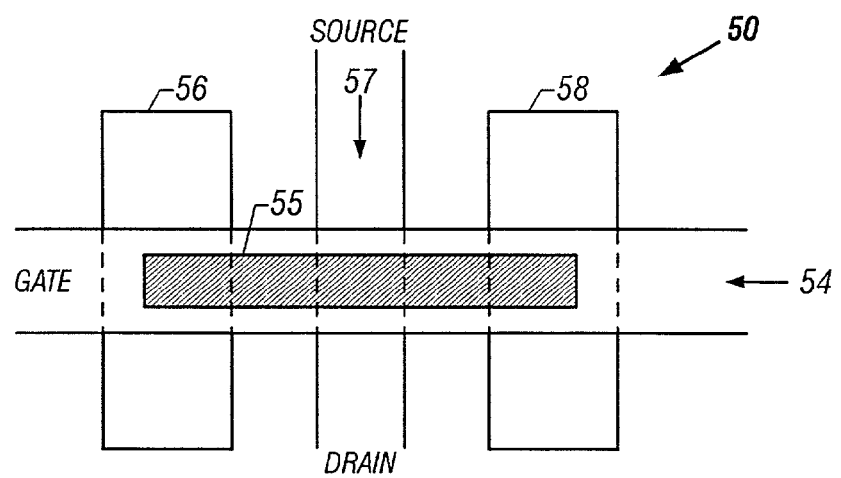
FIG. 3 is a simplified top down view of microfluidic switch of an embodiment of the present invention
Figure 5A:
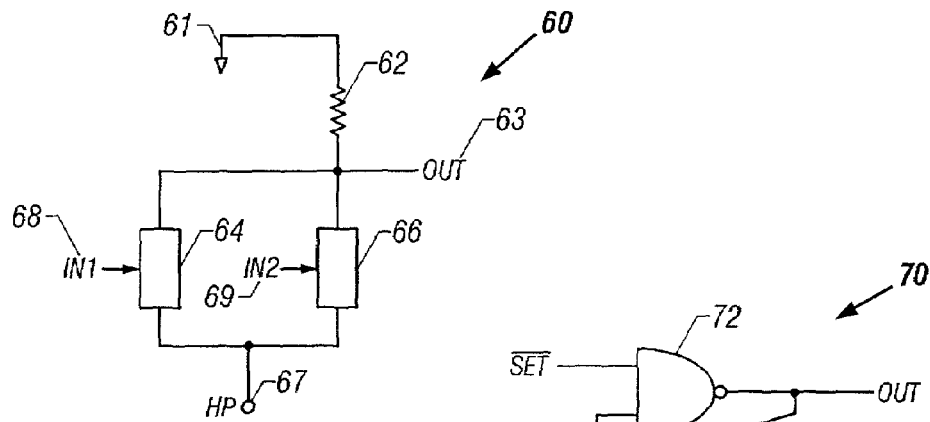
FIGS. 5A and 5B show an example of a microfluidic NAND gate of an embodiment of the present invention.
Figure 6A:
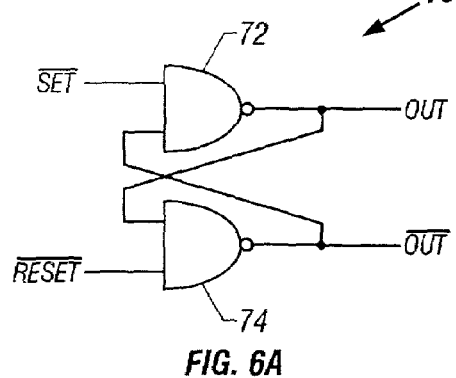
FIGS. 6A and 6B show an example of a microfluidic S-R latch of an embodiment of the present invention.
Figure 5B:
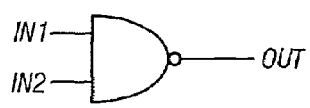
Figure 6B:
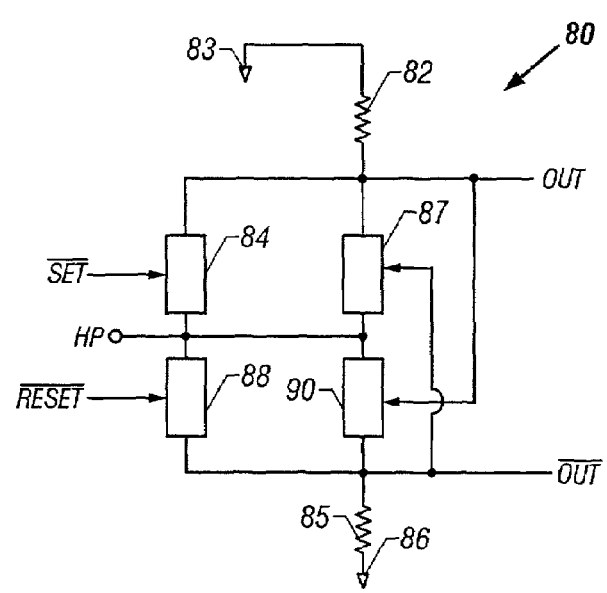

Microfluidic logic gates may perform the same Boolean logic function as electronic gates, but are substantially different both structurally and in the way they perform the logic function. As an illustration, FIGS. 2A, 2B, and 3 show the structure of a microfluidic ON/OFF switch. Symbols representing microfluidic devices are shown in FIGS. 4A–4K. FIG. 5A shows an example of a NAND gate. FIG. 6B shows an example of an S-R latch. FIGS. 5B and 6A show the symbols for the NAND gate and S-R latch.

A microfluidic ON/OFF switch is "open" during its ON state allowing fluid (liquid or gas) flow through the channel between the source and the drain. A fluidic switch is "closed" during its OFF state preventing fluid (liquid or gas) flow through the channel between the source and the drain. Microfluidic switches are opened and closed by changing the pressure in the gate of the switch either by liquid or gas pressure. The pressure in the gate of the switch does not need to be increased above or reduced below the pressure in the drain-to-source channel. This provides an advantage over prior art, because microfluidic switches of this embodiment of the present invention can be coupled together to control each other on a single chip to perform complex logic, mathematical, multiplexing, and latching functions.

An embodiment of a microfluidic switch is shown in FIGS. 2A–2B and 3. FIG. 2A is a cross-sectional view of microfluidic switch 50 along channel 54; FIG. 2B is a cross-sectional view of microfluidic switch 50 along channel 57; and FIG. 3 is a top plan view of microfluidic switch 50. Microfluidic switch 50 includes substrate 53, elastomeric layer 52, and elastomeric layer 51 as shown in FIG. 2A. As seen in FIG. 3, elastomeric layer 51 contains channel 54, and elastomeric layer 52 contains channel 57 and chambers 56 and 58. Channel 54 is coupled to the gate of the switch 50. Channel 57 is coupled between the source and the drain of the switch 50. Layers 51–53 may be formed and hermetically sealed using methods described in further detail in PCT Patent Application No. PCT/US00/17740, entitled "Microfabricated Elastomeric Valve and Pump Systems," filed Jun. 27, 2000, which designates the United States and is incorporated herein by reference in its entirety.

Layer 55 comprises a rigid material that is deposited on top of layer 52. Layer 51 may then be placed on top of layer 52 so that layer 55 is inside channel 54. Layer 55 is deposited on layer 52 so that it overlaps channel 57 and portions of chambers 56 and 58 as shown in FIG. 3. A fluid is passed through channel 54 at pressure P1. A fluid is passed through channel 57 at pressure P2. Channel 54 is perpendicular to channel 57. Chambers 56 and 58 contain fluid at ambient pressure P0.

When the pressure P1 in channel 54 is increased above P0, the radius of channel 54 expands and rigid layer 55 moves downwardly (with respect to FIGS. 2A–2B) applying pressure against channel 57 and chambers 56 and 58. As P1 increases, layer 55 presses down on the portion of channel 57 beneath layer 55 pinching channel 57 closed. Channel 57 is concave in shape making it more collapsible so that channel 57 makes a complete seal to completely block the flow of fluid therethrough when P1 is increased to a predetermined level.

The microfabricated fluidic structure of FIGS. 2A–2B and FIG. 3 functions as a switch that causes channel 57 to be opened or closed. When pressure P1 equals P0, channel 57 is open and fluid can flow therethrough. When pressure P1 is increased to a predetermined level in channel 54, channel 57 closes and the flow of fluid through channel 57 is blocked. Therefore, a fluidic switch is open when fluid is allowed to flow through a specific channel and closed when the flow of fluid through that channel is blocked.

Chambers 56 and 58 reduce the upward force that elastomer material in layer 52 applies to layer 55 when channel 54 expands so that channel 57 closes more quickly and completely. When channel 54 expands to close channel 57, fluid is displaced from the area of chambers 56 and 58 directly beneath channel 54 into adjacent portions of chambers 56 and 58. Chambers 56 and 58 allow channel 57 to be closed without having to increase the pressure in gate channel 54 above the pressure in channel 57. Therefore, switch 50 may be coupled with other microfluidic switches to perform logic functions and other functions, because switch 50 does not require a pressure drop from the gate channel 54 to the source-to-drain channel 57.

Figure 4A:
FIGS. 4A–4K show symbols representing microfluidic devices of an embodiment of the present invention.
Figure 4B:
Figure 4C:
Figure 4D:
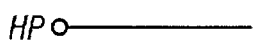
Figure 4E:
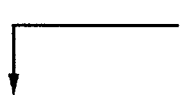
Figure 4F:
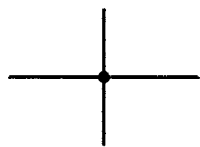
Figure 4G:
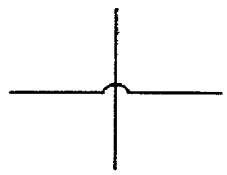

For illustrative purposes symbols representing a number of microfluidic devices are shown in FIGS. 4A–4K. The symbol of FIG. 4A represents a low flow resistance channel. The symbol of FIG. 4B represents a high flow resistance channel such as a long or a constricted channel. A fluidic resistor acts similarly to an electrical resistor. A fluidic resistor exists when there is a high pressure difference between two terminals and a low flow between them. The symbol of FIG. 4C represents a channel terminal. The symbol of FIG. 4D represents a high pressure source. The symbol of FIG. 4E represents an ambient exhaust terminal. The symbol of FIG. 4F represents a node where channels connect. The symbol of FIG. 4G represents two channels that cross but do not connect.

Figure 4H:
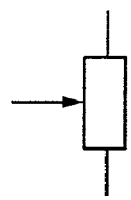
Figure 4I:
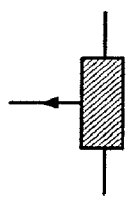
Figure 4J:
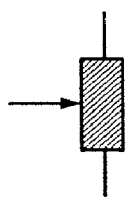
Figure 4K:
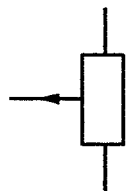

The symbol of FIG. 4H represents a pressure-actuated, normally open switch in which the pressure in the gate chamber is increased above ambient pressure to a high pressure in order to close the switch. The symbol of FIG. 4I represents a vacuum-actuated normally closed switch in which the pressure in the gate chamber is reduced from ambient pressure to a vacuum to open the switch. The symbol of FIG. 4J represents a pressure-actuated normally closed switch in which the pressure in the gate chamber is increased from ambient pressure to a high pressure to open the switch. The symbol of FIG. 4K represents a vacuum-actuated normally open switch in which the pressure in the gate chamber is reduced from ambient pressure to a vacuum to close the switch.

Some of the microfluidic devices of the present invention may be connected together to form logic gates that perform logic functions and Boolean algebra. Previously known microfluidic chips often perform logic functions off-chip using electrical circuitry and then route the output signal onto the microfluidic chip through macroscopic control lines which are cumbersome and take up a lot of space. Performing logic functions on chip using microfluidic logic gates can greatly reduce the number control lines routed onto the chip which advantageously saves space.

The bistable logic levels for the microfluidic logic gates are high pressure (HIGH) and low pressure (LOW). Each logic gate has a connection to a low pressure source (e.g., ambient pressure), and a connection to a high pressure source (e.g., higher than ambient pressure). In an alternate embodiment, each logic gate has a connection to ambient pressure and a connection to a vacuum. In this embodiment, LOW refers to the vacuum and HIGH refers to ambient pressure.

All Boolean functions can be constructed entirely from NAND gates or entirely from NOR gates. A NAND gate performs an AND function on a set of inputs and inverts the output. A NOR gate performs an OR function on a set of inputs and inverts the output.

An example of a NAND logic gate formed with microfabricated fluidic switches is shown in FIG. 5A. NAND gate 60 includes microfluidic resistor 62 which is coupled between an ambient exhaust terminal 61 and output terminal OUT 63. NAND gate 60 also includes pressure-actuated normally open microfluidic switches 64 and 66 which are coupled in parallel between OUT 63 and high pressure terminal HP 67. The gate of switch 64 is coupled to input terminal IN1 68, and the gate of switch 66 is coupled to input terminal IN2 69.

When either of inputs IN1 68 and IN2 69 is at ambient pressure (LOW), one of switches 64 or 66 is open, and fluid flows from the HP terminal 67 to the ambient exhaust 61 through the open switch(es) and resistor 62. The pressure at OUT 63 increases to high pressure (HIGH), because the resistance of resistor 62 is greater than the resistance of switches 64 and 66. When both inputs IN1 68 and IN2 69 are at high pressure (HIGH), both of switches 64 and 66 are closed and fluid flow to the HP terminal 67 is blocked. The pressure at OUT 63 diffuses through resistor 62 to the ambient exhaust terminal 61 causing the pressure at OUT 63 to decrease to ambient pressure (LOW).

A microfluidic NAND gate may comprise any number of input terminals greater than one. Each input terminal is coupled to the gate of a normally open switch coupled in parallel with switches 64 and 66 between OUT and the HP terminal. Of course, other configurations for the construction of NAND logic gates known to those of skill in the semiconductor circuit design art may be used to design a microfluidic NAND gate in which transistors are replaced with microfluidic switches. The symbol for a two input NAND gate is shown in FIG. 5B. The truth table for a two input NAND gate is shown in Table 1 below (wherein H denotes high pressure and L denotes low pressure):

TABLE 1

| IN1 | IN2 | OUT |
|-----|-----|-----|
| H   | H   | L   |
| H   | L   | H   |
| L   | H   | H   |
| L   | L   | H   |

A microfluidic structure may also be used to construct Set-Reset (S-R) latches that have the same truth table as S-R latches constructed from electronic circuits. Latch 70 in FIG. 6A is one example of an S-R latch that is constructed with two cross-coupled NAND gates 72 and 74. NAND gate 72 has a first input terminal $\overline{\text{SET}}$ and a second input terminal coupled to the output terminal $\overline{\text{OUT}}$ of NAND gate 74. NAND 74 has a first input terminal $\overline{\text{RESET}}$ and a second input terminal coupled to the output terminal OUT of NAND gate 72.

Latch 70 operates as follows. A transitory LOW signal occurs when the $\overline{\text{SET}}$ or $\overline{\text{RESET}}$ input transitions from high pressure (HIGH) to ambient pressure (LOW) and then transitions back to high pressure (HIGH) again. When a transitory LOW occurs on the $\overline{\text{SET}}$ input, OUT goes HIGH and remains HIGH. When a transitory LOW signal occurs on the $\overline{\text{RESET}}$ input, $\overline{\text{OUT}}$ goes HIGH and remains HIGH. When the pressure at the $\overline{\text{SET}}$ and $\overline{\text{RESET}}$ inputs are both HIGH, outputs OUT and $\overline{\text{OUT}}$ remain in their previous states. An unstable condition exists at outputs OUT and $\overline{\text{OUT}}$ when the pressure at the $\overline{\text{SET}}$ and $\overline{\text{RESET}}$ inputs are both LOW.

An example of an S-R latch constructed with microfluidic cross-coupled NAND gates is shown in FIG. 6B. Latch 80 includes fluidic resistor 82 which is coupled between a first ambient exhaust terminal 83 and output terminal OUT, and fluidic resistor 85 which is coupled between a second ambient exhaust terminal 86 and output $\overline{\text{OUT}}$. Latch 80 also includes pressure-actuated normally open microfluidic switches 84 and 87 that are coupled in parallel between OUT and a high pressure terminal HP, and pressure-actuated normally open microfluidic switches 88 and 90 that are coupled in parallel between $\overline{\text{OUT}}$ and the HP terminal. The gate of switch 84 is coupled to input terminal $\overline{\text{SET}}$, the gate of switch 87 is coupled to the output terminal $\overline{\text{OUT}}$, the gate of switch 88 is coupled to input terminal $\overline{\text{RESET}}$, and the gate of switch 90 is coupled to output terminal OUT.

When the pressure at the $\overline{\text{RESET}}$ input remains HIGH and the pressure at the $\overline{\text{SET}}$ input transitions from HIGH to LOW, switch 88 is closed, switch 84 opens, and the pressure at OUT goes HIGH because it is coupled to the high pressure terminal HP through low resistance switch 84. Switch 90 is closed because OUT is HIGH, and the pressure at $\overline{\text{OUT}}$ goes LOW, because $\overline{\text{OUT}}$ is decoupled from the HP terminal. Switch 87 is open, because $\overline{\text{OUT}}$ is LOW. When the pressure at the $\overline{\text{SET}}$ input goes HIGH again, switch 84 closes. However, the pressure at OUT remains HIGH, because OUT is coupled to the HP terminal through switch 87 which remains open. The pressure at $\overline{\text{OUT}}$ remains LOW, because switch 90 remains closed.

When the pressure at the $\overline{\text{SET}}$ input remains HIGH and the pressure at the $\overline{\text{RESET}}$ input transitions from HIGH to LOW, switch 84 remains closed and switch 88 opens. The pressure at $\overline{\text{OUT}}$ goes HIGH, because $\overline{\text{OUT}}$ is coupled to the HP terminal through low resistance switch 84. Switch 87 is closed because $\overline{\text{OUT}}$ is HIGH, and the pressure at OUT goes LOW, because it is decoupled from the HP terminal. When the pressure at the $\overline{\text{RESET}}$ input goes HIGH again, switch 84 closes, but switch 90 remains open because OUT is LOW. Therefore, the pressure $\overline{\text{OUT}}$ remains HIGH keeping switch 87 closed, so that the pressure at OUT remains LOW.

When the pressures at $\overline{\text{RESET}}$ and $\overline{\text{SET}}$ are both HIGH, the pressures at OUT and $\overline{\text{OUT}}$ both remain at their previous logic states. The pressures at OUT and $\overline{\text{OUT}}$ are both HIGH when the pressures at $\overline{\text{RESET}}$ and $\overline{\text{SET}}$ are both LOW, which is considered an unstable output state because OUT and $\overline{\text{OUT}}$ cannot remain in that state when $\overline{\text{RESET}}$ or $\overline{\text{SET}}$ go HIGH. The truth table for latch 80 is shown in Table 2.

TABLE 2

| $\overline{\text{SET}}$ | $\overline{\text{RESET}}$ | OUT | $\overline{\text{OUT}}$ |
|---|---|---|---|
| H to L to H | H | H | L |
| H | H to L to H | L | H |
| H | H | Previous State | Previous State |
| L | L | H | H |

Microfluidic S-R latches can be used to provide a large number of arbitrary latched control signals from a small number of control lines that are multiplexed externally. Thus, having fluidic devices that perform the function of S-R latches on the fluidic chip also greatly reduces the number of control lines that need to be brought onto the chip from external sources, providing additional space saving.

In one embodiment of a microfluidic circuit, when it is desirable to perform logic functions on chip using microfluidic logic gates rather than conventionally using electrical circuitry and then routing the output signal onto the microfluidic chip through macroscopic control lines, the Boolean equations, which may include timing, are first determined. These Boolean equations can be simulated to test functionality (phase 3) and then can be used, either manually or automatically, to generate the circuit.

A Hardware Description Language (HDL) may be used to model both the control channels and the fluid channels of a microfluidic circuit. In one embodiment a digital HDL, such as VHDL or Verilog, is used to model (and/or synthesize) the control channels, which perform the logical control functions of the microfluidic circuit. An analog HDL such as Verilog-A or VHDL-AMS may be used to model (and/or synthesize) the fluid channels of the microfluidic circuit. Since VHDL-AMS can model mixed digital-analog designs, VHDL-AMS may be used to model (and/or synthesize) both the digital control functions of the control channels as well as the analog fluid flow of the fluid channels. Since a component includes at least one control channel and at least one fluid channel in this embodiment, VHDL-AMS can model (and/or synthesize) the control function of the control channel, for example, ON/OFF, the fluid flow through the fluid channel, and the interaction between the control channel and the fluid channel for the component.

In an embodiment VHDL or Verilog code is written which allows the testing of the control logic via simulation using a commercial VHDL or Verilog tool. Next the control logic is synthesized and optimized using a commercial VHDL or Verilog synthesis tool, but using microfluidic logic gates rather than digital logic gates.

An illustrative simple example is the synthesis of a microfluidic D-latch using VHDL, a microfluidic S-R latch (FIG. 6A) and microfluidic NAND gates (FIG. 5B). A D-latch has the following truth table (Table 3):

TABLE 3

| D | En | Q |
|---|---|---|
| H | H | H |
| L | H | L |
| H | L | Previous State |
| L | L | Previous State |

Figure 7A:
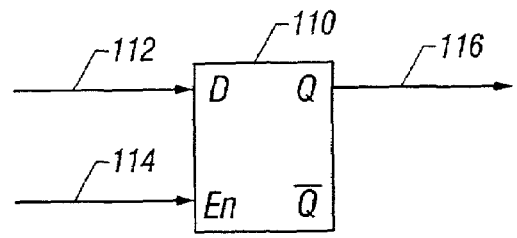
FIG. 7A shows a symbol for a D-latch of an embodiment of the present invention.

FIG. 7A shows a symbol for a D-latch 110. The D 112 input is the data input and the En 114 input is the enable input that enables or disables the latch 110. The output of the latch is given by Q 116. Knowing the function of the D-latch, the next step is to determine the structure of the D-latch. In this case how the D-latch component is constructed from NAND gate sub-components is determined (FIG. 5A). The following synthesizable VHDL code may be used to automatically generate at the design capture level 200 (phase 2), a schematic of a microfluidic network of connected microfluidic NAND gates:

```
entity LATCH is
    port (En, D,: in std_logic; Y: out std_logic);
end entity LATCH;
architecture GATE of LATCH is
    begin
        P1: process (En, D)
            begin
                if (En = '1') then
                    Y <= D;
                end if;
            end process P1;
end architecture GATE;
```

The above VHDL code shows that if the enable line (En 114) is "1" or H, then the output Q 116 gets the input D 112, otherwise the output Q 116 remains unchanged. This code infers a D-latch and generates the network of NAND gates in FIG. 7B, when executed by a synthesis tool.

Figure 7B:
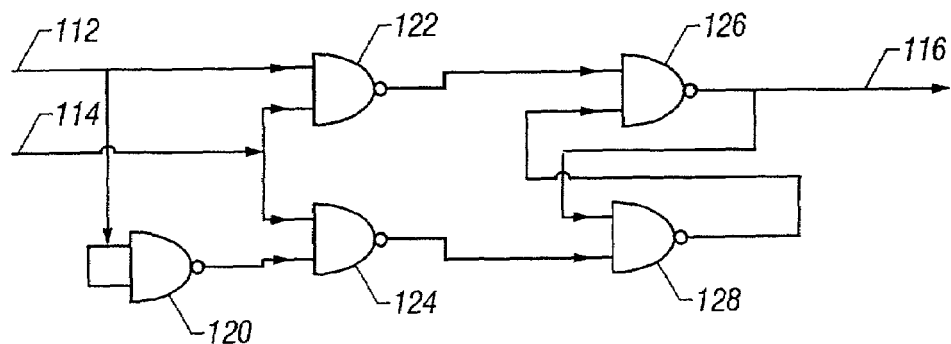
FIG. 7B shows the gates synthesized from the above VHDL code example of an embodiment of the present invention

FIG. 7B shows the gates synthesized from the above VHDL code example of an embodiment of the present invention. Each NAND gate (FIG. 5A) includes two pressure actuated normally open switches (FIG. 4H) and a high flow resistance channel (FIG. 4B). The inputs are D 112 and En 114 which go to a NAND gate 122. The input D 112 also goes through an inverter 120 to be input along with En 114 into NAND gate 124. The outputs of NAND gates 122 and 124 are the inputs into a S-R latch having NAND gates 126 and 128, where the output of NAND gate 122 is the $\overline{\text{SET}}$ and the output of NAND gate 124 is the $\overline{\text{RESET}}$ of S-R latch in FIG. 6A. The output D 116 is the output of NAND gate 126 and the D-latch 110.

Thus the example of FIGS. 7A and 7B shows how synthesizable code may be used to generate a microfluidic network of microfluidic components, where the components may be automatically chosen from a library, such as, Macro Library 210 and Basic Library 206 and placed on a schematic 202 by a synthesis CAD tool. Since the VHDL code is executable and has the D-latch function represented by an "if (En='1') then Y<=D" statement, microfluidic simulation of the control logic may be done using the VHDL code in a conventional VHDL simulator. In addition the VHDL statement "Y<=D" may be changed to "Y<=D after 5 μsec" to incorporate timing aspects. This simulation allows the verification of the control logic for the microfluidic circuit and is part of the Functional Analysis 360 (phase 3).

Using the above fluidic D-latch (or an equivalent D-Flip Flop with the enable replaced by a clock) and fluidic NAND gate, a Finite State Machine (FSM) can be built, for example, a one-hot FSM. Thus in one embodiment of the present invention a microfluidic computer may be built. With the components made of organic rather than inorganic material a biological computer may also be constructed. Other synthesizable designs using a Hardware Description Language can be found in Douglas J. Smith, "HDL Chip Design, A Practical Guide for Designing, Synthesizing and Simulating ASIC's and FPGAs using VHDL or Verilog," Doone Publications, Madison, Ala. 1997 which is incorporated herein by reference.

In addition to digital circuits, the above-referenced Provisional Patent Application No. 60/282,253, entitled "Microfabricated Fluidic Circuit Elements And Applications," filed Apr. 6, 2001, discloses analog circuits, for example, switching regulators, capacitors, pressure multipliers, and pressure sources. In an embodiment techniques similar to those used for the synthesis of microwave circuits, such as given in U.S. Pat. No. 5,031,111, entitled "Automated Circuit Design Method," by Chao, et. al, filed Aug. 8, 1988, may be used with microfluidic components in place of microcells.

In another embodiment VHDL-AMS (Analog and Mixed Signal) (i.e., IEEE Standard 1076.1-1999 (http://www.vhdl.org/analog) or Verilog AMS) may be used for the synthesis and simulation of analog, and/or mixed digital/analog systems at several abstraction levels (e.g., functional, behavioral, macrocell/RTL, and device levels). Thus with the use of microfluidic components described above, VHDL-AMS is used in one embodiment of the present invention to simulate a mixed signal or analog design for functional analysis 360 (phase 3) and to synthesize the design from the VHDL-AMS programming code to connected microfluidic components (i.e., automatically generate phase 2) displayed on a schematic entry tool.

The following example is of VHDL_AMS code for a valve (see "VHDL-AMS Code For A Electrostatically Driven Micropump," by Feng Cao, Sep. 28, 1999, Microfluidic Operations and Network Architectural Characterizations (MONARCH) Project, Department of Electrical and Computer Engineering, Copyright 1999, Duke University):
packagefluidic_system is

```
    SUBTYPE   pressure IS real;
    SUBTYPE   flow_rate IS real;
    NATURE fluidic is
        pressure ACROSS
        flow_rate THROUGH
        fluidic_refREFERENCE;
end package fluidic_system;
library ieee;
use work.fluidic_system.all;
use ieee.math_real.all;
entity valve is
    generic (EffectiveMass : real;
        DampConst : real;
        SpringConst : real;
        area : real;
        mu : real;
        density : real;
        length : real);
    port (terminal p, m : fluidic);
end entity valve;
architecture config of valve is
    constant pi real :=3.14159;
    quantity freq0,y,ydot : real;
    quantity valvepres across valveflow through p to m;
begin
    ydot == y'dot;
    y == (1.4e-6*valvepres - 2.36e-6*ydot'dot - 0.00259*y'dot)/155.0;
    absy == (y + abs(y))/2.0;
    if y < 0.0 use valveflow == 0.0;
    else
        if valvepres > 0.0  use
            valveflow == mu*4.0*length*sqrt(2*valvepres/density)*absy;
        else
            valveflow == -mu*4.0*length*sqrt(2*valvepres/density)*absy;
        end use;
```

```
        end use;
     end architecture config;
```

Design Capture (Phase 2)

Once the design has been conceptually defined, it can then be captured with a schematic entry tool 202 that is used to select the components and connect between the input/output ports of components, or the schematic may be automatically generated using a synthesis language, as described above.

Figure 8:
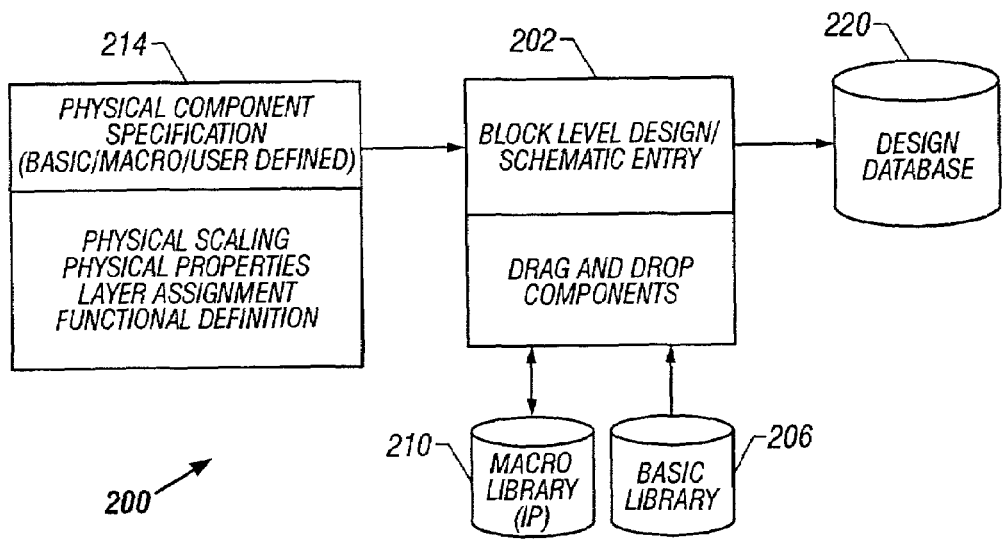
FIG. 8 shows a simplified block diagram of phase 2, design capture, of an embodiment of the present invention.

FIG. 8 shows a simplified block diagram of phase 2, design capture 200, of an embodiment of the present invention. For manual creation of the design, schematic entry 202 enables the quick creation of designs through the use of library components in libraries 206 and 210. There are basic library components 206, for example, valves, pumps, lenses, mixing chambers, input chambers, output/waste chambers, or interconnects (or vias). A via is a vertical connection through one or more layers. The basic library components 206 are components which are either user or pre-defined. There are also macro library 210 components, for example, a cell sorter macro or a DNA fingerprint macro. The library components may or may not be normalized.

Examples of library components used in this embodiment of the present invention are given in the above-mentioned PCT Patent Application No. PCT/US00/17740, entitled "Microfabricated Elastomeric Valve and Pump Systems," filed Jun. 27, 2000 and in Provisional Patent Application No. 60/282,253, entitled "Microfabricated Fluidic Circuit Elements And Applications," filed Apr. 6, 2001 which are incorporated herein by reference. Examples of microfluidic components and structures are summarized in Appendices A and B which are herein incorporated.

In one embodiment each component in the libraries 206 and 210 has a physical component specification 214. The specification may have, for example, one or more of the following: designation of the channel as a control or fluid channel, physical scaling of channels (length, width, depth), control or fluid channel attributes, such as if a channel end is open or closed, or if a channel is square or rounded, physical properties, such as, thermal, conductivity, viscosity, or magnetic properties, layer assignment, a functional description (digital or analog), a component and/or a fixed element name, and/or a design rule specification for physical layout.

FIGS. 9a and 9b show the top plan view and perspective view of an on-off valve component of an embodiment of the present invention. The top plan view shows the control length 232 and control width 234 of the control channel 246 and the fluid width 238 and fluid length 233 of the fluid channel 242. The perspective view shows the fluid depth 244 of the fluid channel 242 and the control depth 248 of the control channel 246. The channels 242 and 246 are semi-rounded.

Figure 12:
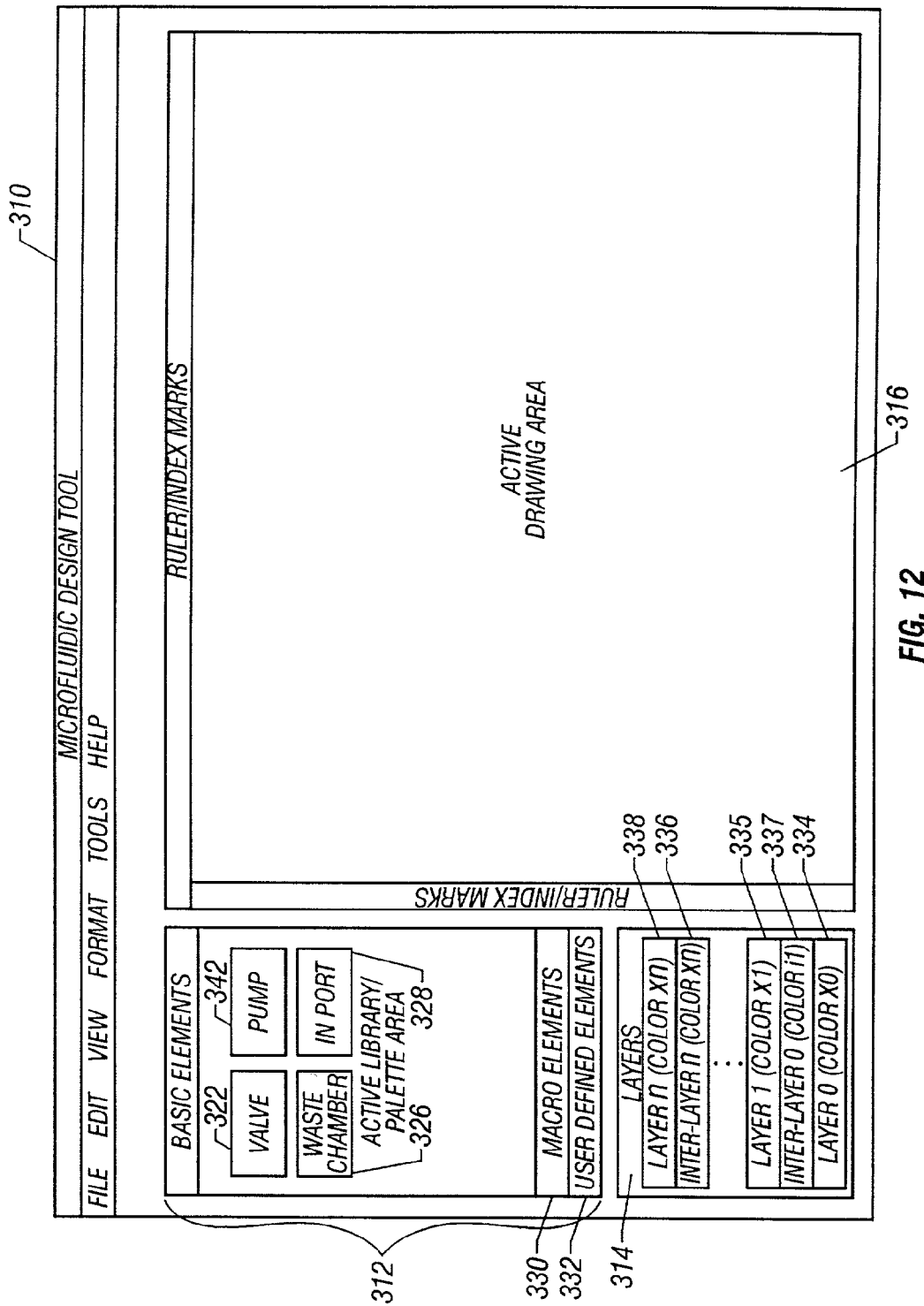
FIG. 12 illustrates a schematic capture display window of embodiment of the present invention.

One example of the Physical Component Specification 214 for the on-off valve in FIGS. 9a and 9b includes:

- o Physical dimensions (nm)
  - ■ Fluid Channel Width
  - ■ Fluid Channel Depth - Linked by assigned layer
  - ■ Fluid Channel Depth_I - Independent of layer depth
  - ■ Fluid Channel Length
  - ■ Control Channel Width
  - ■ Control Channel Depth - Linked by assigned layer
  - ■ Control Channel Depth_I - Independent of layer depth
  - ■ Control Channel Length
- o Element Attributes
  - ■ Control Channel Left End (0 - close, 1 - open)
  - ■ Control Channel Right End (0 - close, 1 - open)
  - ■ Fluid Channel Left End (0 - close, 1 - open)
  - ■ Fluid Channel Right End (0 - close, 1 - open)
  - ■ Control Channel Profile (0 - rounded [default-blue], 1 - square)
  - ■ Fluid Channel Profile (0 - rounded [default-blue], 1 - square)
- o Layer assignment (integer number 0 - n, where n is a positive integer)
  - ■ Fluid Channel Layer - n
  - ■ Control Channel Layer - n+1 or n−i
- o Component Name Assignment (for example, any alpha string up to 64 bytes long excluding whitespace and "/" and "\")
  - ■ CompName
- o Fixed Element Name
  - ■ ElementName The On-Off valve component may be represented by a block diagram such as FIG. 10 or a schematic symbol to be displayed in FIG. 12. The valve symbol in FIG. 12 may be in Basic Library 206 and dragged and dropped onto a schematic entry 202 active drawing area 316 such as that shown in FIG. 11.

FIG. 10 shows an IDEF0 diagram representing a microfluidic component of an embodiment of the present invention. IN 256 is the input into process 252, which responsive to control 254 outputs out 258. This may represent, for example, a valve in which the input, IN 256, is transferred to the output, OUT 256, if the CONTROL 254 turns the PROCESS 252 on. Note that FIG. 10, when representing a valve, is a more abstract representation of FIG. 11.

FIG. 11 shows a microfluidic valve symbol of an embodiment of the present invention. The fluid channel 262 has input end 263 and output end 264. The control channel 266 has input end 267 and a closed output end 268. When fluid (liquid or gas) flows in the control channel 266, the fluid channel 262 it is shut off and the fluid (liquid or gas) stops flowing, i.e., the valve 260 is turned on. Otherwise, the valve 260 is normally off (i.e., open) and the fluid (liquid or gas) in the fluid channel 262 keeps flowing. The valve in FIG. 11 is a multilayered symbol. The fluid channel is on a different layer from that of the control channel. From FIG. 12, for illustration purposes, let layer 1 335 represent the control layer and layer 0 334 represent the fluid layer. Then with layer 0 334 selected and layer 1 unselected the fluid channel 262 is displayed and can be connected to another fluid channel. With layer 0 334 unselected and layer 1 selected the control channel 266 is displayed and can be connected to another control channel.

FIG. 12 illustrates a schematic capture display window 310 according to an embodiment of the present invention. The window 310 includes an area showing the library components 312, an area 314 showing the layers selected and an active drawing area 316 were the component symbols from active library area 320 are dragged and dropped and connected together. The layered area 314 is used when there are multilayered component symbols in library components area 312. The layered area 314 controls which layer(s) in the active drawing area 316 is/are active. If, for example, only one layer is active then only the components or parts of components on that layer are displayed and can be modified or acted upon. The layers include major layers, for example, layer n 338, layer 1 335, and layer 0 334, and sub-layers, for example, inter-layer n 336 and inter-layer 0 337. The sub-layers are layers in between the major layers. For ease of viewing each layer may have its own associated color for the channels on that layer.

Figure 13A:
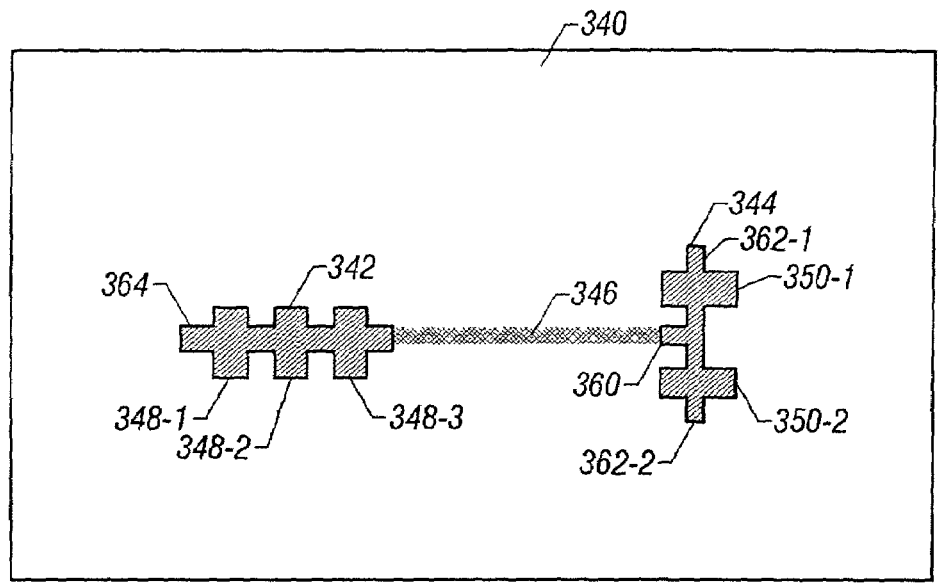
FIG. 13A shows an example of a peristaltic pump connected to a T-switch in an expanded drawing area of FIG. 12 of an embodiment of the present invention.

FIG. 13A shows an example of a peristaltic pump 342 connected to a T-switch 344 in an expanded drawing area 340 of the window 310 of FIG. 12 in an embodiment of the present invention. The peristaltic pump 342 is a basic component that allows the active control of fluid in either direction. Each of the control channels 348-1, 348-2, and 348-3, are pressurized (and depressurized) in some order to create a pumping effect in the fluid channel 364. The T-switch 344 represents a basic component that is used to direct the incoming flow 360 in the fluidic channel to none or one of two channels, 362-1 or 362-2, based on the state of the control channels 350-1 and 350-2. The peristaltic pump 342 is first selected from the active library/palette area 320 and dragged and dropped into the drawing area 316. Next the T-switch is selected and dragged and dropped into the drawing area 316. The peristaltic pump 342 is then connected to the T Switch 344 via a fluid channel 346. The function of the microfluidic network in FIG. 13A is to pump a fluid into one of two directions 362-1 or 362-2.

Figure 13B:
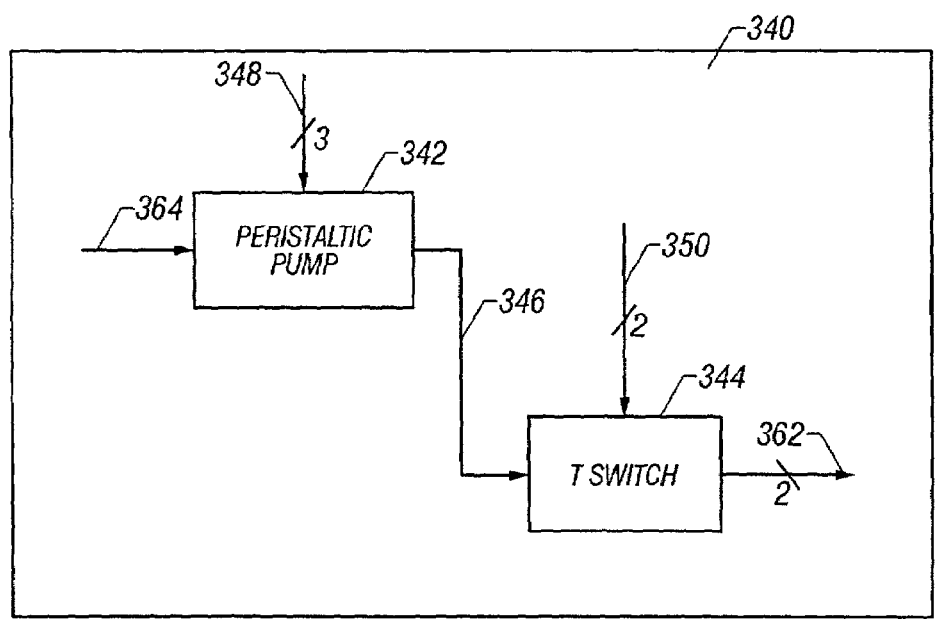
FIG. 13B shows an example of using IDEF0 blocks to perform schematic capture in another embodiment of the present invention.

FIG. 13B shows an example of using IDEF0 blocks to perform schematic capture in another embodiment of the present invention. The peristaltic pump 342 has input 364 and control bus 348 having three control lines. The output of the peristaltic pump 342 is connected via line 346 to the T-switch 344. The T-switch 344 has a control bus 350 having two lines and an output bus 362 having two lines. The microfluidic network schematically captured in FIG. 13B is the same as that of FIG. 13A, but with more abstract symbols.

As shown in FIG. 8, from the schematic entry 202, a design database 220 is produced that represents the interconnected components. This design database 220 serves as input into the functional analysis 360 and the physical implementation 400.

Functional Analysis (Phase 3)

After completion of the schematic design entry, a good design practice to reduce the number of design iterations is to functionally simulate the design. Functional simulation of microfluidic circuits involves application of control signals to the active components of the design and shows the functional/static behavior of the design without regard to the dynamic behavior of the fluid within the device. Examples of active fluidic components include valves and pumps which act on the fluid. A fixed channel is an example of a passive fluidic component. Functional libraries 362 for the component models are provided for each component (FIG. 1). In one embodiment the component functional models are computer programs written in C, C++, VHDL, Verilog, Verilog-A, VHDL-AMS, or Verilog-AMS, and are executed by a commercial simulator, such as from Synopsys, Inc. of Mountain View, Calif., or Cadence Design Systems, Inc. of San Jose, Calif.

Figure 14:
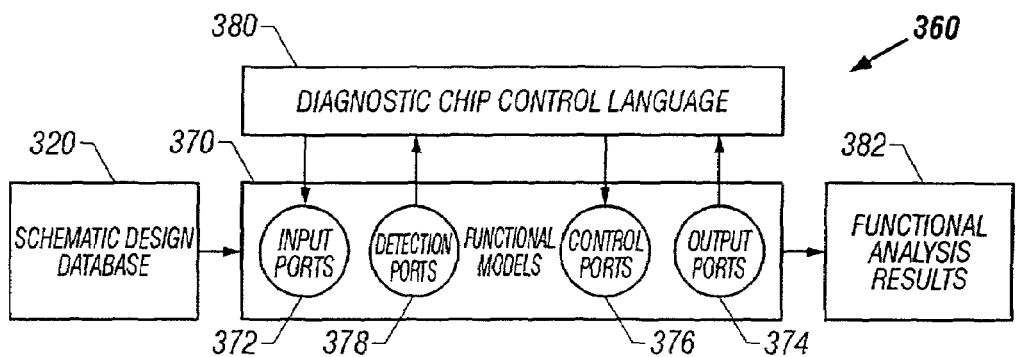
FIG. 14 shows a simplified block diagram for the connected component functional models of the functional analysis of the MCAD system of an embodiment of the present invention.

FIG. 14 shows a block diagram for the connected component functional models of the functional analysis 360 of the MCAD system 10 according to an embodiment of the present invention. Components are extracted from the schematic design database 220 and are used to select the associated component functional models from the functional simulation library 362 (FIG. 1). These component functional models are connected together as given by the schematic design database 220 for the microfluidic circuit being simulated.

In one embodiment of the present invention, the logical fluidic flow simulation 366 simulates the control logic of the active microfluidic components (FIG. 1). The purpose is to give an initial validation of the logic control 364 and to insure proper connectivity in the microfluidic circuit. In this case the functional models in the functional simulation library 362 includes models defined as Boolean expressions with operands based on the control port(s) 376 of the active component which control connections to the input ports 372 and the output ports 374. Valid Boolean operators are as follows: *=AND, +=OR, ^=XOR, !=NOT.

For example, a simple valve component with a single input port and a single output port and a control port can be defined as follows:

| Functional Model Valve | |
|---|---|
| Port I: | input |
| Port O: | output |
| Port C: | control |

O = I * C
Input = I, Output = O, Control = C

When C=H (or '1'), then the output O gets the input I. When C=L (or '0'), then O=L regardless of the value of the input I.

Logical fluidic flow simulation 366 of the logic control 364 of the testing apparatus that will actuate the active components (FIG. 1) is created using the diagnostic device control language or diagnostic chip control language (DCCL) 380, as shown in FIG. 14. The DCCL 380 is a simple Boolean based language with timing constraints that can generate control signals to simulate actuation of the device's active components and read and log data from detection ports 378 of the functional models 370. Any additional physical characteristics of the control and input signals can be included for the physical simulation but are ignored in the functional simulation. Consequently, the same DCCL program can be used in the actual testing when the device is ultimately fabricated and put into use by the user. The results of the simulation are shown in the functional analysis results 382 and are displayed as a series of square waves that indicate valve position, path connectivity, detection, control signal generation, etc.

In another embodiment the functional models are VHDL or Verilog models. A valve can be represented by the VHDL expression:

$O <= I$ and $C$ after 5 μsec;

where "and" is a Boolean operator and there is a delay of 5 μsec before the result of the and operation is assigned to O. The DCCL of the above embodiment is represented in this embodiment as a typical VHDL test bench. As seen in FIG. 14 the test bench supplies over time the inputs to some of the input ports 372, primarily to the input ports 372 associated with the inputs to the microfluidic circuit given by the connected functional models 370. The test bench analyzes the output ports 374 associated with the outputs of the microfluidic circuit given by the connected functional models 370. The test bench also monitors intermediate points in the connected functional models 370 by monitoring various detection ports 378. The functional analysis results 382 may be displayed by a commercial VHDL simulator as timing diagrams or waveforms.

In yet another embodiment VHDL-AMS or Verilog-AMS is used to represent the Functional Models 370. The inputs into the control ports 376 are typically digital, while the functional transformation of values from the input ports 372 to the output ports 374 are given by analog functions. Thus a first order dynamic analysis may be done. This allows an intermediary analysis between the static connectivity analysis and the physical analysis 800 given by phase 6 (FIG. 1).

In a further embodiment an analysis of the fluid flow only may be performed in a way similar to that for passive microfluidics (see "Passive Microfluidics—Ultra-Low-Cost Plastic Disposable Lab-On-A-Chips," by Bernard H. Weigl, et. al., in Proceedings of Micro Total Analysis Systems 2000, Dordrecht, Netherlands: Kluwer Academic Publishers, 2000, p. 299). Assuming the fluid is flowing through the fluid channels and the pertinent control channels are turned on, the microfluidic circuits may be represented by analog electrical components, such as capacitors, resistors, and inductors, to predict fluid flow rates. Diffusion and chemical reactions may be calculated using finite element analysis. Thus an initial analysis of the fluid flow and fluid mixing through the fluid microcircuits may be obtained. This again is neither a static nor a full dynamic analysis, but somewhere in between, i.e., an intermediary analysis.

Physical Implementation (Phase 4)

Figure 15:
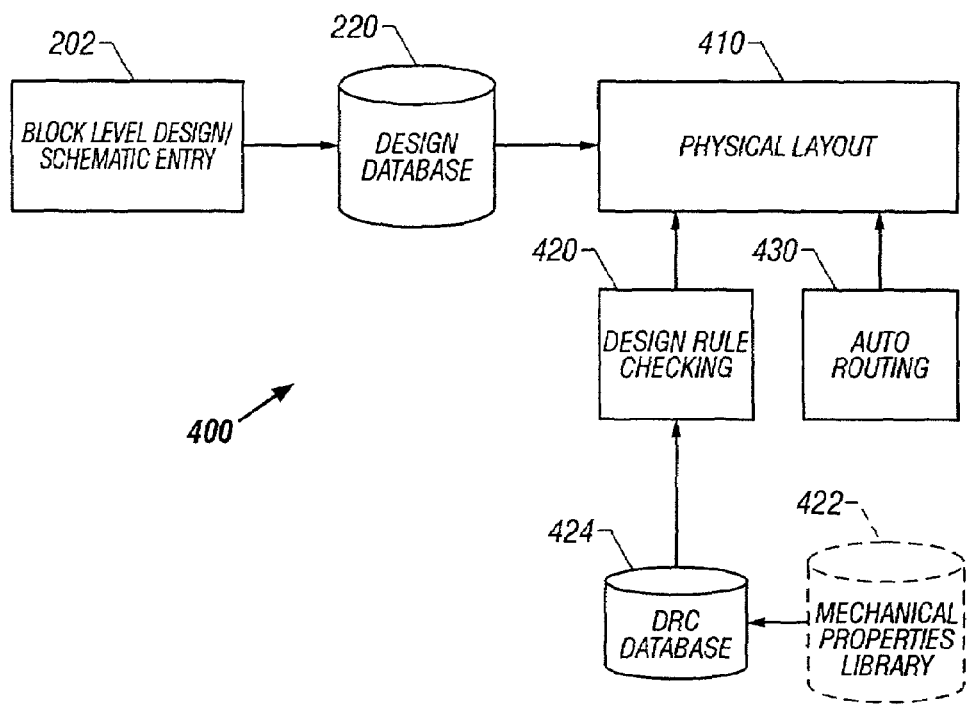
FIG. 15 shows a simplified block diagram of the physical implementation of an embodiment of the present invention.

Once the schematic design has been completed and functionally tested, the physical implementation of the schematic into a physical layout takes place. FIG. 15 shows a block diagram of the physical implementation 400 according to an embodiment of the present invention. The design database also is developed based on the schematic entry 202, as shown in FIG. 8 and described above. The design database 220 represents the interconnected components which are then assigned to physical layers, via a place and route routine, either automatically or manually.

While a tool such as AutoCAD® from Autodesk, Inc. of San Rafael, Calif., may be used to physically lay out a microfluidic circuit, it has several disadvantages. AutoCAD® has no drawing constraints as it is a general tool. Hence, for example, a control channel can overlap a fluid channel causing an unwanted parasitic valve. While this tool is capable of multiple layers, components are typically drawn on one layer only. Manipulation of a multilayered component presents serious difficulties. AutoCAD® does not have the concept of an I/O port and connectivity to an I/O port. Again since AutoCAD® is a general CAD program, there is no design information associated with a component such as functional information. Embodiments of the present invention overcome these disadvantages of AutoCAD® and other similar tools, and provide a system in which a microfluidic circuit can be easily and efficiently created using multilayered microfluidic components on a physical layout. There are two primary aspects to the physical layout 410 of the microfluidic circuit or system or device. The first is component placement and the second is the routing of the interconnections between the placed components.

Components can be either manually or automatically placed in the MCAD system's placement tool. The placement tool includes one or more of the following functions: allowing the grouping of components by connectivity by layer and/or by cross layer (3D grouping); placing components based on design rule constraints (DRC) in the DRC database 424 from set mechanical properties per layer provided in the mechanical properties library 422; performing design rule checking 420; allowing for grid and gridless placement of components; highlighting DRC errors; performing layer to layer shrinkage compensation for placements; and/or reading and writing the DWG, DXF, or other appropriate file formats.

Examples of DRC's include checks on I/O placement, channel size mismatch, dangling channels, overlapping components & channels, and channel spacing.

Figure 16A:
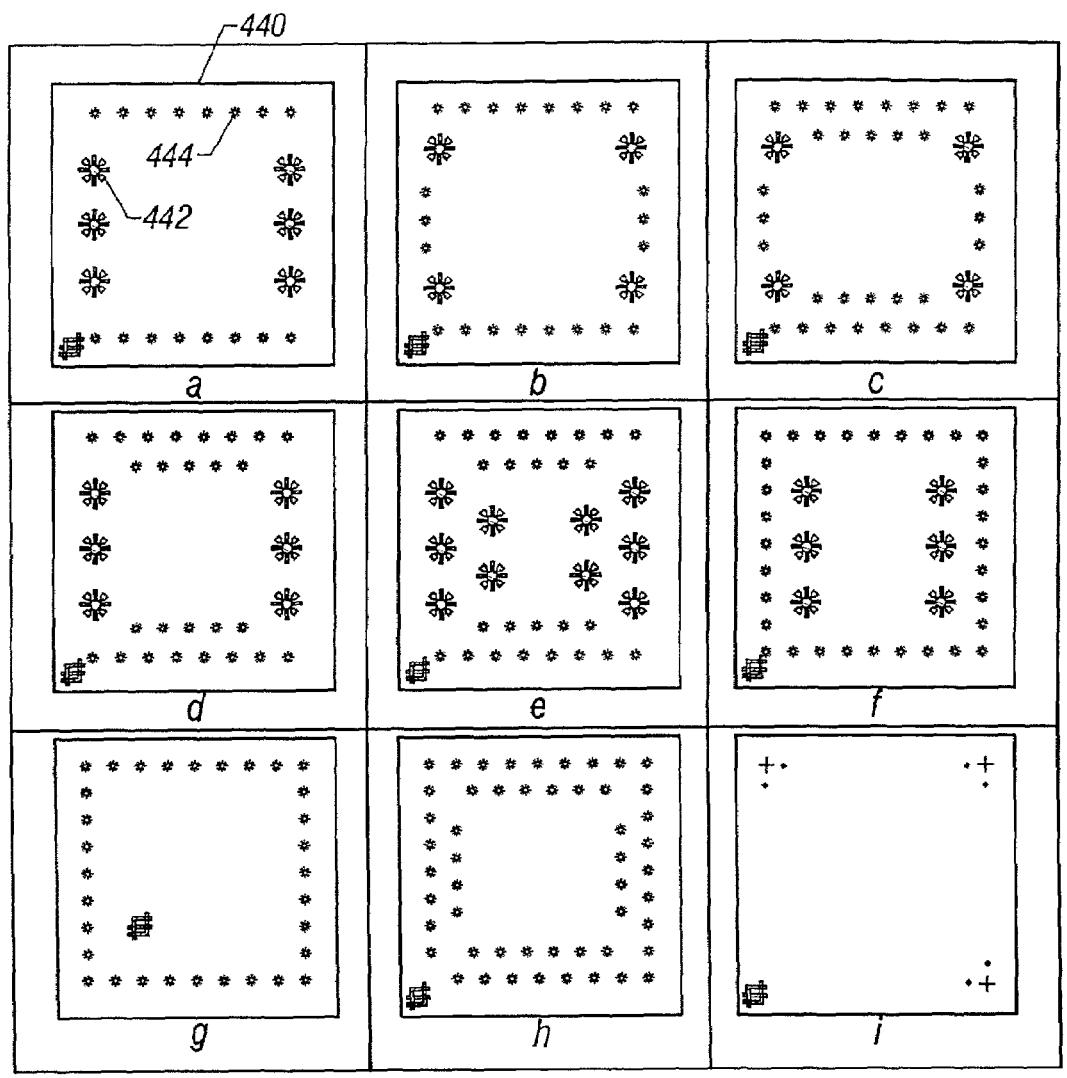
FIGS. 16A and 16B give examples of pre-defined templates of an embodiment of the present invention.
Figure 16B:
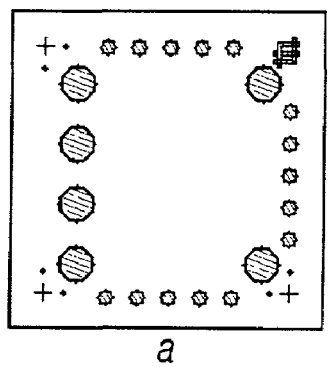
Figure 16B:
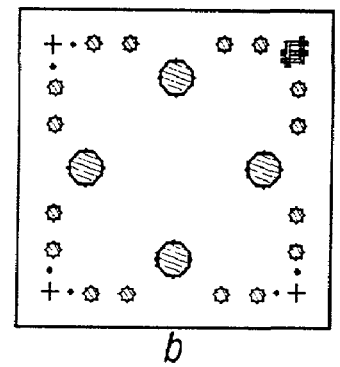
Figure 16B:
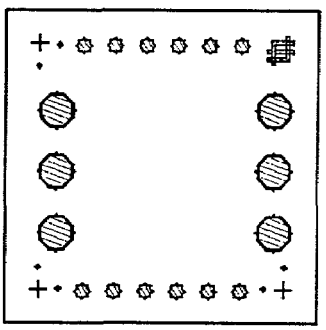
Figure 16B:
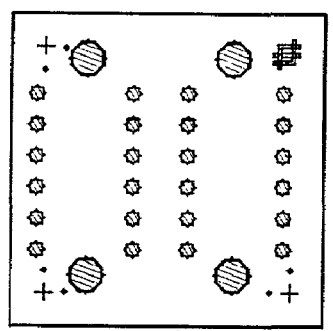
Figure 16B:
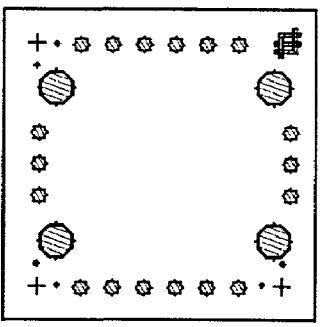
Figure 16B:
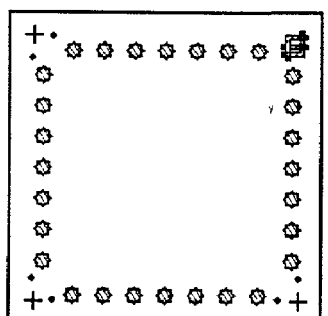

An I/O placement rule may restrict a user to a set of pre-defined templates having pre-defined I/O ports. FIGS. 16A and 16B give examples of pre-defined templates of an embodiment of the present invention. For example, a template 440 may correspond to a microfluidic chip that is approximately a 20 mm×20 mm square in size and about 4 mm thick. The I/O ports 442 and 444 correspond to a large via about 3 mm and a small via about 625 μm, respectively. In an alternative embodiment the user may create his/her own template and may place the I/O ports on the user-designed template.

A channel size mismatch rule allows checks for component channels (i.e., channels that are part of the component) to connecting channel having size mismatch and channel-to-channel size mismatch.

A dangling channel checking rule checks for two or more unconnected ports per component channel (only one end of a component channel need be connected) and for only one connected port on a user drawn channel (both ends of channels must be connected).

An overlapping channels rule allows checking for overlapping user drawn fluidic and control channels. There is an error for any overlapping channels. If there is auto-bridging then one or both channels are re-shaped at and within a predefined distance of the overlap point and no error occurs. Other overlapping components & channels rules check for overlapping channels on the same layer and overlapping components on the same layer or on another layer. Again if there is auto-bridging, two overlapping channels on the same layer may be corrected by routing one channel to another layer and back again using vias.

A channel spacing rule checks for minimum spacing between adjacent channels of a predetermined width. For example, there may be required a minimum of 30 μm between adjacent 120 μm width channels, a minimum of 50 μm between adjacent 100 μm width channels, and a minimum of 70 μm between adjacent 80 μm width channels, Next the interconnections between the placed components can be either manually or automatically done in the MCAD system's routing tool. The routing tool includes one or more of the following functions: definition of routing cross-sectional profiles; auto-routing 430 for similarly pitched components—grid or gridless; optimization of routing corners: right angle, radius, etc.; relocation of routing to other layers; layer to layer shrinkage compensation; and/or auto-bridging either intra or inter layer, where inter-layer bridging is done using vias.

In an embodiment of the present invention there are two types of bridging performed by the auto routing 430 (FIG. 15). The first type is an interconnect bridge channel which is used when a control channel on one layer overlaps a fluid channel on an adjacent layer. The interconnected bridge channel prevents the fluid channel from being closed when the control channel is activated. The second type is needed, when there is a crossing between a first and a second channel on the same layer. This type of bridge uses vias to reroute the first channel to another layer to detour around the second channel.

FIG. 17A shows the physical dimensions for an interconnect bridge channel 460 of an embodiment of the present invention. The interconnect bridge channel has channel width 462 and channel length 464. Both ends of the interconnect bridge channel have widths greater than the middle portion with one end having interconnect width 466 and the other and having interconnect width 468.

FIG. 17B shows a symbol for an interconnect bridge of one embodiment of the present invention. The fluid channel 470 is on a first layer with ends 472 and 474. The control channel 476 is on a second adjacent layer with ends 480 and 478. The control channel 476 is an interconnect bridge similar to that shown in FIG. 17A and it overlaps the fluid channel 478 at overlap area 482. The control channel 476 goes from a first channel width at end 478 through a taper element to a narrow channel width and through a taper element back to the first channel width at end 480. The fluid channel 470 is tapered in the middle near overlap area 482. The tapering is done to reduce the ability of the control channel to inhibit the flow in the fluid channel 470. The control channel 476 when activated does not stop the flow through fluid channel 470 and thus effectively bridges the fluid channel 470.

FIG. 18A shows a crossing of two channels located on the same layer. In order to get from point 485 to point 488 and from point 486 to point 489 without going around any of the points, channels 490 and 492 must cross. In order to prevent this crossing, channel 490 must be detoured to another layer (alternately channel 492 could be detoured).

FIG. 18B shows an interconnect bridge channel using vias of an embodiment to of the present invention. From point 485 channel 491 on layer 496 is detoured through a via 493 to an adjacent layer 498 to channel 495. Channel 495 on layer 498 goes underneath channel 492 and then goes backup through via 494 to channel 497 to point 488. Thus channel 492 is bridged using another, but not necessarily adjacent, layer. In another embodiment channel 492 is detoured around channel 490.

Figure 19:
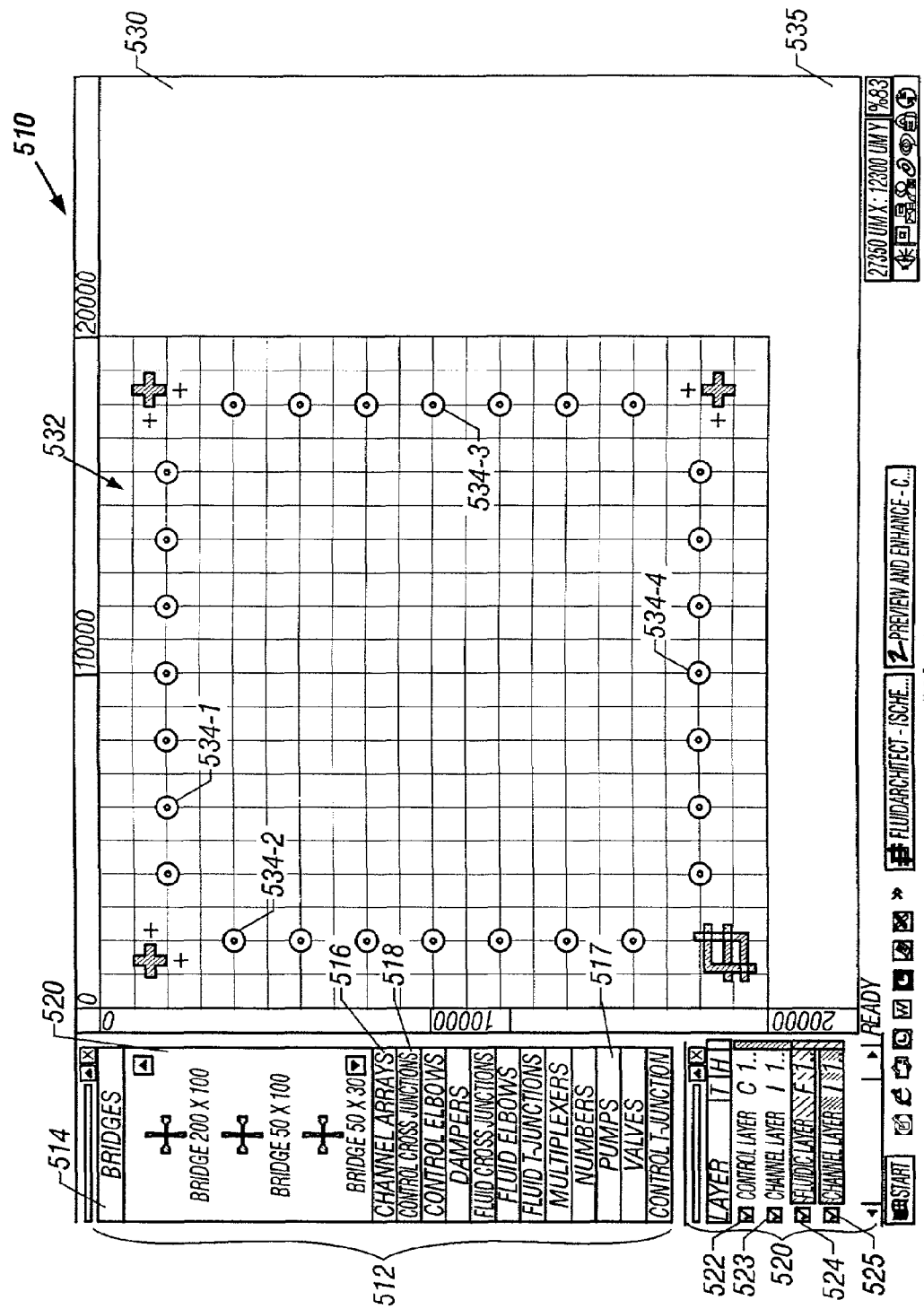
FIG. 19 shows a physical layout tool of one embodiment of the present invention.

FIG. 19 shows a physical layout tool according to one embodiment of the present invention. Typically, the difference between the design schematic capture 200 (phase 2) and the physical layout schematic 400 (phase 4) is that the former shows interconnected functional components without regard to placement on a template, while the latter takes into account the physical location on a template. In the physical layout 410, the physical characteristics of a microfluidic component are just as important as the functional characteristics of a component (both active and passive). In a schematic capture the symbols representing a component may be abstracted (e.g., FIG. 10) and the symbols are placed and connected, and no physical routing takes place. Also the placement in the schematic is not necessarily related to where the microfluidic component is physically located in the manufactured microfluidic chip or device. In a physical layout where the microfluidic component is placed is related to where the component is physically located. And routing places channels between microfluidic components to physically connect them.

For this embodiment, phase 1 to phase 3 are not performed and the user begins with phase 4. In this embodiment, the basic library 206 and macro library 210, which together include the components for the physical layout 410, feed the layout tool 510 directly and the schematic entry 202 is bypassed. In FIG. 19 the layout tool 510 displayed includes a component library area 512, a layer area 520, an active drawing area 530 and status bar 535.

The component library area 512 includes the library components, represented by symbols, that are available for the layout design. To select the portion of the library desired, one simply left clicks on the title of the portion (e.g., bridges 514, channel arrays 516, or pumps 517), and the components are displayed (e.g., active area 520 of bridges 514). If more than one component is present in the active area the up or down button is used to scroll through them. Once the proper component is found, one may left click the mouse button and hold and drag the component into the active drawing area 530 and release the button to place the component in a desired location.

Figure 20:
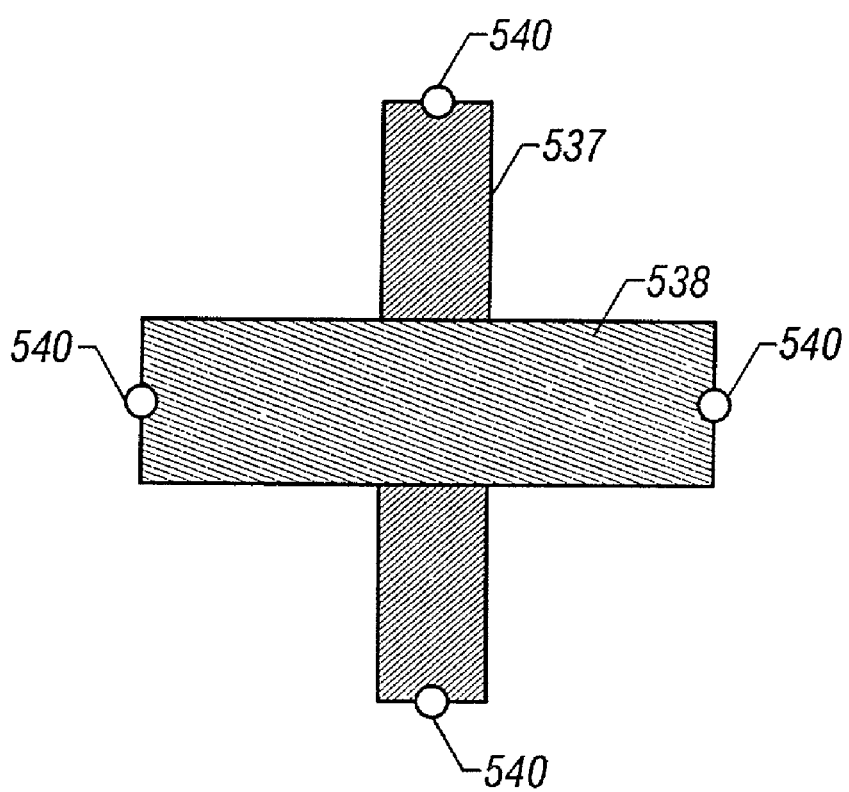
FIG. 20 shows a symbol for a microfluidic valve of one embodiment of the present invention.

A library component is typically composed of channels. Some components have channels only on one layer while some have channels on two or more layers. FIG. 20 shows a symbol for a microfluidic valve of one embodiment of the present invention. The black line 537 represents a fluid channel present on the fluidic layer while the gray line 538 represents a channel on the control layer. The colors have been picked for illustration purposes only and other colors such as blue for a fluid channel and red for a control channel are equally acceptable. The connection ports 540 are points where connections from other components or channels are allowed to be made with the valve component. Additional examples of the symbols or icons for the microfluidic components are provided in Appendices A and B which are herein incorporated by reference.

The layer area 520 in FIG. 19 indicates the coloring/shading of the layers as well as the different channel heights that are available in the particular layer. For example, control layer 522 and fluidic layer 524 are selected and thus both fluidic and control channels are shown in active drawing area 530. There are two categories of layers: primary layers, e.g., control layer 522 and fluidic layer 524, and channel layers, e.g., 523 and 525, in FIG. 19. The primary layer has a type, such as control or fluid, and includes one or more channel layers, e.g., control layer 522 has one channel layer 523, and fluid layer 524 has one channel layer 525. Channel layers inherit their type from their parent primary layer. Channel layers own channels, for example, drawn by the user or by auto-routing, in the active drawing area 530. Channels in a component, when placed on the drawing area 530, are linked to these user (or auto-route) drawn channels in the corresponding channel layer via the associated primary layer.

The active drawing area 530 is where components from the component library area 512 are placed and connected together using the drawing tools. In one embodiment the active drawing area includes a predefined template 532. The predefined template 532 has a plurality of I/O ports, for example 534-1, 534-2, 534-3, and 534-4. the components in component library area 512 are placed and connected on this template 532. Also connections are made from the connected components to the I/O ports.

The status bar 535 has two modes for the drawing area 530. One mode for the drawing area is the select mode (shown in FIG. 19) and the other is the channel drawing mode (not shown). In the select mode the status bar includes the following information: (1) Left Status Box: Component Name; (2) Center Status Box: Absolute Cursor Location (in microns); and (3) Right Status Box: Percentage Zoomed In. In the drawing mode (not shown) the status bar includes the following information: (1) Left Status Box: Length of channel drawn (in microns); (2) Center Status Box: Absolute Cursor Location (in microns); and (3) Right Status Box: Percentage Zoomed In.

Figure 21:
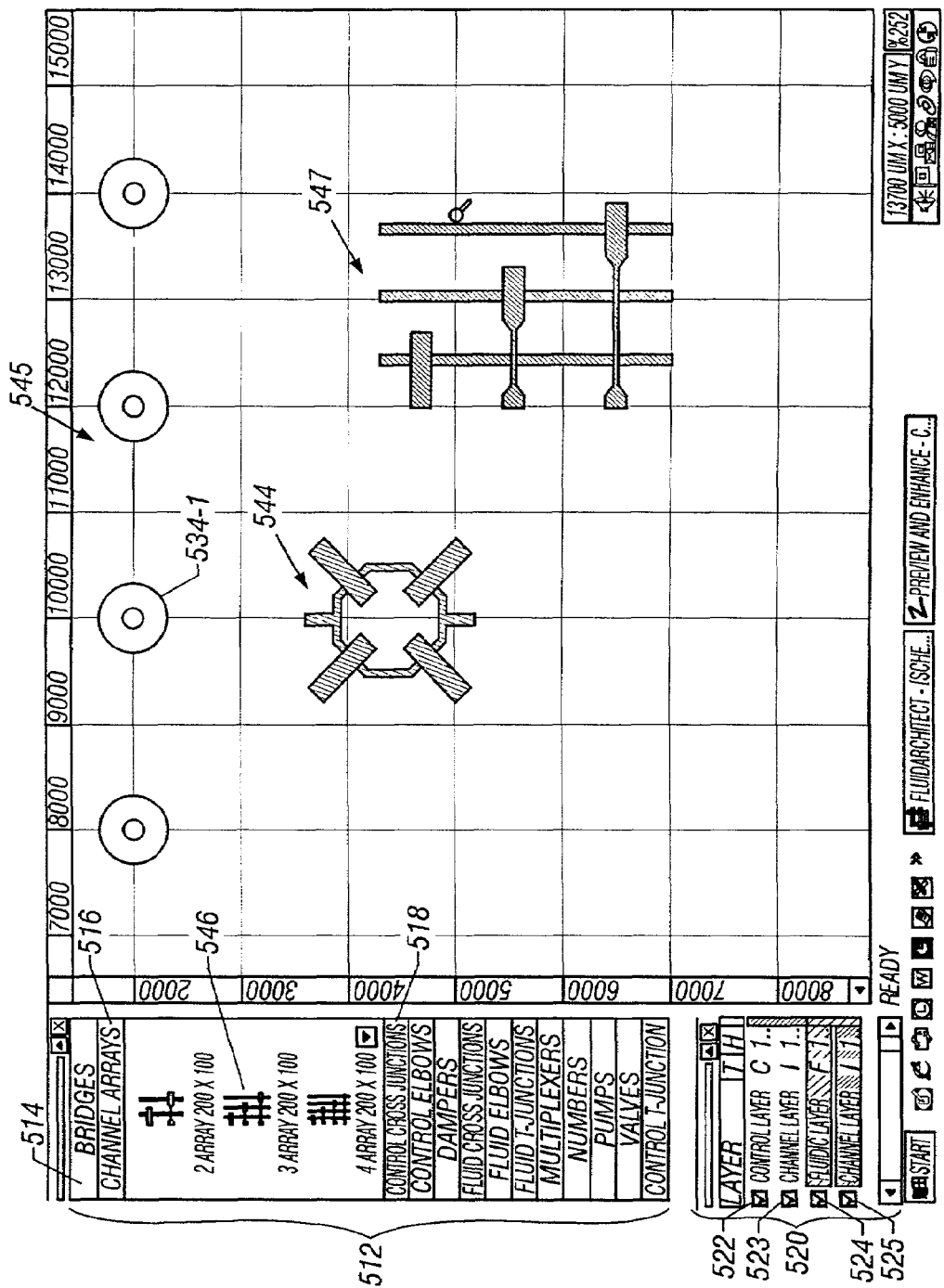
FIG. 21 shows two components of an embodiment of the present invention.
Figure 23:
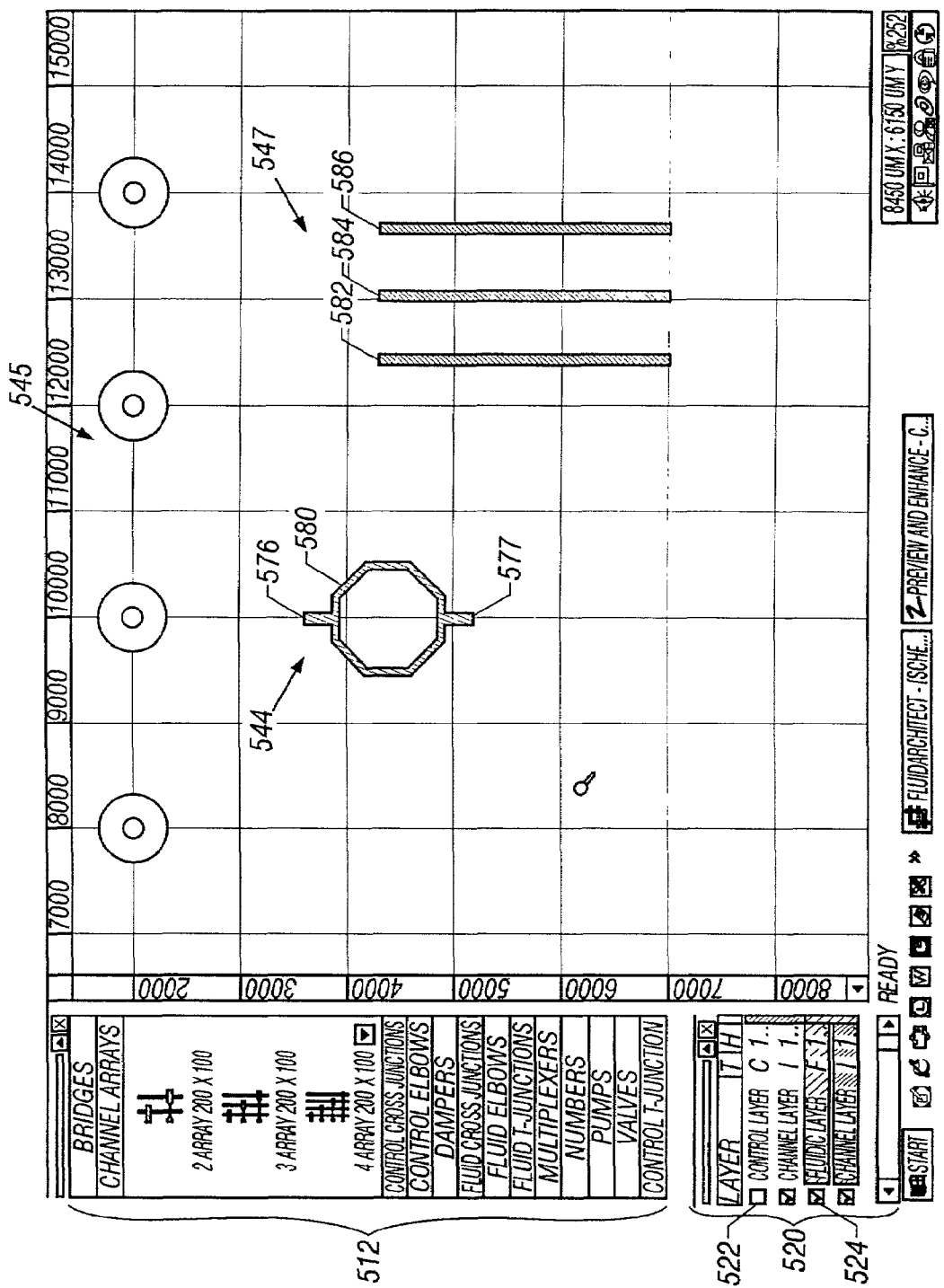
FIG. 23 shows the fluid channels for the fluid layer for the two components of FIG. 21.

FIG. 21 shows two components of an embodiment of the present invention. The two components shown on an expanded template area 545 are a rotary pump 544 and a channel array 547. The rotary pump 544 shown has a fluid channel 580 and two fluid ports 576 and 577 (FIG. 23). The rotary pump 544 is provided for mixing and incubating solutions by employing one or more pumps to flow solution around a circular flow channel. See, e.g., Stephen R. Quake and Axel Scherer, "From Micro- to Nanofabrication with Soft Materials," Science 290: 1536–40 (2000). The three channel array 547 provides a set of individually addressable flow lines 582, 584, and 586 (FIG. 23). The number of control lines is equal to the number of fluid lines for this array component. The flow of the liquid within the array can be controlled by actuating the necessary control lines.

Figure 22:
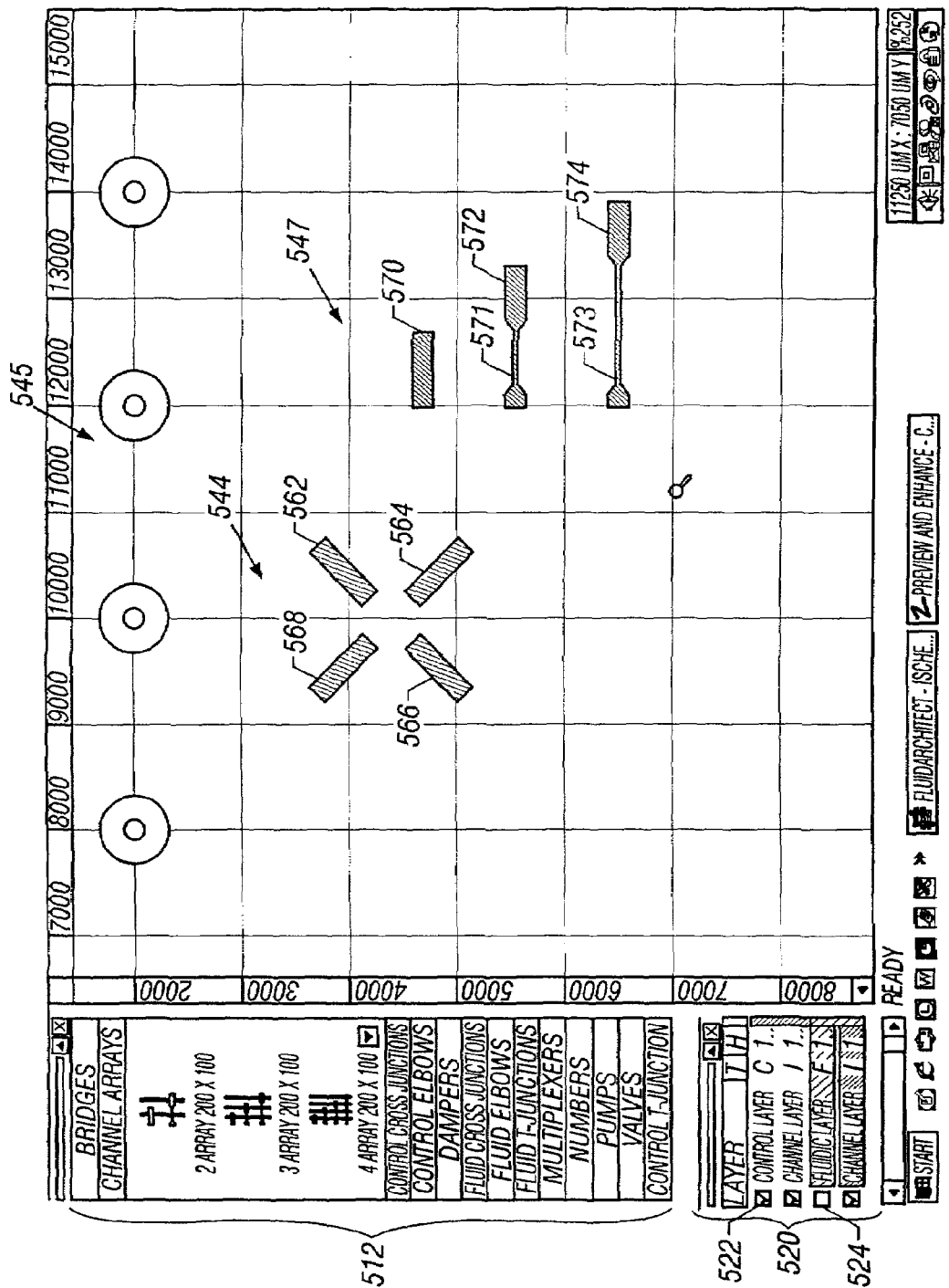
FIG. 22 shows the control channels on the control layer for the two components of FIG. 21.

FIG. 22 shows the control channels on the control layer for the two components of FIG. 21. In the layer area 520 the fluidic layer 524 is not selected and the control layer 522 is selected. This allows only the channels on the control layer to be viewed on the active drawing area 530. For the rotary pump 544 the control channels are 562, 564, 566, and 568. For the channel array 547 the three control channels are 570, 572, and 574. Channels 572 and 574 have narrow channel regions 571 and 573, so that the fluid channel 582 in the case of control channel 572 and the fluid channels 582 and 584 in the case of control channel 574 are not shut when control channel 572 or 574 is activated.

FIG. 23 shows the fluid channels for the fluid layer for the two components of FIG. 21. In the layer area 520 the fluidic layer 524 is selected and the control layer 522 is not selected. This allows only the channels on the fluid layer to be viewed on the active drawing area 530. For the rotary pump 544 there is one fluid channel 580 with two I/O ports 576 and 577. For the channel array 547 there are three fluid channels 582, 584, and 586.

Figure 24:
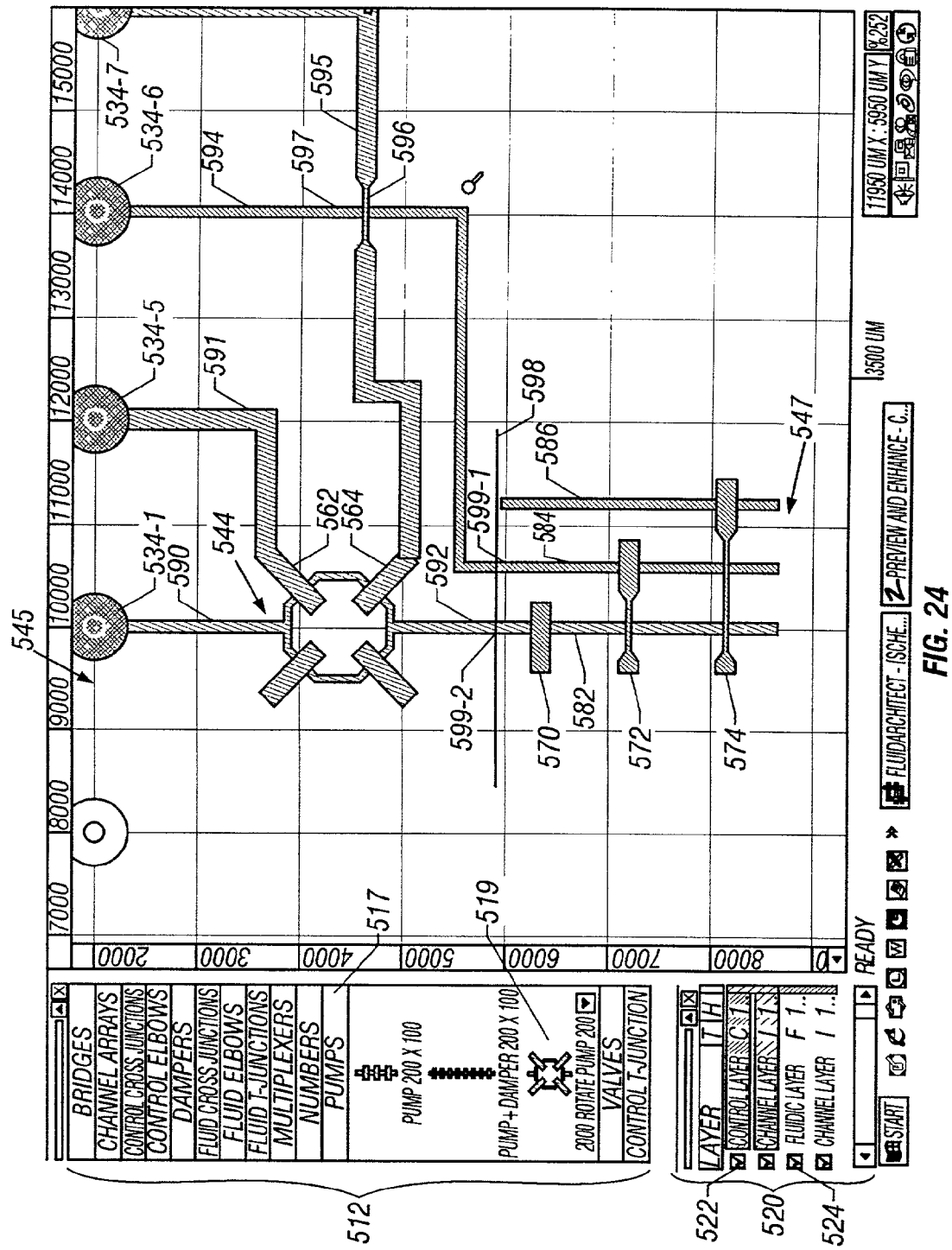
FIG. 24 shows a partially connected layout of a microfluidic circuit having a rotary pump and a channel array of an embodiment of the present invention.

FIG. 24 shows a partially connected layout of a microfluidic circuit having a rotary pump 544 and a channel array 547 according to an embodiment of the present invention. In the layer area 520 both the control layer 522 and the fluidic layer 524 have been selected. Hence both control and fluid channels are displayed on expanded template area 545. I/O port 534-1 is connected to the array pump 544 via fluid channel 590. Rotary pump 544 is connected to channel array 547 via the fluid channel 592. Channel array 547 also receives input from I/O port 534-6 via fluid channel 594. Control channels for rotary pump 544 include control channel 591 from I/O port 534-5 and control channel 595 from I/O port 534-7. Control channel 595 is tapered to a narrow channel 596 to bridge fluid channel 594 (interconnect bridge of FIG. 17B). Fluid channel 594 may also be tapered to a narrow fluid channel 597 to further insure that control channel 595 does not shut off fluid channel 594 when control channel 595 is activated.

In one embodiment, if a user tries to draw a control channel 598 as shown in FIG. 24, a design rule check gives an error that valves are formed at the overlap points 599-1 and 599-2. The user is not allowed to add control channel 598 to expanded template area 545. in another embodiment interconnect bridges would automatically be formed at overlap points 599-1 and 599-2.

Figure 25:
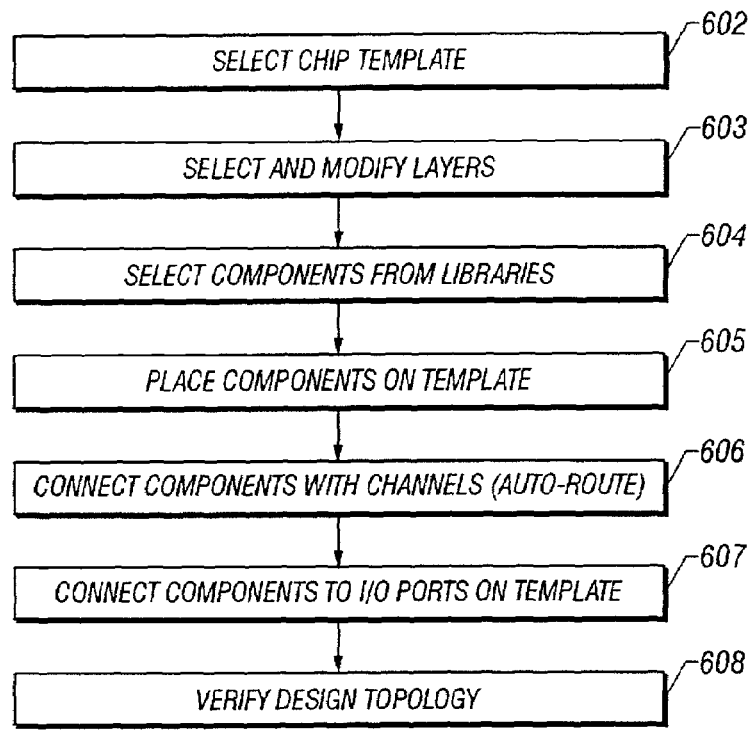
FIG. 25 shows a simplified flowchart having the steps involved in the physical layout of a microfluidic circuit of an embodiment of the present invention.

FIG. 25 shows a flow chart having the steps involved in the physical layout of a microfluidic circuit according to an embodiment of the present invention. At step 602 a chip template is selected from, for example, a plurality of templates such as those shown in FIGS. 16A and 16B. The layers, including the control and fluid layers, are selected and modified (step 603). At step 604 components are selected from the component library area 512 (FIG. 19). At step 605 these components are placed on the template. The placed components are connected (step 606), either manually or via an auto-route routine by channels. For example, the components' control channels are first connected together on the control layer using control channels. Next the components' fluid channels are connected together on the fluid layer using fluid channels. At step 607 some of the components are connected to the I/O ports on the template. At step 608, the design topology of the microfluidic circuit may be manually or automatically verified.

In one embodiment the control channels are not connected to the fluid channels. In another embodiment, although the control channels may be on different layers than the fluid channels, they may be connected to the fluid channels by vias.

Figure 26:
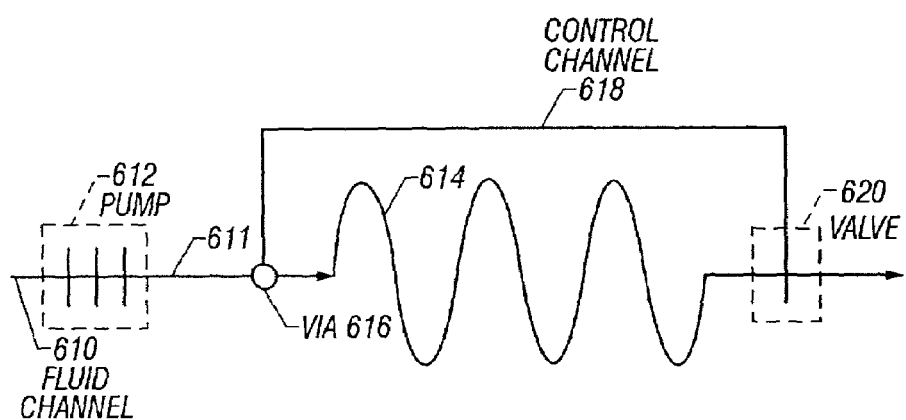
FIG. 26 shows a simplified view of a pressure oscillator structure of one embodiment of the present invention.

FIG. 26 shows a pressure oscillator structure of one embodiment of the present invention. The pressure oscillator operates analogously to oscillator circuits frequently employed in the field of electronics. The pressure oscillator includes a fluid channel 610 which has an initial portion 611 proximate to a pressure source 612, and a serpentine portion 614 distal from pressure source 612. Initial portion 611 is in fluid communication, through via 616, with control channel 618 formed above the level of fluid channel 610. At a location more distal from pressure source 612 than via 616, control channel 618 overlaps, but is separated from, fluid channel 610, thereby forming a valve 620.

The pressure oscillator structure operates as follows. Initially, pressure source 612 provides pressure along fluid channel 611 and control channel 618 through via 616. Because of the serpentine shape of flow channel 614, pressure is lower in region 614 as compared with control channel 618. At valve 620, the pressure difference between serpentine flow channel portion 614 and overlying control channel 618 eventually causes valve 620 to close. Owing to the continued operation of pressure source 612, however, pressure begins to build up in serpentine flow channel portion 614 behind closed valve 620. Eventually the pressure equalizes between control channel 618 and serpentine flow channel portion 614, and valve 620 opens. Given the continuous operation of the pressure source 612, the above-described build up and release of pressure will continue indefinitely, resulting in a regular oscillation of pressure. Such a pressure oscillation device may perform any number of possible functions, including but not limited to, timing.

Figure 27:
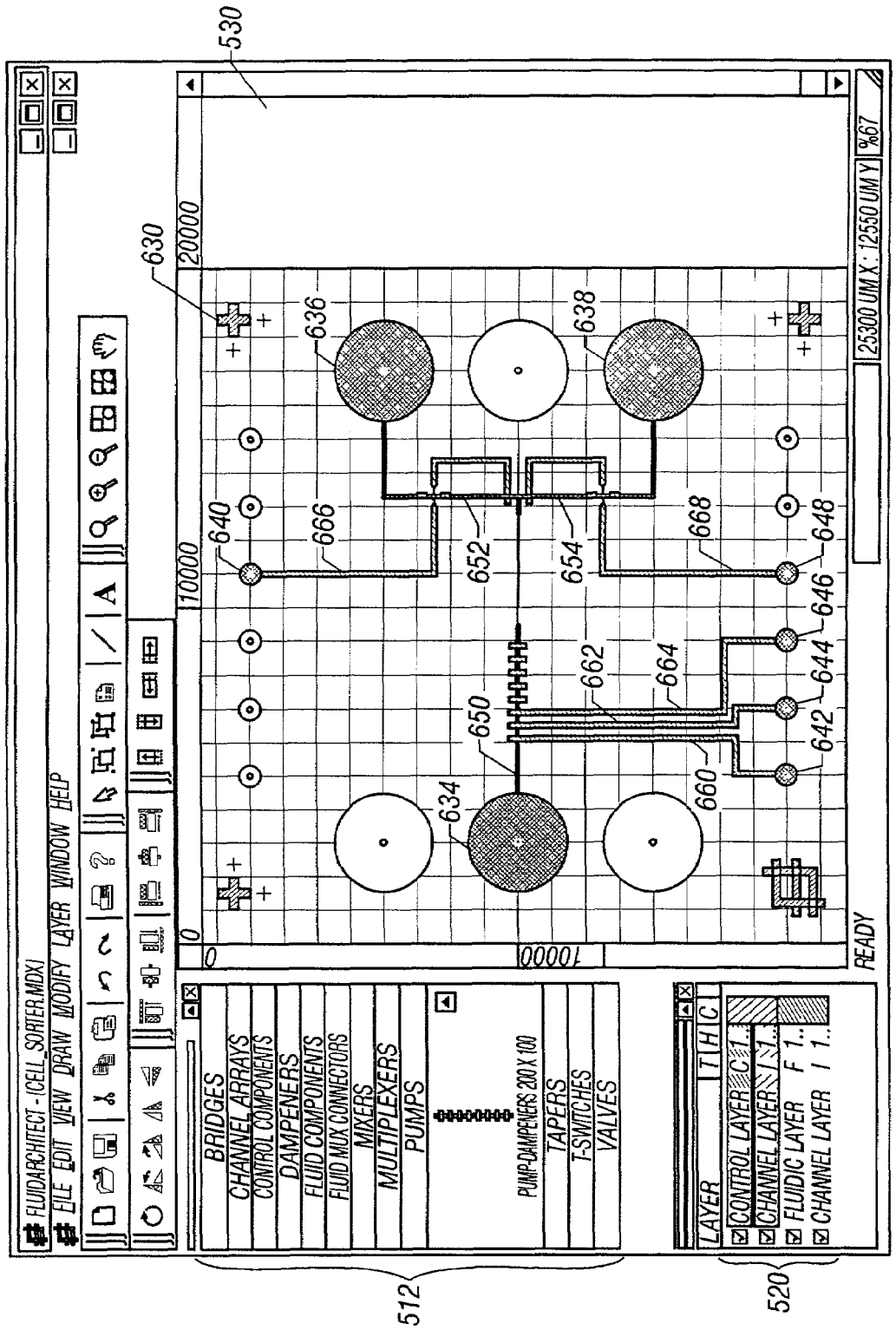
FIG. 27 shows a physical layout of a cell sorter of an embodiment of the present invention.
Figure 28A:
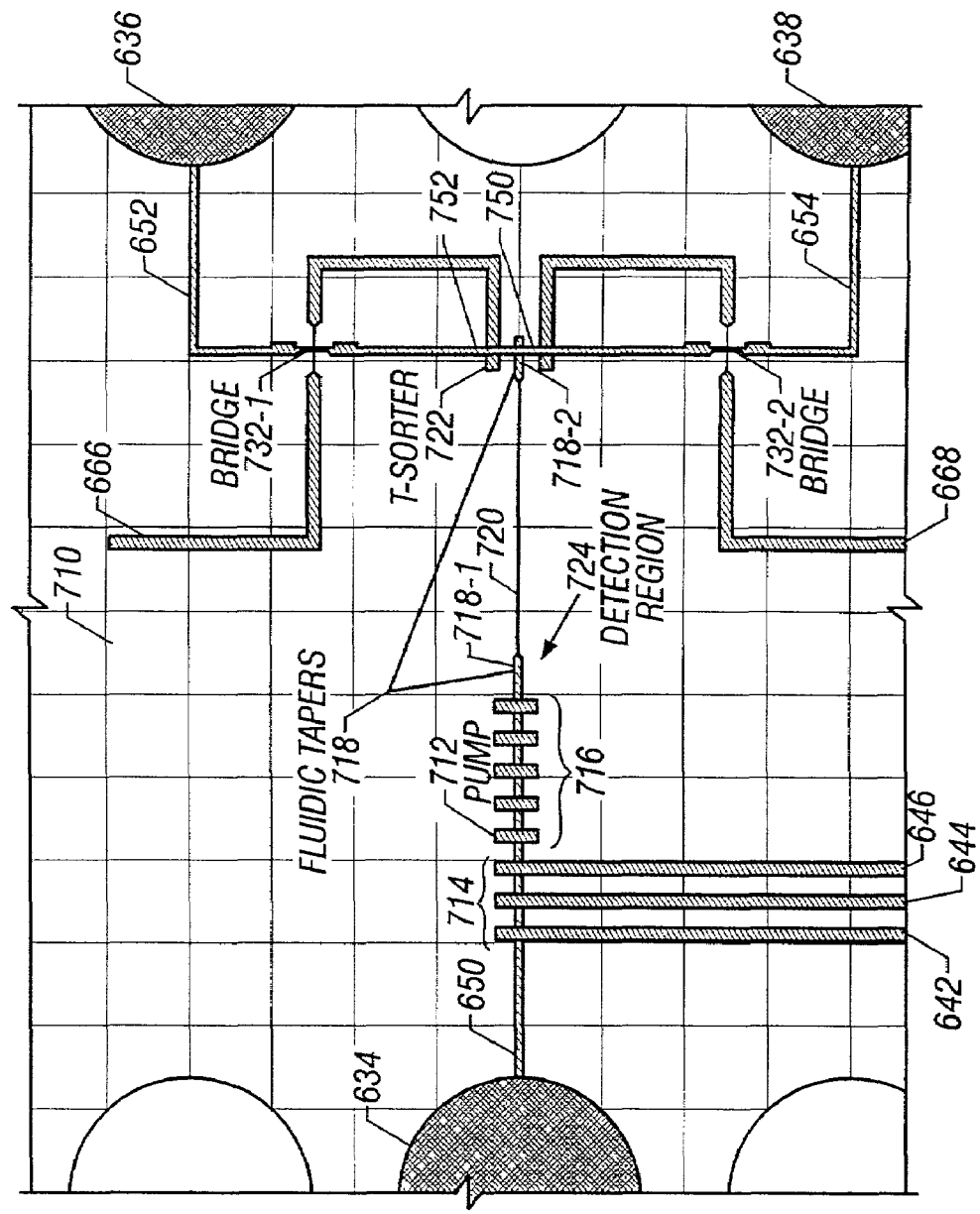
FIG. 28 shows an expanded view of the physical layout of the cell sorter of an embodiment of the present invention.
Figure 28B:
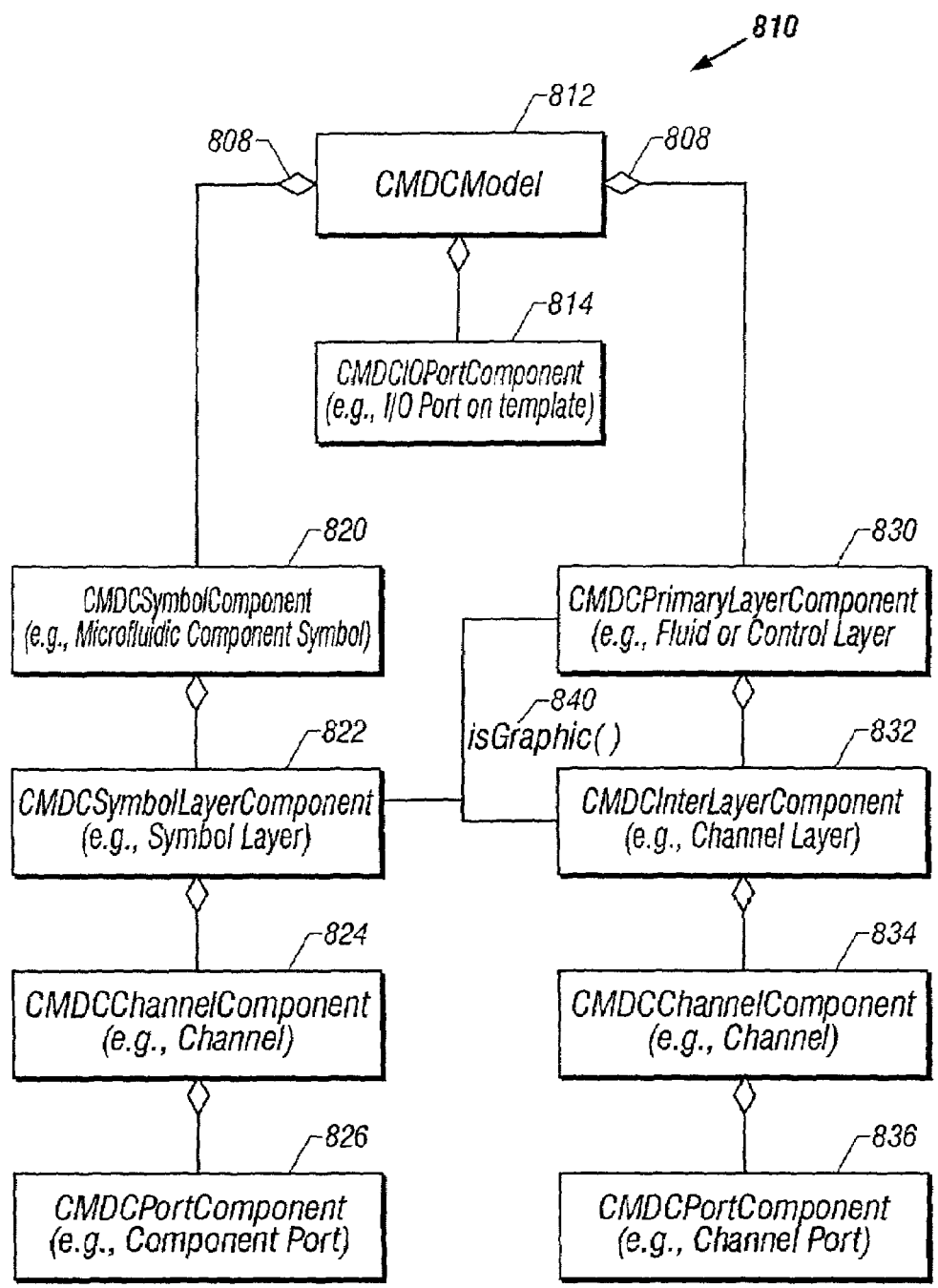

An illustration of an application developed using the physical layout tool of FIG. 19 and the steps of FIG. 25 is a cell sorter shown in FIGS. 27 and 28.

FIG. 27 shows a physical layout of a cell sorter of an embodiment of the present invention. The template 630 is located in active drawing area 530 and has one fluid input port 634, two fluid output ports 636 and 638, and five control input ports 642, 644, 646, 648, and 640. Fluid input port 634 is connected to fluid channel 650. Fluid channel 650 forks to fluid channel 652 and fluid channel 654. Fluid channel 652 is connected to output port 636 and fluid channel 654 is connected to output port 638. Input control port 642 is connected to control channel 660. Input control port 644 is connected to control channel 662. Input control port 646 is connected to control channel 664. Input control port 648 is connected to control channel 668. Input control port 640 is connected to control channel 666.

FIG. 28 shows an expanded view 710 of the physical layout of the cell sorter of an embodiment of the present invention. A pump 712 includes a peristaltic pump 714 and a damper element 716. The pump 712 includes a peristaltic pump 714 which is composed of three individual valves with control channels 642, 644, and 646. The liquid within the fluid channel 650 is pumped by sequentially actuating the individual valves. The damper element 716 is used to provide a smoother flow of pumped fluid. The membrane of the damper element 716 will deflect and absorb the energy caused by the closing of the valves of the peristaltic pump 714. The fluid from fluid input port 634 is pressurized by pump 712 and enters, via a fluidic taper 718-1, a narrow channel 720 which is a detection region 724. The narrow channel 720 is connected to a T-sorter 722 by another fluidic taper 718-2. The fluid in the T-sorter 722 either proceeds to the fluid output port 636 or the fluid output port 638, depending on whether control channel 666 or control channel 668 is activated.

The microfluidic circuit of FIGS. 27 and 28 is laid out according to the steps given in FIG. 25 as follows. First a template 630 is selected (step 602) and placed in drawing area 530. The template has six large I/O ports (e.g., I/O ports 634, 636, and 638 of 3 mm in size) and 12 small I/O ports (e.g., I/O ports 640, 642, 644, 646, and 648 of 625 µm in size). Next at step 603 the layers are selected in layer area 520. From the component library area 512 (FIG. 19), one pump 712, one T-sorter 722, two fluidic tapers 718, and two interconnect bridges 732-1 and 732-2, are dragged and dropped on the template 630 as shown in FIG. 28 (steps 604 and 605). Step 606 has two parts, and involves first connecting the fluid channels of the components by drawing fluid channels on the fluid layer, and second connecting the control channels of the components on the control layer (in this case the connections are only to the template's I/O ports). When the fluid layer is selected, the pump 712 is connected to a first fluid taper 718-1, and via a narrow channel 720 to a second fluid taper 718-2 (see FIG. 28). The narrow fluid channel is created by drawing a normal fluid channel with default width of, for example 100 µm, and then selecting a new channel width of, for example, 30 µm. The second fluid taper 718-2 is connected to the T-sorter 722. At step 607 the T-sorter's fluid channels are connected to I/O ports 636 and 638 on the fluid layer using fluid channels 652 and 654. The control channels of the pump 712 and T-sorter 722 are connected to the I/O ports, 642, 644, 646, 640, and 648, using control channels, 660, 662, 664, 666, and 668, drawn on the control layer. In the case of the T-sorter 722, interconnect bridges 732-1 and 732-2 are used, so that control channels 666 and 668 can bridge the fluid channels 652 and 654 without creating parasitic valves. At step 608 the microfluidic circuit on template 630 is checked for errors. For example a DRC may be done. In an alternative embodiment of the present invention, after the components have been placed on the template 630 (step 605), an auto-routing routine may connect the components with channels (step 606). In another embodiment the design rule checks may be done interactively as each entry in active drawing area 530 is made.

The operation of the sorting device in accordance with one embodiment of the present invention is as follows. The sample is diluted to a level such that only a single sortable entity would be expected to be present in the narrow channel 720 at any time. Assume, for the sake of illustration, that the sortable entity is either size A or size B and that size A entities are collected at fluid output port 636 and size B entities are collected at fluid output port 638. Pump 712 (three control valves and five damping elements) is activated by flowing a fluid through control channels 642, 644, and 646 as described above. The sortable entity enters via input port 634 and moves via fluid channel 650. The sortable entity is pushed by the pump 712 into the narrow channel 722. The narrow channel width is selected such that the sortable entities can move only in a single file manner through this channel. Hence if there happen to be two sortable entities in the narrow channel 722, one must follow the other. The narrow channel 722 serves as a detection region 724, where an external detection system, such as an optical measurement system, is used to determine if the detected sortable entity is size A or size B. The bridge components 732-1 and 732-2 are used to allow crossing of the fluid lines by the control lines without creating a parasitic valve. The bridge components are also used to create an area clear of channels for the detection region 724. If the sortable entity is size A then control channel 668 is activated and control line 666 is deactivated. This turns on the valve 750 and turns off valve 752. Hence the size A entity flows to fluid output port 636. If the sortable entity is size B then control channel 666 is activated and control line 668 is deactivated. This turns on the valve 752 and turns off valve 750. Hence the size B entity flows to fluid output port 638.

Sorting in accordance with the above embodiment would avoid the disadvantages of sorting utilizing conventional electrokinetic flow, such as bubble formation, a strong dependence of flow magnitude and direction on the composition of the solution and surface chemistry effects, a differential mobility of different chemical species, and/or decreased viability of living organisms in the mobile medium. For more detailed discussions of cell sorting by microfabricated devices, see A. Y. Fu et al, "A Microfabricated Fluorescence-Activated Cell Sorter," Nature Biotechnology 17: 1109–1111 (1999); H. P. Chou et al., "A Microfabricated Device for Sizing and Sorting DNA Molecules," Proc. Nat'l Acad. Sci. 96: 11–13 (1999); S. Quake et al., "Disposable Microdevices for DNA Analysis and Cell Sorting," Proc. Solid-State Sensor and Actuator Workshop," Hilton Head, S.C., Jun. 8–11, 1998, pp. 11–14; and H. P. Chou et al., "Microfabricated Devices for Sizing DNA and Sorting Cells, Micro- and Nanofabricated Structures and Devices for Biomedical Environmental Applications," Paul L. Gourley, Editor, Proceedings of SPIE Vol. 3258, 181–7 (1998).

Further details on the physical layout tool is given by the User's Manual in Appendix C, which is herein incorporated.

Physical Analysis (Phase 5)

Once the design has been completed, placed, and routed, a simulation indicating the dynamic performance can be performed under physical analysis 800 (phase 5). As shown in FIG. 1, dynamic simulation models 810 of the components are based on the physical attributes as well as the chosen material properties for the layer in which the component is placed, as provided in the mechanical properties library 820. Fluid characteristics are also taken into account as well as the control signal's actual actuation pressures. The physical analysis 800 in the MCAD system 10 includes one or more of the following: dynamic volumetric flow rates, volumetric capacitances of components, volumetric capacitances of interconnect/routing channels, parasitic layout extraction 830 and/or parasitic components.

In one embodiment the dynamic fluidic flow simulation 840 is performed using ANSYS/Multiphysics (coupled field structural-fluid) and ANSYS/FLOTRAN™ (computational fluid dynamics) tools of ANSYS Inc. of Canonsburg, Pa.

(www.ansys.com/products/html/multiphysics.htm and (www.ansys.com/products/flotran.htm). The ANSYS tools can perform laminar flow simulations and coupled physics simulations, such as dynamic fluidic and mechanical simulations, for microfluidic systems. Using this tool, dynamic simulation models 810 are first developed, taking into account the mechanical/structural properties of the model's associated component (mechanical properties library 820). Next using the dynamic simulation models 810 as connected and laid out in the physical layout 410, a dynamic fluidic flow simulation circuit model for the microfluidic circuit of the physical layout 410 is developed. Parasitic or coupling effects between different channels, which are typically second order effects, optionally, may be incorporated into the dynamic fluidic flow simulation circuit model. The ANSYS/Mutiphysics tool is then used to simulate the dynamic fluidic flow simulation circuit model using a variety of test inputs. Both the final outputs and intermediate test points of the circuit model are analyzed to determine if the proper results are achieved. If not, then the physical layout 410 is modified and the associated modified dynamic fluidic flow simulation circuit model is again simulated. This iterative design process is continued until the desired results are achieved.

In another embodiment the dynamic fluidic flow simulation 840 may employ the DCCL 380 used in the functional analysis 360 as shown in FIG. 14.

Device Implementation (Phase 6)

Once the design has been placed and routed, the physical layout 410 of phase 4 will write out the desired chip layout files 902 to manufacture a prototype 904 of the microfluidic circuit as seen in FIG. 1. The DWG/DXF files written from the physical layout 902 can be converted to a manufacturing format, for example, Gerber, HPGL, EPS, DXF, GDS II, or Postscript, for use in device implementation 900. The layout files are then used for mask layout generation of a chip or die. Several masks are then used in step 904 to set up a wafer for manufacturing.

Figure 29:
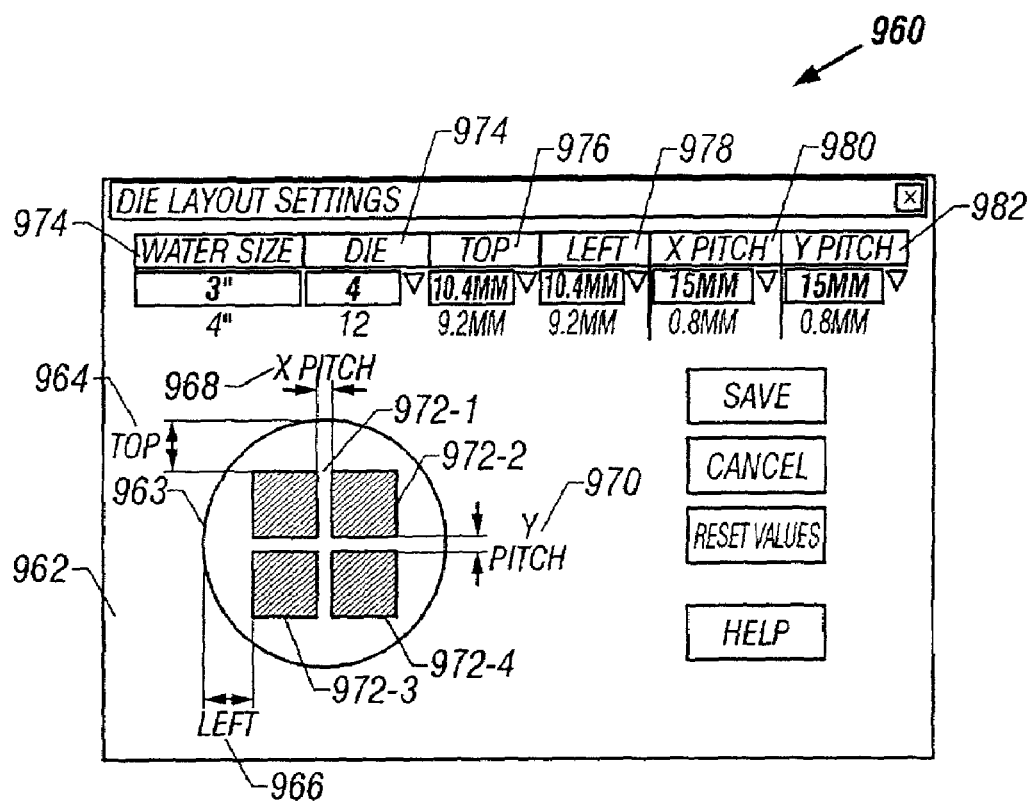
FIG. 29 shows a display for setting up the die layout on a wafer of an embodiment of the present invention.

FIG. 29 shows a display for setting up the die layout on a wafer of an embodiment of the present invention. The die layout settings window 960 has a screen 962 which displays the die layout on a wafer 963. The screen 962 includes, a top displacement 964 from the edge of the wafer 963, a left displacement 966 from the wafer edge, an X pitch 968, a Y pitch 970 and dies, 972-1, 972-2, 972-3, and 972-4. Each die may include a microfluidic circuit such as that shown in FIG. 27. The window 960 also has a table which indicates setting values, including: wafer size 974 (e.g., 3 or 4 inches), number of dies per wafer 974 (e.g., 4 or 12), top displacement 976 (e.g., 10.4 mm or 9.2 mm), left displacement 978 (e.g., 10.4 mm or 9.2 mm), an X pitch 980 (e.g., 15 mm or 0.8 mm), and a Y pitch 982 (e.g., 15 mm or 0.8 mm).

The wafer is then manufactured (step 904) and the resulting microfluidic device is ready for either one-time use (disposable) or for continuous reuse (semi-permanent test device).

The MCAD system 10 can be implemented and executed in a variety of ways. For instance, it can be implemented as a computer-aided design (CAD) program for design, analysis, and implementation of the elastomeric circuits or networks. The CAD program can be provided separately to individual users or distributed over networks such as the Internet so that it can be centrally maintained and controlled.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

APPENDIX A

The following table summarizes examples of microfluidic components and structures that can be made available in a library for design capture.

| Component/ Structure | Brief Description | Reference(s) | Figure Number(s) |
|---|---|---|---|
| ON/OFF Switches | An ON/OFF switch is open in the ON state allowing fluid flow therethrough and is closed in the OFF state to prevent fluid flow therethrough. | | |
| | Pressure-actuated, normally open switch | Present Application 60/282,253 | 2A-3 7A-7E 8 |
| | Pressure-actuated, normally closed switch | 60/282,253 | 9A-9D |
| | Vacuum-actuated, normally closed switch | 60/282,253 | 10 & 15A-15J |
| | Inverted pyramid pressure amplification switch | 60/282,253 | 39A-39D 40-41 |
| | T-switch | Present Application | 13A |
| Valves | Valves are provided for directing fluid flow. | | |
| | Side-actuated valve | PCT/US00/17740 | 48A-48B |
| | Unidirectional valve for permitting fluid flow in one direction therethrough | 60/282,253 | 20A-B 21 22 23 |
| Interconnect Bridges | Interconnect bridge having a control channel with tapered element for bridging a fluid channel | Present Application | 17B |
| Vias | Vias provided in one channel for bridging another channel. | Present Application | 18B |
| Tapers | Fluidic taper for facilitating connection between a larger channel and a small channel | Present Application | 28 |
| Switchable Flow Arrays | Switchable flow array including fluid passages that can be selectively directed to flow in two perpendicular directions | PCT/US00/17740 | 31A-31D |

| Component/ Structure | Brief Description | Reference(s) | Figure Number(s) |
|---|---|---|---|
| Multiplexer | Multiplexer having multiplexed channel flow controllers for directing fluid flow into one or more of a plurality of synthesis channels or chambers in which solid phase synthesis may be performed | PCT/US00/ 17740 | 33 |
| Gates or Gate Structures | Fluidic logical gates can be used to perform Boolean functions. | | |
| | Inverter for inverting an input to produce an output | 60/282,253 | 12A |
| | OR gate | 60/282,253 | 12C |
| | NOR gate | 60/282,253 | 12E |
| | AND gate | 60/282,253 | 12G |
| | NAND gate | Present Application | 5A |
| | Latch/Flip-flop | Present Application 60/282,253 | 6A 6B 33 |
| | D-latch | Present Application | 7A |
| Amplifiers | Fluidic pressure amplifier for amplifying pressure | 60/282,253 | 3-4B |
| Pumps | Fluidic pumps are used for pumping fluid. | | |
| | Pump operating by compression and bending of fluid chamber | 60/282,253 | 17A-B |
| | Peristaltic pump with multiple control lines for pumping | PCT/US00/ 17740 | 24A-24B |
| | Rotary pump/mixer for mixing and incubating solutions | Present Application | 21 |
| Capacitors & Reservoirs | A capacitor or reservoir can be used for storing and releasing pressure. | | |
| | Single-chamber high-pressure reservoir | 60/282,253 | 24 |
| | Two-chamber capacitor | 60/282,253 | 28-29B |
| | Single-chamber vacuum reservoir | 60/282,253 | 32 |
| Pressure Sources | High pressure source for applying high pressure fluid to load devices | 60/282,253 | 26 |
| Generators | High pressure generator having stages for multiplying output pressure | 60/282,253 | 27 |
| Vacuum Sources | Vacuum source for driving vacuum-actuated devices | 60/282,253 | 30 |

| Component/Structure | Brief Description | Reference(s) | Figure Number(s) |
|---|---|---|---|
| Fluid Chambers | Selectively addressable reaction chambers provided along flow lines and in an array for selectively directing fluid flow into one or more of the reaction chambers | PCT/US00/17740 | 28A-30 |
| Switching Regulators | Switching regulator for performing analog functions | 60/282,253 | 34 |
| Sorting Devices | Sorting device for cell sorting and DNA sizing | PCT/US00/17740<br><br>Present Application | 36<br><br>27-28 |
| Separation Devices | Separation device for perform separation of materials | PCT/US00/17740 | 43 |
| Cell Pen Structures | Cell pen array for storing materials within a selected, addressable position for ready access | PCT/US00/17740 | 44A-44D |
| Cell Cage Structures | Cell cage with pillars that permit opening of cage for transfer of cells | PCT/US00/17740 | 45A-45B |
| Cell Grinder Structures | Cell grinder with interdigitated posts that can be closed to crush material therebetween | PCT/US00/17740 | 46A-46B |
| Pressure Oscillators | Pressure oscillator for generating pressure oscillation | PCT/US00/17740 | 47 |
| Mirror Array Structures | With appropriate control circuitry, a microfluidic structure having a light-reflecting membrane may be employed as a digital or analog mirror array. | PCT/US00/17740 | 38 |
| Refractive Devices | Refractive device having elastomeric material capable of transmitting incident light | PCT/US00/17740 | 39<br>40<br>41 |

APPENDIX B

Icons for FluidArchitect – Microfluidic Design Automation System

General Icon Properties

Two distinguishable colors representing channels on different layers. Red in this case representing the control channel and blue the fluidic channel. There are typically two ports on each of the channels represented by white circles, or dots, sometimes outlined with black circles. Some of the icons will only have one color representing a channel only present on one layer and others will have two colors representing components composed of multiple channels on multiple layers.

Orientation
The orientation of the components in the icons does not represent it final placement in the microfluidic design. Once the component is placed, it can be rotated with freedom to any degree (0 – 360).

Valve

Valve

Description:
The valve icon represents the basic switching element and consists of channels of different widths and lengths with connection points, or ports.

T- Switch

T-Switch

Description:
The T-Switch represents a basic component that is used to direct the incoming flow in the fluidic channel to none or one of two channels based on the state of the control channels. The channels for both the fluidic and control layer can be of different widths and lengths with connection points, or ports.

Control Tapers

Control Taper

Description:
The Control Taper is a basic component that allows a connection from a larger control channel to a smaller control channel or visa versa. The ends of the tapers can be of different widths based on the needed geometries of what needs to be connected.

Fluid Taper

Fluid Taper

Description:
The Fluid Taper is a basic component that allows a connection from a larger fluid channel to a smaller fluid channel or visa versa. The ends of the tapers can be of different widths based on the needed geometries of what needs to be connected.

Peristaltic Pump

Pump

Description:
The Peristaltic Pump is a basic component that allows the active control of fluid in either direction. The actual channels, both fluidic and control, can be of different widths based on the geometries required for proper operation.

Pump and Dampener

Pump+Dampener

Description:
The Peristaltic Pump and Dampener is a basic component that allows the active control of fluid in either direction and includes dampening channels to smoothen the flow of fluid.

The actual channels, both fluidic and control, can be of different widths based on the geometries required for proper operation.

Multiplexers

Description:
The Multiplexers are basic component that allows the active control of fluid in 8 or 16 fluid channels based on a binary application of control signals to the control channels. The actual channels, both fluidic and control, can be of different widths based on the geometries required for proper operation. In general, these icons can be extended to cover N fluid lines controlled by 2LogN control lines.

Rotary Mixers

Description:
The Rotary Mixers are basic components and come in different configurations based on the application needs. The Rotary Mixer comes in three basic variations of the fluid input and output ports: 2 fluid input/output (I/O), 3 fluid I/O, and 4 fluid I/O. The Rotary Mixer Sq has a different topology which allows "tiling" of the mixers and comes in two basic variations of the fluid input and output ports: 2 fluid input/output (I/O) and 3 fluid I/O. The actual channels, both fluidic and control, can be of different widths based on the geometries required for proper operation.

Fluid Mux Connectors

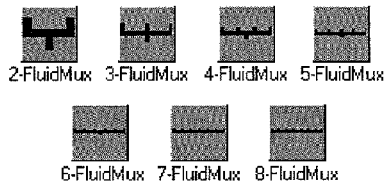

The Fluid Mux Connectors are basic components that are sized and positioned to work the Multiplexer and Channel Array Components. These icons represent the "mux" connections from 2 through 8 array or multiplexer outputs or inputs.

Bridges
The purpose of the Bridge component is to allow control lines to cross over fluid lines without stopping the flow of the fluid line below it. This feature enables the user to design the chip with more complexity and greater density. Note: The flow line is not completely unaffected because the membrane of the bridge component will deflect when the control line is actuated. The amount of deflection will depend upon the amount of pressure that is applied to the control line.

Channel Arrays
The channel array provides a set of individually addressable flow lines. The number of control lines is equal to the number of flow lines for this component. The flow of the liquid within the array can be controlled in any fashion by actuating the necessary control lines.

Control Components
The Control components allow the Control lines to be arranged in the configurations required by the user. The dimensions of these components have been established using the minimum recommended lengths for the individual components.

Dampeners
The Dampener elements are used provide smoother flow of pumped liquid. The membrane of the Dampener element will deflect and absorb the energy caused by the closing of the valves of the peristaltic pump.

Fluid Components
The Fluid components allow the Fluid lines to be arranged in the configurations required by the user. The dimensions of these components have been established using the minimum recommended lengths for the individual components.

Fluid Mux Connectors
The Fluid Mux Connectors enable the user to interface the flow lines of the Multiplexer and Channel arrays to other components. They have been designed to match the flow line spacing for these components.

Mixers
The Mixers are used to mix two or more different liquids within a closed loop. Mixing is accomplished by pumping the liquid around the closed loop. Parabolic flow of the liquid within the loop allows for fast and efficient mixing. The different Mixer orientations allow the user to arrange the mixers in various configurations (arrays, etc.) depending upon requirements.

Tapers
The taper element is required when varying the width of the control lines or the fluid lines. This requirement is necessary because of the manufacturing process involved in making the molds for the chips.

Multiplexers
The Multiplexer element allows the user to flow liquid in any single flow line at a given time using a predetermined control scheme. The number of control lines required for a given multiplexer can be calculated using the equation $2(\log_2 N)$, where N is the number of flow lines. The advantage of the Multiplexer becomes more obvious as larger arrays are used, where the number of control lines can be significantly less than the number of flow lines.

Pumps
The Pump element is a peristaltic pump which is composed of three individual valves. The liquid within the flow lines are pumped by sequentially actuating the individual valves. The Pump can be used with or without the Dampener element.

T-Switch
The T-Switch element allows the user to control the input of two flow lines into a single flow line or vice versa. The valve elements can be used to turn the flow of each input on and off so that the desired liquid runs through the single line or the valves can be used to separate the flow from a single line to two lines.

Valve
The valve element is used to turn the liquid flow on and off. This is controlled by providing sufficient air pressure to cause the membrane to deflect and pinch off the flow line.

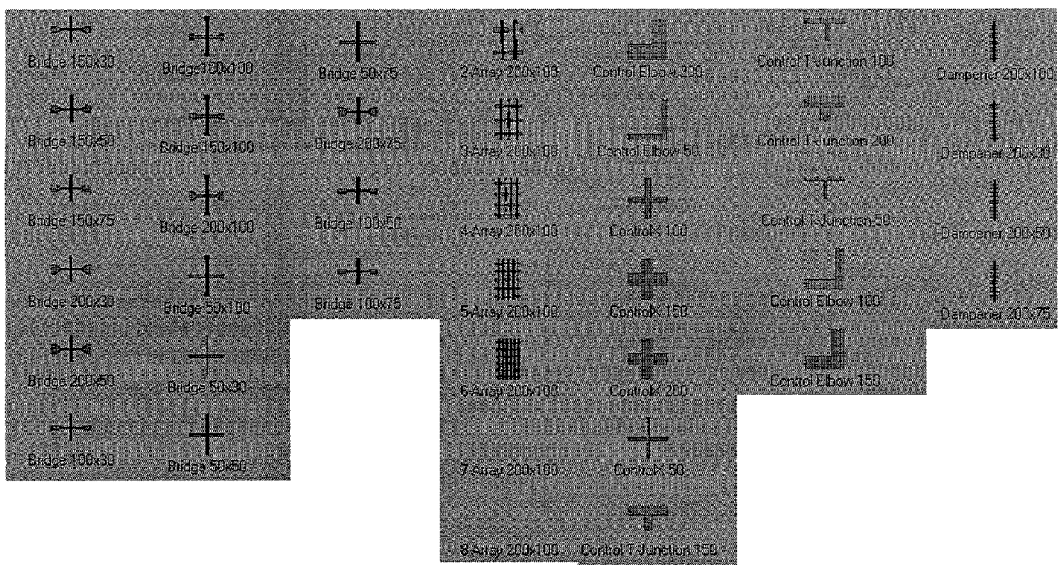

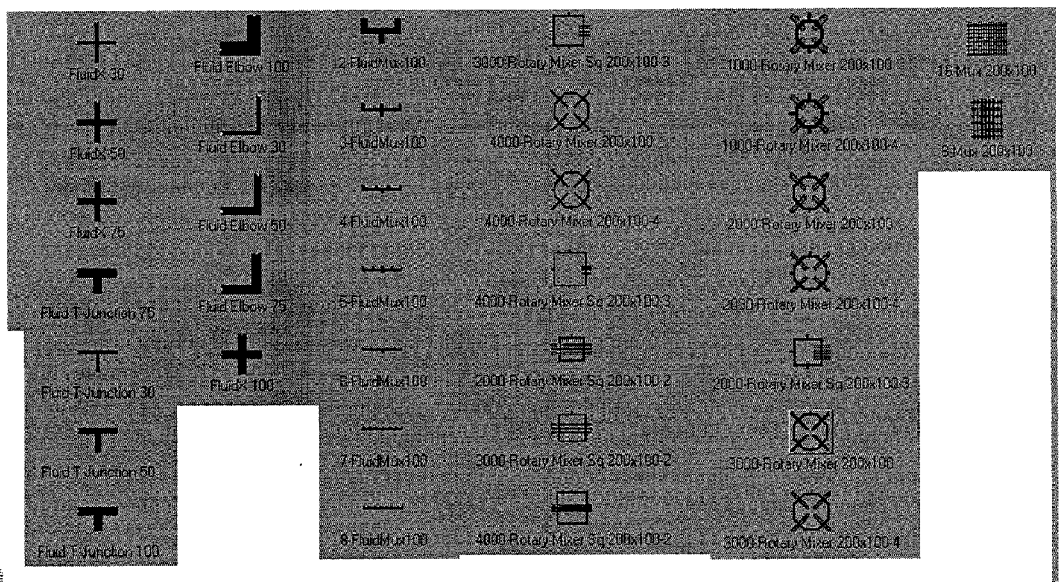

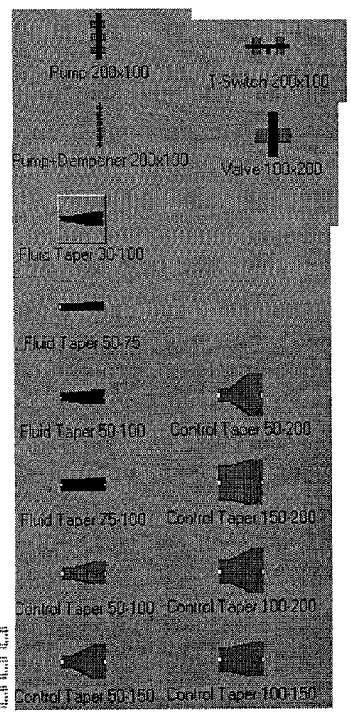

Appendix C

FluidArchitect™ User's Guide/Reference Manual

Copyright

Fluidigm Corporation reserves the right to make changes in the information contained in this publication without prior notice. The reader should in all cases consult Fluidigm Corporation to determine whether any such changes have been made.

COPYRIGHT (C) 2001 BY FLUIDIGM CORPORATION. ALL RIGHTS RESERVED. UNPUBLISHED - RIGHTS RESERVED UNDER THE COPYRIGHTS LAW OF THE UNITED STATES. USE OF A COPYRIGHT NOTICE IS PRECAUTIONARY ONLY AND DOES NOT IMPLY PUBLICATION OR DISCLOSURE.

OTHER PRODUCT OR BRAND NAMES ARE TRADEMARKS OR REGISTERED TRADEMARKS OF THEIR RESPECTIVE HOLDERS.

THIS DOCUMENT CONTAINS PROPRIETARY AND CONFIDENTIAL INFORMATION OF FLUIDIGM CORPORATION AND/OR ITS SUPPLIERS. USE, DISCLOSURE, OR REPRODUCTION IS PROHIBITED WITHOUT THE PRIOR EXPRESS WRITTEN PERMISSION OF WEBEX, INC.

RESTRICTED RIGHTS LEGEND. USE, DUPLICATION, OR DISCLOSURE BY THE GOVERNMENT IS SUBJECT TO RESTRICTIONS AS SET FORTH IN SUBPARAGRAPH (C) (1) (ii) OF THE RIGHTS IN TECHNICAL DATA AND COMPUTER SOFTWARE CLAUSE AT DFARS 252.227-7013, RIGHTS IN TECHNICAL DATA AND COMPUTER SOFTWARE (OCTOBER 1988).

Table of Contents

Preface ............................................................................. 5
    What is a Microfluidic Chip?............................................................................5
    What is FluidArchitect?....................................................................................5
    FluidArchitect User Requirements ..................................................................5

Chapter 1 – Installation Process........................ 6
    System Requirements .....................................................................................6
    Installing FluidArchitect ....................................................................................6
    Requesting a License......................................................................................6
    Licensing FluidArchitect ..................................................................................7
    Trouble Shooting Licensing.............................................................................8

Chapter 2 – Design Process ................................ 9
    Design Flow Process.......................................................................................9
    Application Interface .......................................................................................9
    Basic Design Operations...............................................................................10
    Starting a New Project...................................................................................10
    Opening an Existing Project .........................................................................10
    Loading the Libraries.....................................................................................10
    Saving a Design Project................................................................................10
    Submitting a Design Database for Fabrication..............................................11

Chapter 3 – Design Editor Reference ..................12
    Introduction...................................................................................................12

Menus ..............................................................................12
    Main Menu.....................................................................................................12
    File Menu......................................................................................................13
        File > New...................................................................................................13
        File > Open..................................................................................................13
        File > Close.................................................................................................13
        File > Save..................................................................................................13
        File > Save As.............................................................................................13
    Edit Menu .....................................................................................................14
        Edit > Undo..................................................................................................14
        Edit > Redo..................................................................................................14
        Edit > Cut.....................................................................................................14
        Edit > Copy .................................................................................................14
        Edit > Paste ................................................................................................14
        Edit > Paste Special....................................................................................14
        Edit > Delete ...............................................................................................14
        Edit > Components .....................................................................................14
        Edit > Default Properties.............................................................................15
    View Menu....................................................................................................16
        View > Refresh ...........................................................................................16
        View > Status Bar.......................................................................................16
        View > Page Bounds .................................................................................16
        View > Customize Toolbars........................................................................16
        View > Grid..................................................................................................17
        View > Grid Properties................................................................................18
        View > Zoom Normal..................................................................................18
        View > Zoom Percent.................................................................................18
        View > Zoom Custom.................................................................................18
        View > Zoom Fit..........................................................................................18
        View > Options............................................................................................18
    Draw Menu ...................................................................................................20
        Draw > Channel..........................................................................................20
    Modify Menu.................................................................................................20
        Modify > Rotate...........................................................................................21

| | |
|---|---|
| Modify > Flip | 21 |
| Modify > Nudge | 21 |
| Modify > Align | 22 |
| Layer Menu | 24 |
|    Primary Layers | 24 |
|    Channel Layers | 24 |
| Help Menu | 25 |

Toolbars ............................................................. 25

| | |
|---|---|
| Docking and Undocking | 25 |
| *File* Toolbar | 26 |
| Drawing Toolbar | 26 |
| Zoom Pan Toolbar | 27 |
| Rotate Toolbar | 27 |
| Align Toolbar | 27 |
| Nudge Toolbar | 28 |

Library Manager ................................................ 29

Layer Manager .................................................. 31

| | |
|---|---|
| Layer Color | 31 |
| Setting the Active Primary Layer | 31 |
| Active Drawing Area | 32 |
|    Rulers and Grid | 32 |
|    Pop Up Menus | 32 |
|    Selected Component/Channel Pop Up Menu | 33 |

Status Bar ......................................................... 34

| | |
|---|---|
| Select Mode | 34 |
| Drawing Mode | 35 |

Chapter 4 – Creating a Design ........................ 36

| | |
|---|---|
| General Rules For Design Implementation | 36 |
| Design Wizard | 36 |
| Placing Library Components | 39 |
| Ports of Channels and Components | 40 |
| Drawing Channels | 40 |
| Procedure for Drawing a Channel | 41 |
| Target Tool | 41 |
| Input and Output Ports | 42 |
| Channel Properties | 43 |
| Component Properties | 44 |

Design Example ................................................ 46

| | |
|---|---|
| Components Required | 46 |
| Basic Operation of the Design | 46 |
| Creating the Design | 47 |
| Design Wizard Setup | 47 |
| Placing Components | 51 |
| Connecting the Components | 52 |
| Adding a Vertex While Drawing a Channel | 52 |
| Changing the Channel Widths | 53 |
| Connecting To I/O Ports | 54 |
| Conclusion | 55 |

Preface

What is a Microfluidic Chip?

Fluidigm's technology is the product of highly successful basic research. The Company's technology was developed by researchers at the California Institute of Technology who sought to create assays based on the interactions of individual molecules, cells, viruses and proteins. These assays, and the fluidic technology that enables them, proved overwhelmingly advantageous over their macroscopic counterparts and yielded functionality unavailable until now. These capabilities are the result of breakthroughs in active fluidic devices, surface chemistry, material science, and optical instrumentation. Fluidigm's microfluidic chips provide order of magnitude sensitivity increases and unparalleled flexibility by actively manipulating femtoliters of fluid.

What is FluidArchitect?

FluidArchitect is the design automation applications portion of a revolutionary microfluidics platform that Fluidigm has built and continues to develop. This platform allows the user the ability to design customized microfluidic chips from Fluidigm's library of basic building blocks components with built in rule checking and submit the design for fabrication.

The design automation tool guides the user through the design process setup process and allows the user the ability to simply drag, drop, click, and connect components to form a customized microfluidic chip. User's who are familiar with Microsoft Windows applications will be able to use the FluidArchitect.

FluidArchitect User Requirements

Users of the FluidArchitect design automation application should have the following requirements:

- A good understanding and previous experience with microfluidics

- Experience with computer aided design applications

Chapter 1 – Installation Process

System Requirements

The following are the system requirements for installing FluidArchitect onto a PC.

- Computer/Processor:
  A Pentium class processor running at 300 MHz processor or higher

- Operating System:
  Windows NT 4.0 or Windows 2000. If you are running a version of Windows NT, you must be running Windows NT Service Pack 3 or higher. If you are running Windows 2000, it is suggested that you are running Windows 2000 Service Pack 1 or higher.

- Memory:
  For Windows NT:
  64 MB of RAM minimum
  For Windows 2000:
  128 MB of RAM minimum

- Hard drive space:
  10 MB

- Mouse:
  Three button mouse. (Mouse with middle scroll wheel is suggested)
    o Left mouse button is used to select or start component/channel
    o Middle mouse button is used to pan in select mode
    o Scroll wheel used to zoom in and out 25% per rotation interval
    o Right mouse button is used to pop up menus in the drawing area

Installing FluidArchitect

FluidArchitect is delivered as an installation package to be executed on the target PC it is to be installed onto. The installation package will automatically guide you through the installation process step by step. All files and libraries will be installed into a directory that can be specified by you.

Requesting a License

Once you have successfully installed the program onto your computer you will need to request a license to unlock the FluidArchitect application in order to use it. The unlock code that will be generated is specifically for the computer the application is installed on. Follow the steps outlined below to request a license for your copy of FluidArchitect.

1. Start the FluidArchitect installer.

2. The InstallShield application will now walk you through the steps of selecting a target directory and installing all the necessary files and directories onto your computer.
3. After finishing installation, go to *Programs > Fluid Architect > Fluid Architect* under the *Start* menu on your computers desktop to start the FluidArchitect application.

4. Figure 1 shows the dialog box will come up on the first time FluidArchitect is executed. The Site code shown in red is specific to the computer in which the FluidArchitect is being installed.

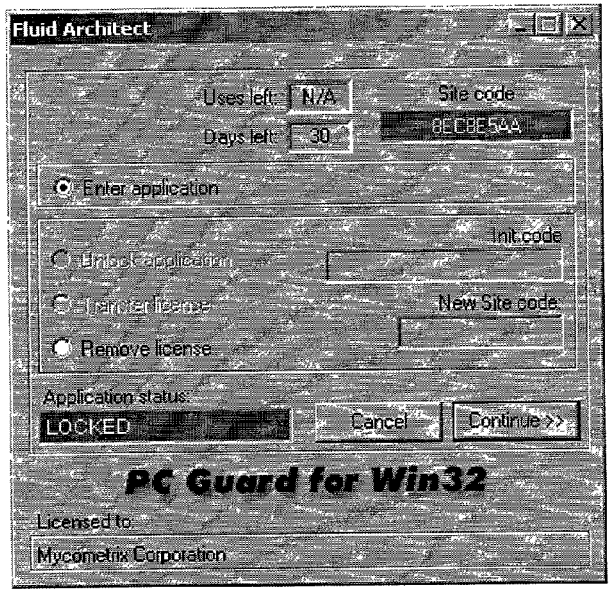

Figure 1 – License Manager

5. Select the Site code and copy the code. Paste the code into an email along with the following information:
   - Contact Name
   - Company
   - Address
   - Phone Number
   - Fax Number (optional)
   - Email Address 6. Email the information to license@fluidigm.com. A license will be generated and emailed back to you typically within 24 hours.

Licensing FluidArchitect

After you have received an email containing your Initialization code, follow the steps below to license FluidArchitect.

1. You will receive a 16 digit alphanumeric string based on the Site code sent in your email.

2. Enter the 16 digit alphanumeric string EXACTLY as it is shown in the email including the "-" character which separates the strings. See Figure 2. In this case the Init code of *TEST-123455678-LOCK* was entered.

3. Click the *Continue >>* button to complete the licensing process.

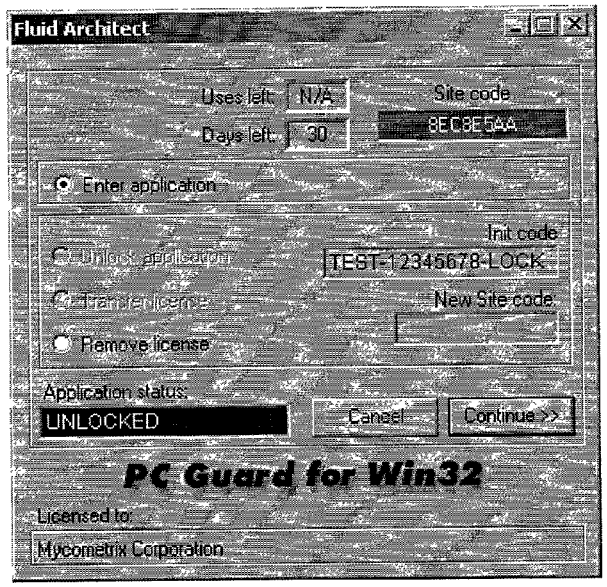

Figure 2 – Dialog to Enter the Init Code

4. After successful entry of the Init code the application is ready for use.

Trouble Shooting Licensing

Check the following items to resolve licensing issues:

- Check the Site code sent to Fluidigm for Init code generation. If the Site code does not match what is displayed in the dialog box then the Init code will not work. Resend the correct Site code for a new Init code following the directions given in the previous sections.

- FluidArchitect has been successfully installed and removed from the computer you are trying to reinstall onto. Once the application has been removed from a computer it is not possible to reinstall and use the old license. A new license must be generated but the existing license from your current working installation must be removed first and verified before a new Init code can be sent.

Chapter 2 – Design Process

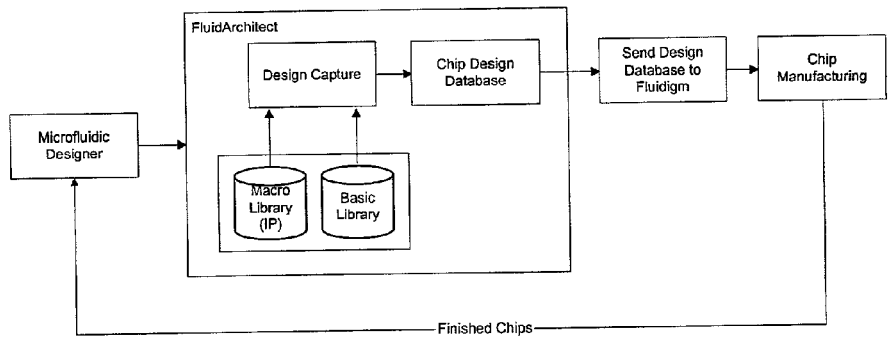

Figure 3 – Microfluidic Chip Design Process with FluidArchitect

Design Flow Process

The design process for designing and building a microfluidic chip is described in Figure 1. Application specific microfluidic chips can be created using the library components provided by Fluidigm. FluidArchitect allows you to capture your design in a simple drag and drop, point and click design environment. Once the design has been completed it is sent to Fluidigm for fabrication. Fabricated devices are sent back to the microfluidic designer for use.

Application Interface

FluidArchitect's interface contains the entire environment in which a design will be started and completed for submission to Fluidigm for fabrication.

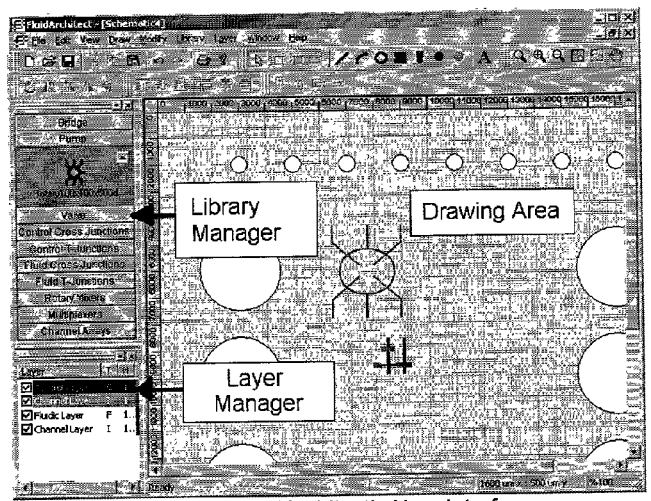

Figure 4 – FluidArchitect's User Interface

The user interface has three primary components: *Library Manager, Layer Manager,* and *Drawing Area* (see Figure 4).

*Library Manager*
The component libraries come predefined and are installed with the FluidArchitect application. The library components are tested and approved for use in the microfluidic chip making process. These libraries will be updated with new components as they are approved from Fluidigm for use. The component library will be delivered as part of a new release or delivered as a separate library installation. Components can be "dragged and dropped" from the *Library Manager* onto the *Drawing Area* to be added as part of a design.

*Layer Manager*
The *Layer Manager* can be used to control the viewing of the layers as well as the properties of the layers. The color representations of the layers are shown in the manager and can be changed as part of the layer properties. Currently the number of layers is limited to two and channel heights per layer is limited one.

*Drawing Area*
The *Drawing Area* is where the design is created using components from the *Library Manager* and interconnected with the channel drawing tools. The *Drawing Area* is a WYSIWYG representation of the layout of the microfluidic circuit that will be fabrication and represents the standard 20 mm x 20 mm chip outline.

Basic Design Operations

Starting a New Project

To start a new project click New button, , in the File toolbar or use the File > New menu command. FluidArchitect will start the Design Wizard to help setup a new project. The Design Wizard will ask you to select or set the following items:

- Project Directory
- Chip Template
- Layers of the Chip

Once the Design Wizard was collected all of the needed information, the chosen chip template with the appropriate settings will be displayed in the *Drawing Area* of the FluidArchitect application.

Opening an Existing Project

To open an existing project use the File > Open menu command. The File menu will also show the four most recent projects that have been opened just above the Exit command. These recently opened projected can be quickly opened by simply selected them in the menu.

Loading the Libraries

The initial set of libraries will be installed with the installation of the FluidArchitect application. Should additional libraries be available from Fluidigm, the libraries can be simply added using the Library menu.

Saving a Design Project

The project can be saved at any point by using the File > Save or File > Save As... menu command. The project is saved with a *.mdx file extension and this file can be sent to Fluidigm for chip fabrication once the design has been completed.

> Note – It is strongly suggested that a back up of the *.mdx file is saved periodically. The *.mdx file contains the complete database of the design project.

Submitting a Design Database for Fabrication

Once the design has been completed and verified free of errors it can be submitted to Fluidigm for fabrication. The design database can be found in the directory that the design was created in. The file extension of the design database is *.mdx. This file can be sent to manufacturing@fluidigm.com along with your contact information. A representative from Fluidigm will contact you regarding the details of your order for fabrication.

Chapter 3 – Design Editor Reference

Introduction

The goal of the design editor is to help you design effectively and as efficiently as possible. The libraries that are built into FluidArchitect represent microfluidic structures that are approved for implmentation in Fluidigm's processes. "Channel" drawing tools are provided to connect the microfluidic structures available from the libraries. The sections below will described the design editor in detail.

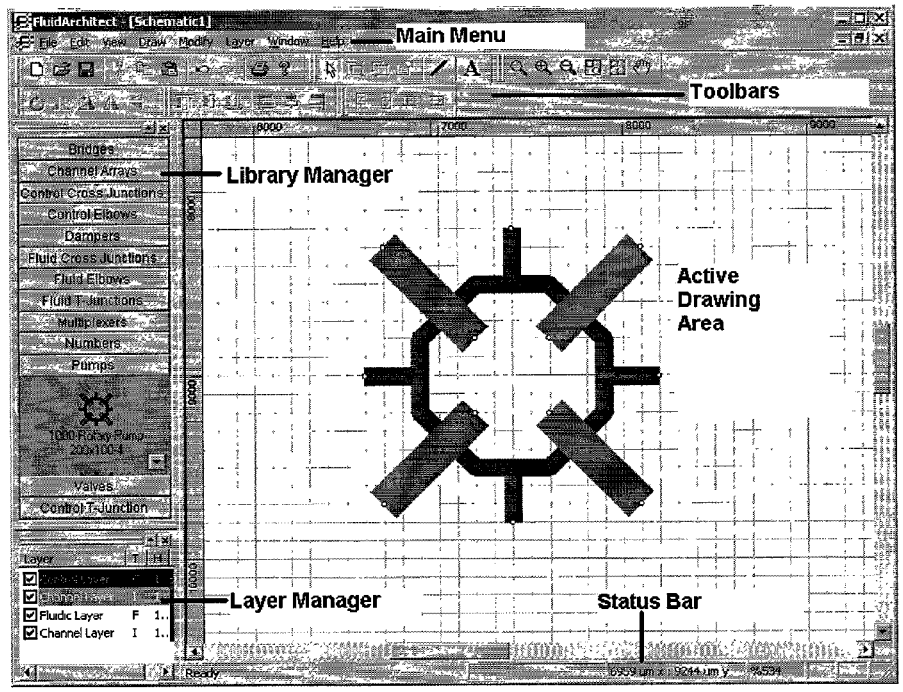

Figure 5 – FluidArchitect Main User Interface (Main Menu, Toolbars, Library Manager, Layer Manager, and Active Drawing Area)

Menus

Main Menu

The main menu is composed of nine menu groups which group related operations and commands for the application.

Figure 6 – Main Menu Bar

File Menu

Figure 7 – File Menu Commands

File > New
The *New* command starts the Design Wizard which will automatically set up the design project. (see Creating a Design for more details on the Design Wizard).

File > Open...
The *Open* command opens an existing design which has been saved.

File > Close
The *Close* command closes the active design project in the application. Closing a design project will safely close and exit the application. If any changes were made to the active design, you will be asked whether or not you want to continue to close the design.

File > Save
The *Save* command saves the active design project in the application. Saving the design will save the design project and close the project.

File > Save As...
The *Save As...* command saves the active design project in the application. This command allows you to save the design project under a different name or directory location other than the current location where the file is saved.

*File > Page Setup*
The *Page Setup* command allows you to set the print options for the active design project.

*File > Print*
The *Print* command will print the active design project and scale the design to fit the selected Paper size for the Printer.

*File > Print Preview*
The *Print Preview* command will preview a print of the active design project to the screen.

Edit Menu

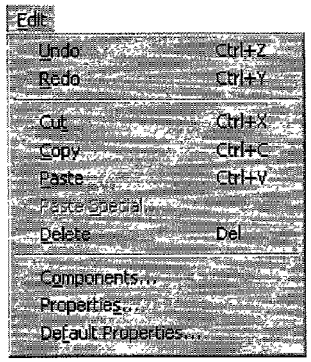

Figure 8 – Edit Menu Commands

Edit > Undo
The *Undo* command will undo the last command you executed on the active design project.

Edit > Redo
The *Redo* command will reverse the last command *Undo* command you executed on the active design project.

Edit > Cut
The *Cut* command cuts and pastes all selected components in the drawing area into the Clipboard.

Edit > Copy
The *Copy* command copies and pastes all selected components in the drawing area into the Clipboard.

Edit > Paste
The *Paste* command will paste the contents of the Clipboard into the drawing area. Only objects using the *Cut* or *Copy* command can be pasted from the Clipboard.

Edit > Paste Special
Not Currently Defined.

Edit > Delete
The *Delete* command is used to delete any selected object in the active drawing area.

Edit > Components
The *Components* command will bring up the Components dialog box. The dialog box, Figure 5, will show all of the components that are currently placed into the active drawing area.

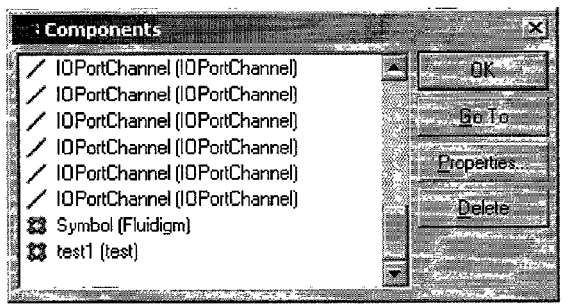

Figure 9 – Component Dialog Box

Additional commands available from this dialog box are:
- *OK* – Closes the dialog box
- *Go To* – Not currently implemented
- *Properties* – Opens the Properties dialog sheet for the component
- *Delete* – Not currently implemented

Edit > Default Properties
The *Default Properties* command will bring up the Properties dialog box for the entire design. The dialog box, Figure 6, will show all of the default settings for the design

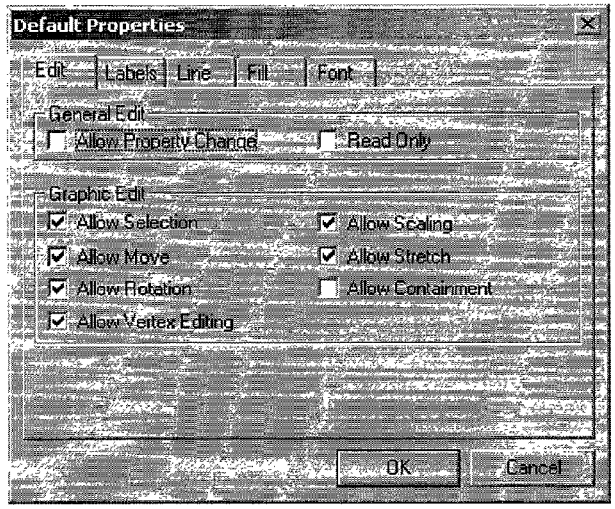

Figure 10 – Default Properties Dialog Box

- *OK* – Closes the dialog box and save any changes
- *Cancel* – Closes the dialog box and discards changes
- *Edit tab* – Not currently implemented
- *Labels* – Sets the label orientation for components
- *Line* – Not currently implemented
- *Fill* – Not currently implemented
- *Font* – Sets the fonts options for the labels

View Menu

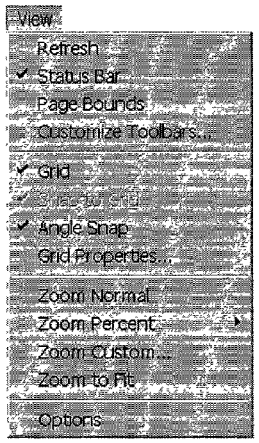

Figure 11 – View Menu Commands

View > Refresh
The *Refresh* command will redraw the active drawing area. Sometimes the drawing area may not refresh completely during editing of the design leaving screen artifacts. The *Refresh* command can be used to redraw the screen to eliminate the artifacts. Note that the artifacts will not be saved into the design.

View > Status Bar
The *Status Bar* command can be used to display or remove the status bar in the lower right corner of the application. The Status Bar, Figure 12, shows the selected component, the screen location of the cursor, and the percent zoomed.

Component Type      Cursor Location     % Zoom

Figure 12 – Status Bar

View > Page Bounds
The *Page Bounds* not currently implemented.

View > Customize Toolbars...
The Customize Toolbars... allow you to show or hide the toolbar tool bars in the application window directly under the Main Menu bar. Figure 13 shows the dialog box that appears when this command is selected. All of the toolbars, including the Main Menu bar, can be displayed or hidden based on settings made through this dialog box with the Toolbars tab selected.

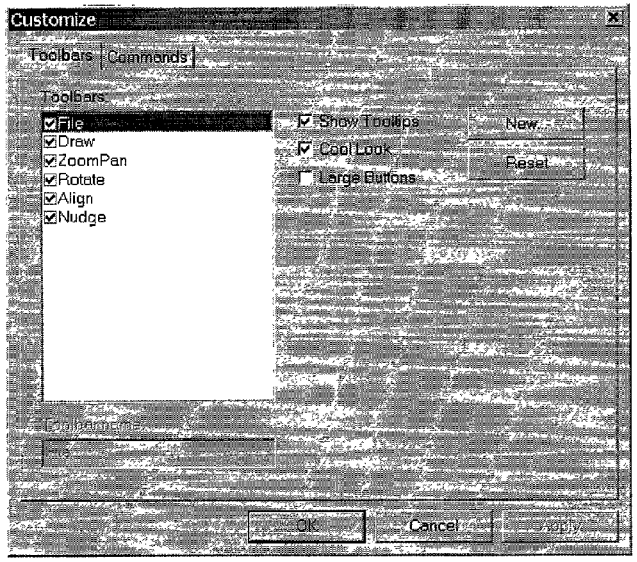

Figure 13 – Customize Toolbars Dialog Box with Toolbars tab selected

The toolbars can be customized by dragging and dropping commands icons from the dialog box directly into the existing toolbars present in the application. Figure 14 shows the "Buttons" or commands that can be left click and dragged to the toolbars.

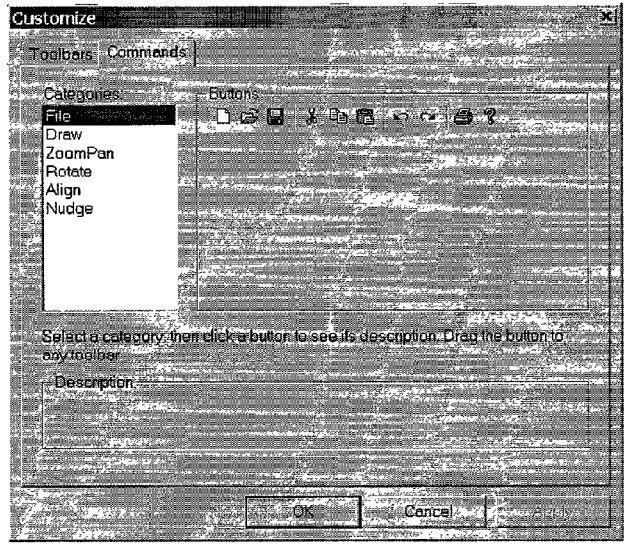

Figure 14 – Customized Toolbars Dialog Box with Commands tab selected

View > Grid
The *Grid* command enables or disables the grid to be displayed in the active drawing area.

View > Grid Properties...
The *Grid Properties...* command will bring up the dialog box, Figure 15. The Grid dialog box allows you to set the grid color and the intervals at which the grid is rendered and also to enable or disable the grid from the drawing area.

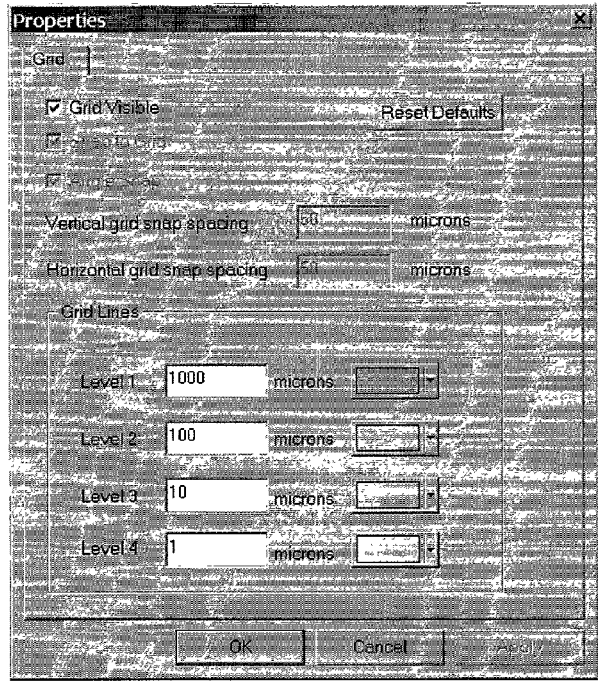

Figure 15 – Grid Properties Dialog Box

View > Zoom Normal
The *Zoom Normal* command will zoom the view of the active drawing area to view the entire chip.

View > Zoom Percent
The *Zoom Percent* command allows you to select *50%, 75%, 100%*, and *200%* zoom of the active drawing area.

View > Zoom Custom...
The *Zoom Custom...* command allows you to select *50%, 75%, 100%*, and *200%* from the drop down box and you can also enter in your own zoom factor of the active drawing area.

View > Zoom Fit
The *Zoom Fit* command will zoom the view of the active drawing area to view the entire chip.

View > Options
The *Options* command will bring up the *Grid* and *Library* dialog box, Figure 16. The Grid properties are the same as those in the *View > Grid Properties...*

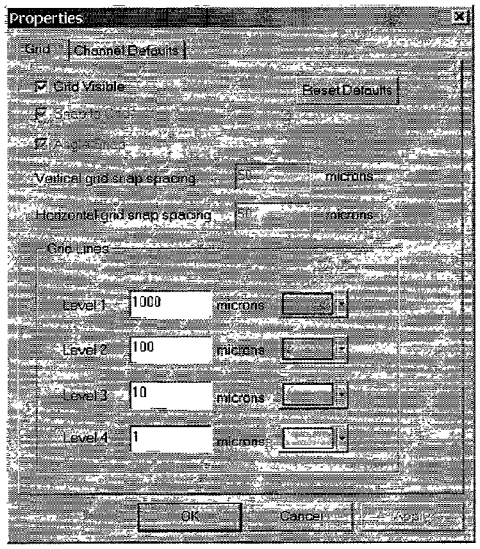

Figure 16 – Grid and Channel Defaults Dialog Box

The Channel Defaults allow you to set the default channel widths for the fluidic and the control layer channels that are draw to interconnect the library components. Figure 17 shows the dialog box with the Channel Defaults tab selected.

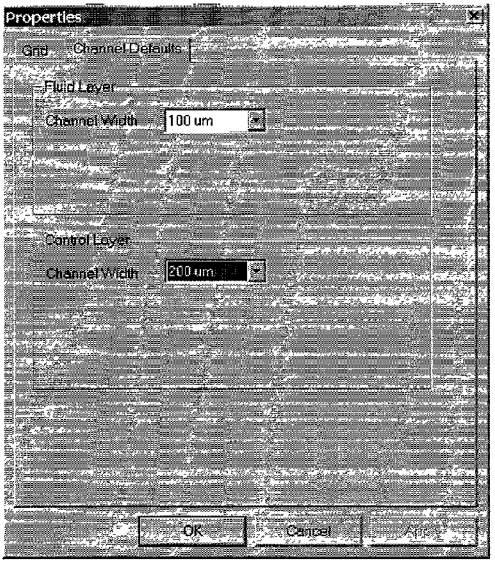

Figure 17 – Channel Defaults Selection Dialog Box

The drop down boxes allows you to set the default width of the channel that you draw on both the fluidic and control layer. Keep in mind that any drawn channel's width can be changed using the Property sheet for each channel.

Draw Menu

Figure 18 – Draw Dialog Box

Draw > Channel
The *Channel* command places the mode of the active drawing area into drawing channels. A drawn channel will be to the layer that is currently "Active". A layer can be set active in two methods: enabling the layer to be active through the *Library Manager*, Figure 12, or through a right mouse click while in the active drawing area with the *Select* tool selected. Select the *Layers* command to set the desired layer, Figure 19.

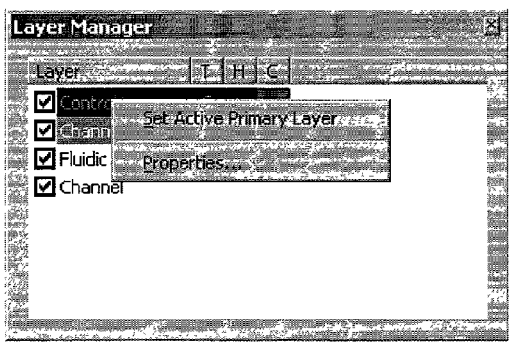

Figure 19 – Library Manager Window

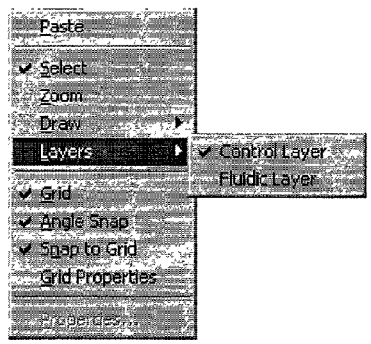

Figure 20 – Right Click Pop Up Menu in Drawing Area

Modify Menu

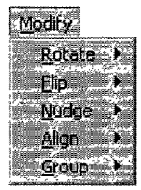

Figure 21 – Modify Menu Commands

Modify > Rotate
The *Rotate* command contains a submenu of commands, Figure 22, which can be performed on a selected object(s) in the active drawing area.

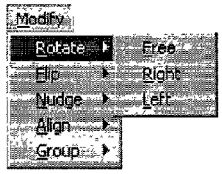

Figure 22 – Rotate Submenu Commands

*Modify > Rotate > Free*
The *Free* command allows you to freely rotate the selected object(s). Depending on the properties of the object it may or may not be enabled to rotate. Note that rotating objects can cause ports of components and channels to become detached from the grid making it difficult to connect channels.

*Modify > Rotate > Right*
The *Right* command allows you to rotate the selected object(s) clockwise 90 degrees.

*Modify > Rotate > Left*
The *Left* command allows you to rotate the selected object(s) counterclockwise 90 degrees.

Modify > Flip
The *Flip* command contains a submenu of commands, Figure 23, which can be performed on a selected object(s) in the active drawing area.

Figure 23 – Flip Submenu Commands

*Modify > Flip > Horizontal*
The *Horizontal* command allows you to flip the selected object(s) about a horizontal axis. Note that selected objects not grouped together will be flipped about the objects horizontal axis.

*Modify > Flip > Vertical*
The *Vertical* command allows you to flip the selected object(s) about a vertical axis. Note that selected objects not grouped together will be flipped about the objects veritcal axis.

Modify > Nudge
The *Nudge* command contains a submenu of commands, Figure 24, which can be performed on a selected object(s) in the active drawing area. The Nudge command can be used to move selected object(s) back onto the grid to help connecting to other channels or components on the grid.

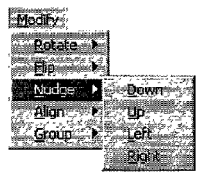

Figure 24 – Nudge Submenu Commands

*Modify > Nudge > Down*
The *Down* command allows you to move the selected object(s) down one micron in the active drawing area. Holding the Shift key while executing this command will move the object 5 microns.

*Modify > Nudge > Up*
The *Up* command allows you to move the selected object(s) up one micron in the active drawing area. Holding the Shift key while executing this command will move the object 5 microns.

*Modify > Nudge > Left*
The *Left* command allows you to move the selected object(s) left one micron in the active drawing area. Holding the Shift key while executing this command will move the object 5 microns.

*Modify > Nudge > Right*
The *Right* command allows you to move the selected object(s) right one micron in the active drawing area. Holding the Shift key while executing this command will move the object 5 microns.

Modify > Align
The *Align* command contains a submenu of commands, Figure 25, which can be performed on a selected object(s) in the active drawing area.

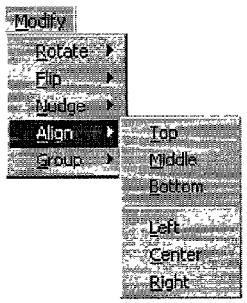

Figure 25 – Align Submenu Commands

*Modify > Align > Top*
The *Top* command allows you to select a group of objects in the active drawing area and have the top of the objects aligned together.

*Modify > Align > Middle*
The *Middle* command allows you to select a group of objects in the active drawing area and have all of the objects aligned to horizontal middle.

*Modify > Align > Bottom*
The *Bottom* command allows you to select a group of objects in the active drawing area and have the bottom of the objects aligned together.

*Modify > Align > Left*
The *Left* command allows you to select a group of objects in the active drawing area and have all of the objects aligned to the left.

*Modify > Align > Center*
The *Center* command allows you to select a group of objects in the active drawing area and have all of the objects aligned to vertical center.

*Modify > Align > Right*
The *Right* command allows you to select a group of objects in the active drawing area and have all of the objects aligned to the right.

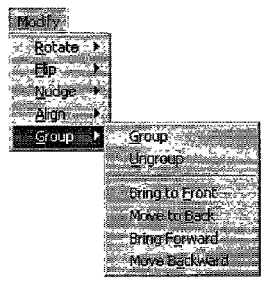

Figure 26 – Group Submenu Commands

*Modify > Group*
The *Group* command allows you to select a group of objects in the active drawing area and group the objects into a single entity or the ability to select a grouped object and ungroup them into their original components.

*Modify > Group > Group*
The *Group* command allows you to select a group of objects in the active drawing area and group the objects into a single entity.

*Modify > Group > Ungroup*
The *Group* command allows you to select a grouped object in the active drawing area and ungroup the objects back to their stand alone state.

*Modify > Group > Bring to Front*
Not Currently Implemented

*Modify > Group > Move to Back*
Not Currently Implemented

*Modify > Group > Bring Forward*
Not Currently Implemented

*Modify > Group > Move Backward*
Not Currently Implemented

Layer Menu

Figure 27 – Layer Menu Command

*Layer Manager*
The *Layer Manager* command brings up the Layer Manager dialog box as shown in Figure 27.

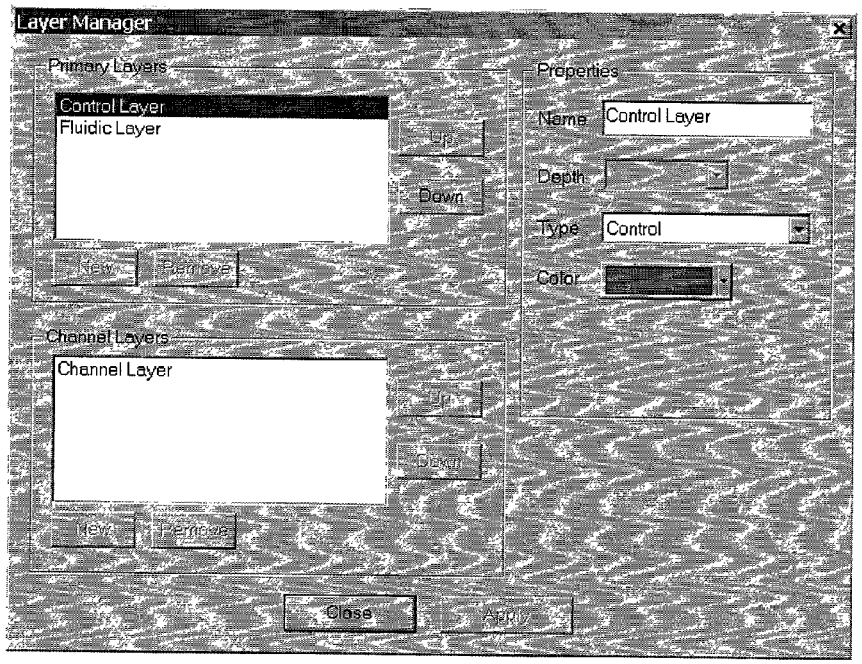

Figure 28 – Layer Manager Dialog

Primary Layers
The *Primary Layers* section of the dialog box shown in Figure 28 shows the total number of layers present in the design. Currently it is not possible to change the *Name* nor the *Depth* of these primary layers. You can change the color of the layers in the *Properties* section of the dialog box once the primary layer is selected. Click on the *Apply* button after any changes are made to save the changes.

Channel Layers
The *Channel Layers* section of the dialog box shown in Figure 28 shows the total number of channel depths available in one primary layer. Currently this is set to one channel depth per primary layer. You can change the name of the channel layer by left clicking on the layer name to select it in the Channel Layers section of the dialog and then entering in a new name in the *Properties* section. Click on the *Apply* button after any changes are made to save the changes. Also note that the channel depth is shown for the layer once it has been selected.

Window Menu

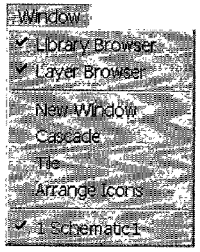

Figure 29 – Window Menu Commands

*Window > Library Browser*
This command close or open the Library Manager window. A check mark indicates that it is currently displayed.

*Window > Layer Browser*
This command close or open the Layer Manager window. A check mark indicates that it is currently displayed.

*Window > New Window*
This command will open up another drawing window with a copy of the design in the active drawing window.

*Window > Cascade*
This command will cascade all open design drawing windows in the application.

*Window > Tile*
The command will tile all open design drawing windows in the application.

*Window > Arrange Icons*
The command will arrange all iconified design drawing windows in the application and align them to the bottom of the drawing window area.

Help Menu

Figure 30 – Help Menu Command

The Help Menu currently only displays the version number of the application.

Toolbars

The tool bars shown in Figure 31 replicate much of the functionality that can be found in the Main Menu system but are readily accessible without having to select the menu to find the needed command.

There are a total of six toolbars that are set to appear upon the start of FluidArchitect: *File, Drawing, ZoomPan, Rotate, Align,* and *Nudge*. Each of these toolbars consist of a set of icons which represents a function that can be performed either on a selected object or on the design project itself.

Docking and Undocking
The tool bars initially are docked under the Main Menu system. As with typical Windows applications, the toolbars can be selected and undocked to float above the application for easier access. At anytime the toolbars can be "re-docked" back under the Main Menu by simply left clicking the mouse over the undocked toolbar and dragging it back to the docked area of the other toolbars.

File Toolbar

Figure 31 – File Toolbar

| Toolbar Command | Command |
|---|---|
|  | *New–* Opening a new design database and starts the Design Wizard to walk you through the setup. |
|  | *Open–* Opens an existing design database. |
|  | *Save–* Saves the design database of the active drawing window. |
|  | *Cut –* Cuts any selected object(s) in the active drawing window and saves it to the system clipboard. |
|  | *Copy –* Copies any selected object(s) in the active drawing window and saves it to the system clipboard. |
|  | *Paste –* Pastes a item from the system clipboard into the active drawing window. Note: It is not advisable to paste objects other than those cut or copied from the FluidArchitect application. |
|  | *Undo –* Undoes the last command performed. Repeated undo can be performed. |
|  | *Redo –* Redoes the last undo command. |
|  | *Print –* Prints a scaled copy of the design to the printer. The scaled design will be scaled to best fit the standard size printer page. |
|  | *Help –* Brings up the "About FluidArchitect" dialog with the release information. |

Table 1 – File Toolbar Commands

Drawing Toolbar

Figure 32 – Drawing Toolbar

| Toolbar Command | Command |
|---|---|
|  | *Select –* Opening a new design database and starts the Design Wizard to walk you through the setup. |
|  | *Group –* Groups selected objects in the active drawing window. |
|  | *Ungroup –* Ungroups objects that were previously grouped together using the *Group* command. |
|  | *Properties –* Displays the properties of a selected component/channel in the active drawing window. |
|  | *Draw Channel –* Places the mode of the active drawing window in the mode of drawing channels. Once this command is selected the tool remains in this mode until it is unselected through selecting another command. Right clicking twice in the active drawing area will switch the mode of the drawing area back to the *Select* mode. |
|  | *Text –* The text tool can be used to place notes in the active drawing window. Note: Text is NOT rendered onto the final output of the chip design. |

Zoom Pan Toolbar

Table 2 – File Toolbar Commands

Figure 32 – Zoom Pan Toolbar

| Toolbar Command | Command |
|---|---|
|  | Zoom – This command places the active drawing window in the zoom mode and the cursor becomes a magnifying glass icon. Click and hold the left mouse button and drag to form a rectangle over the area you wish to zoom into. |
|  | Zoom in 25% – This command zooms in the active drawing area in by 25%. |
|  | Zoom out 25 – This command zooms out the active drawing area by 25%. |
|  | Zoom to Fit – This command zooms the active drawing area to fit the entire chip to the display area. |
|  | Zoom to Selection – This command zooms the active drawing area to fit the selected objects to the display area. |
|  | Pan– This command places the active drawing window in the pan mode and the cursor becomes a hand icon. Click and hold the left mouse button to pan the active drawing area is the direction desired. |

Table 3 – Zoom Pan Toolbar Commands

Rotate Toolbar

Figure 33 – Rotate Toolbar

| Toolbar Command | Command |
|---|---|
|  | Rotate – The command is used to freely rotate a selected object in the active drawing area. Note: This command should be used carefully as freely rotating objects can cause the connecting point/ports to become "off-grid" making it impossible to connect other components and channels to it. |
|  | Rotate Left – This command rotates a selected object in the active drawing area 90 degrees counter clockwise. |
|  | Rotate Right – This command rotates a selected object in the active drawing area 90 degrees clockwise. |
|  | Flip Vertical – This command flips a selected object in the active drawing about its vertical center axis. |
|  | Flip Horizontal – This command flips a selected object in the active drawing about its horizontal center axis. |

Table 4 – Rotate Toolbar Commands

Align Toolbar

Figure 34 – Align Toolbar

| Toolbar Command | Command |
|---|---|
|  | *Align Top* – The *Top* command allows you to select a group of objects in the active drawing area and have the top of the objects aligned together. |
|  | *Align Middle* – The *Middle* command allows you to select a group of objects in the active drawing area and have all of the objects aligned to horizontal middle. |
|  | *Align Bottom* – The *Bottom* command allows you to select a group of objects in the active drawing area and have the bottom of the objects aligned together. |
|  | *Align Left* – The *Left* command allows you to select a group of objects in the active drawing area and have all of the objects aligned to the left. |
|  | *Align Center* – The *Center* command allows you to select a group of objects in the active drawing area and have all of the objects aligned to vertical center. |
|  | *Align Right* – The *Right* command allows you to select a group of objects in the active drawing area and have all of the objects aligned to the right. |

Table 5 – Align Toolbar Commands

Nudge Toolbar

Figure 35 – Nudge Toolbar

| Toolbar Command | Command |
|---|---|
|  | *Nudge Up* – The *Up* command allows you to move the selected object(s) up one micron in the active drawing area. Holding the Shift key while executing this command will move the object 5 microns. |
|  | *Nudge Down* – The *Down* command allows you to move the selected object(s) down one micron in the active drawing area. Holding the Shift key while executing this command will move the object 5 microns. |
|  | *Nudge Left* – The *Left* command allows you to move the selected object(s) left one micron in the active drawing area. Holding the Shift key while executing this command will move the object 5 microns. |
|  | *Nudge Right* – The *Right* command allows you to move the selected object(s) right one micron in the active drawing area. Holding the Shift key while executing this command will move the object 5 microns. |

Table 6 – Nudge Toolbar Commands

Library Manager

The Library Manager is show in Figure 36. This window of the FluidArchitect application contains the library components that are available for your design.

Use of the Library Manager is simple and straightforward. To select the library desired, simply left click on the title of the library and the components will be displayed. If more than one component is present in the library use the up or down button to scroll through them.

Once the proper component is found, left click the mouse button and hold and drag the component into the active drawing area and release the button to place the component.

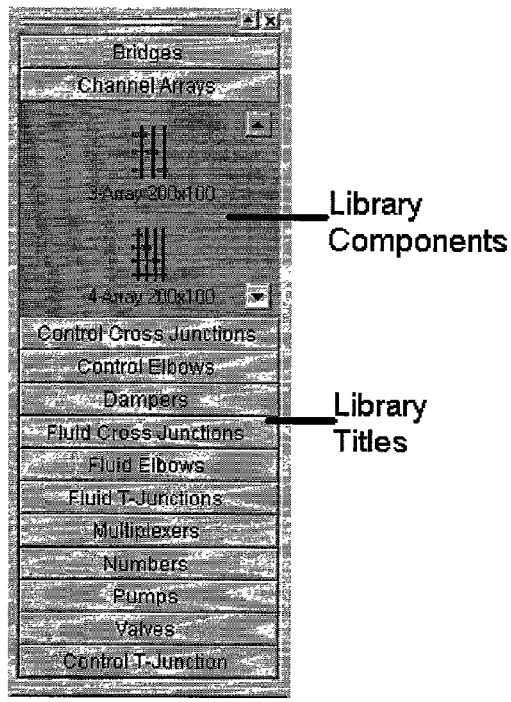

Figure 36 - Library Manager Window

Please refer to the Fluidigm Databook for a list of available library components along with their description and specifications.

Library Component Characteristics
A library component is typically composed of channels. Some components have channels only on one layer while some have channels on both layers. Figure 37 shows a microfluidic valve from the Valves library.

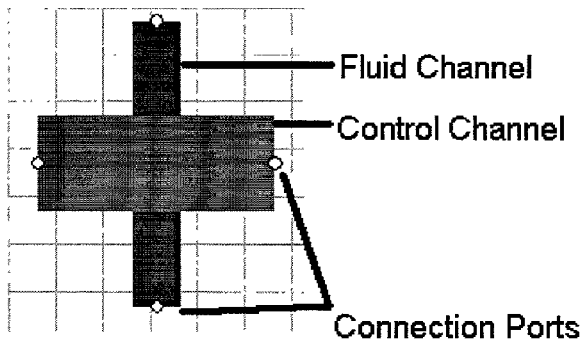

Figure 37 – Typical Library Component and Characteristics

The blue line represents a fluid channel present on the *Fluidic* layer while the red line represents a channel on the *Control* layer. The connection ports are points where connections from other components or drawn channels can legally be connected to the component.

> Note: Channel or component connections to connection ports of components MUST be members of the same layer.

Layer Manager

The Layer Manager serves to indicate the coloring of the layers as well as the different channel heights that are available in the particular layer. Currently only two layers are available at this time. The Layer Manager can be used to select the "Active" layer such that any drawn channels are added to that layer, change the coloring of the layer, and display or hide a layer from the active drawing area.

Figure 38 shows the Layer Manager window and the highlights the information available from the Layer Manager window.

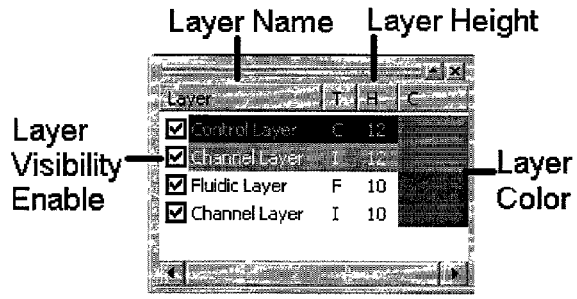

Figure 38 – Layer Manager

Layer Color
The default layer color is blue for the fluidic layer and red for the control layer. These colors can be changed to suit your preference.

Setting the Active Primary Layer
As mentioned above, the "Active Primary Layer" can be set through the Library Manager. Figure 39 shows the pop up after selecting the *Control* or *Fluidic* layer by left clicking to select it in the Layer Manager. Once selected, right clicking will bring up a pop up dialog box allowing you the ability to set the layer to be active.

Setting the layer to be active enables the following:

- Drawing of channels onto that layer.

- Selecting channels or components that are on that layer and performing actions on those selected.

- Changing the color of the layer. Any new color selected will replace the existing color for all components and channels in that layer.

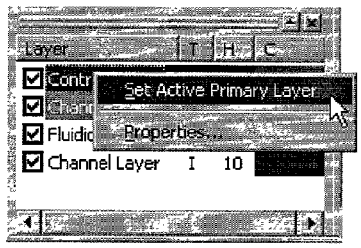

Figure 39 – Setting the Active Primary Layer

Active Drawing Area

The active drawing area is where components from the library are placed and connected together using the *Drawing* tools.

Rulers and Grid

The rulers displayed in the active drawing window displays the absolute location from (0,0) which represents the top left hand corner of the chip template. Figure 40 shows an example of the rulers and the grid from the active drawing window.

The lower right hand corner represents the (20000, 20000) position. These position numbers also translate into real measures as they are represented in microns. The grid color and the interval of grid lines can be changed using the *Grid Properties* command from the *View* menu.

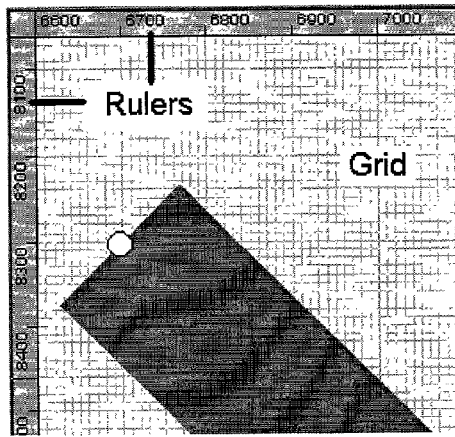

Figure 40 – Ruler and Grid from Active Drawing Window

Pop Up Menus

The active drawing area has right click pop up menus based on the function that is currently selected. There are two different pop up menus, one for the Select tool and the other for a selected component.

Select tool ( ) enabled Pop Up Menu

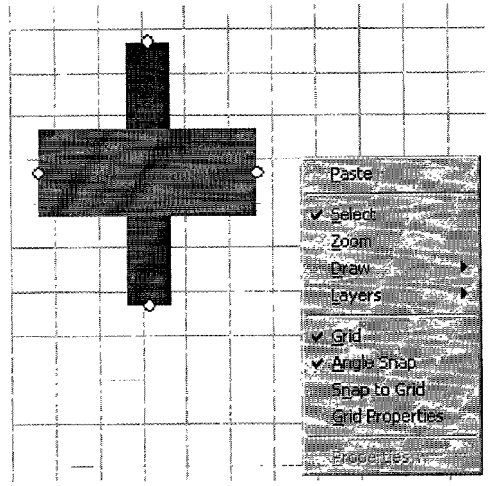

Figure 41 – Right Click Pop Menu with Select Tool Enabled

The pop up menu contains some of the most frequently used commands from the tool bar with the addition of the *Layers* command. The *Layers* command can be used to set active the layer you need to draw on without having to go to the Layer Manager. Figure 41 shows the submenu to select and set active a layer.

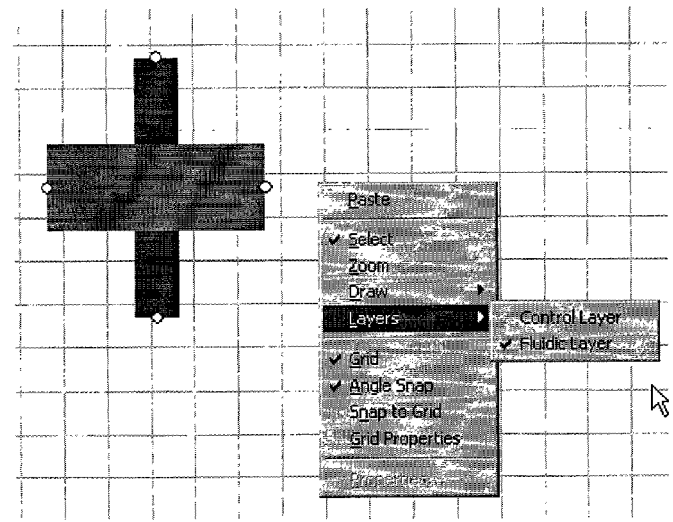

Figure 42 – Layer Submenu Selection

The check mark next to the layer name indicates the layer that is currently selected.

Selected Component/Channel Pop Up Menu

Once a component(s) or channel(s) is selected in active drawing area, a right click will pop up a menu to allow functions or commands to be performed on the selected objects.. The pop up menu is context sensitive in that a selected component will bring up a different pop up menu as opposed to a selected channel. Figure 43 shows a component selected and the pop commands available. The function descriptions can be found in the Main Menu or Toolbar commands with the exception of the *Properties...* command

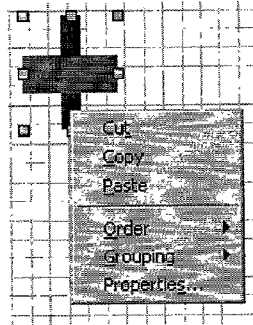

Figure 43 – Selected Component Pop Up Menu

Figure 44 shows a channel selected and the pop up menu with its available commands. Notice here the addition of the *Channel Widths* command. The Channel Widths command allows quick modifications of the drawn channels so that matching to connected components or channels is easily facilitated. Figure X shows an example where a channel drawn at 50 um needs to be connected to a pump control element that is 200 um in width.

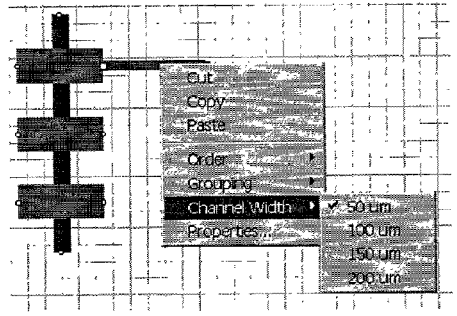

Figure 44 – Selected Channel Pop Up Menu

Status Bar

The Status Bar has two modes. One mode is when the drawing area is in the *Select* mode and the other is in the channel drawing mode.

Select Mode

In the *Select* mode the status bar contains the following information:

- Left Status Box:     Component Name

- Center Status Box:   Absolute Cursor Location (in microns)

- Right Status Box:    Percentage Zoomed In

Figure 45 shows the Status Bar while in the select mode.

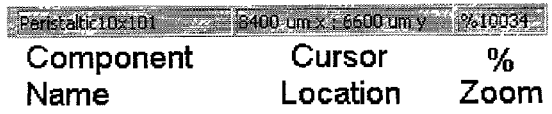

Component   Cursor   %
Name        Location  Zoom

Figure 45 – Status Bar in Select Mode

Drawing Mode

In the *Drawing* mode the status bar contains the following information:

- Left Status Box:    Length of channel drawn (in microns)
- Center Status Box:  Absolute Cursor Location (in microns)
- Right Status Box:   Percentage Zoomed In Figure 46 shows the Status Bar while in the select mode. Notice as you start drawing the channel the status bar is updated with the length of the channel drawn.

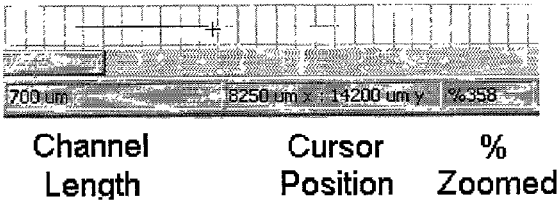

Channel    Cursor    %
Length     Position  Zoomed

Figure 46 – Status Bar in Drawing Mode

Chapter 4 – Creating a Design

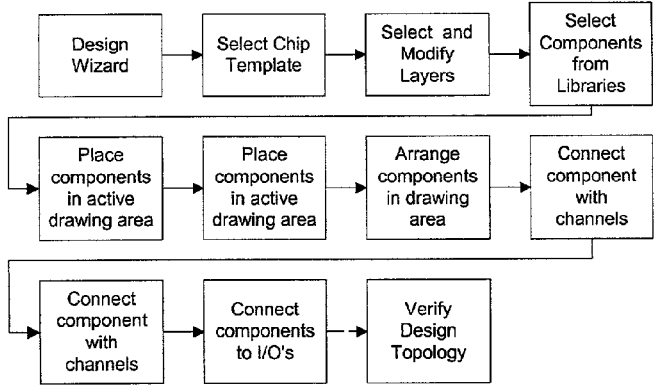

Figure 47 – Design Creation Block Diagram

General Rules For Design Implementation

FluidArchitect was built with many design rules that are implemented directly into the various parts of the design system. As such, FluidArchitect applies those design rules to your design as you are placing and connecting the components from the libraries in the drawing area. The following are general rules to keep in mind and will help lead to a successful design implementation.

- Only library components delivered by Fluidigm can be used in a design.

- Do not overlap components. All components should be connected to other channels or other components via port connections. (see *Connecting Components and Channels*)

- Do not overlap channels. Channels on the same layer or channels on different layers cannot be overlapped. User drawn channels must be used to connect other channels and components.

- Only connect channels on the same layer and of the same width. The set of components provided can be interconnected using the Channel tool. Depending on the layer, Fluidic or Control, a choice of channel widths is provided. Be sure to select the proper width for your connection.

- Use common sense for placement of components. Some components require more connections than others. Plan your design carefully so that you are not route restricted to where your components cannot be connected to due to other connection requirements.

Design Wizard

The Design Wizard walks you through the setup of the design and will allow you to set up the following details of your design:

- Design Directory
  The design database will be kept into the directory that you specify in this wizard screen, see Figure 48. You can change the final directory using the *Save* or *Save As...* command under the *File* menu.

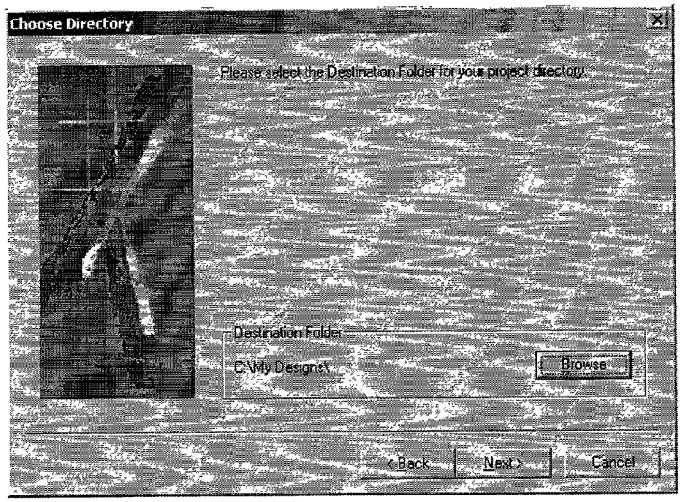

Figure 48 – Design Directory Selection Wizard Screen

- Chip Template Selection
  The appropriate chip template can be selected from this wizard screen, see Figure 49. As you click the < Previous and Next > buttons a thumbnail of the template will appear. Notice that the solid black circles represent where inputs and outputs will be placed and the number of each particular input and output size is shown to the right of the thumbnails. Currently, once you have selected a template it is not possible to change during your design process

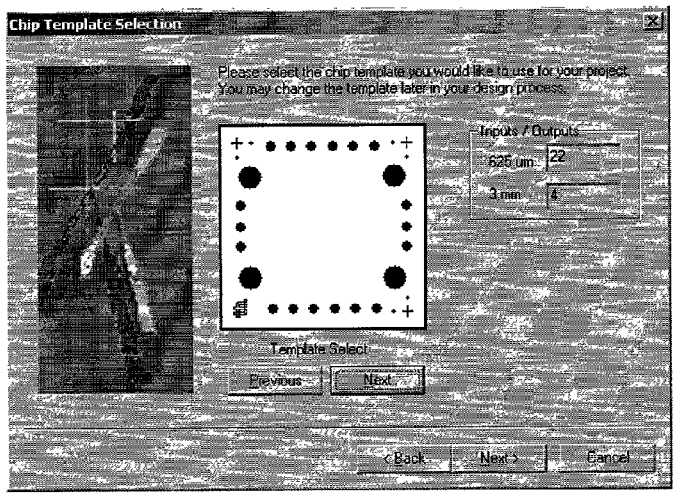

Figure 49 – Chip Template Selection Wizard Screen

- Layer Selection
  The layer selection screen, Figure 50, shows the number of layers that are available for use. The default is a pair of layers composed of the *Control Layer* and the *Fluidic Layer*. You can choose to deselect the layer by left clicking on the check box next to the layer name and the layer will be removed from the design. Note that after removal of this layer, active components will not be possible.

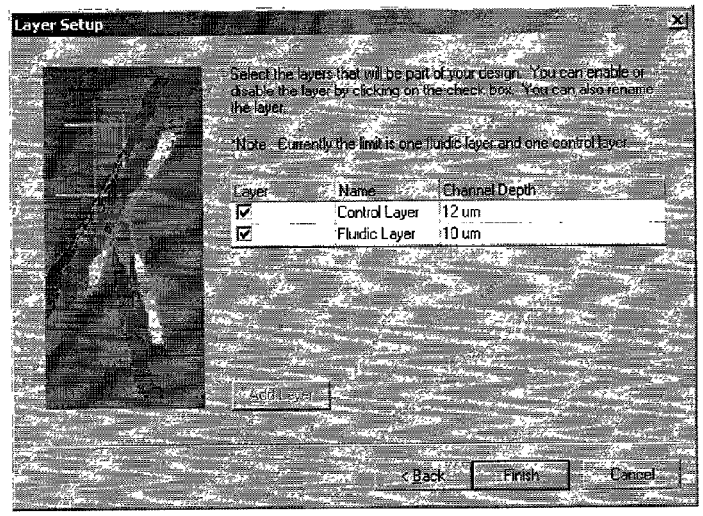
Figure 50 – Layer Selection Wizard Screen

Placing Library Components

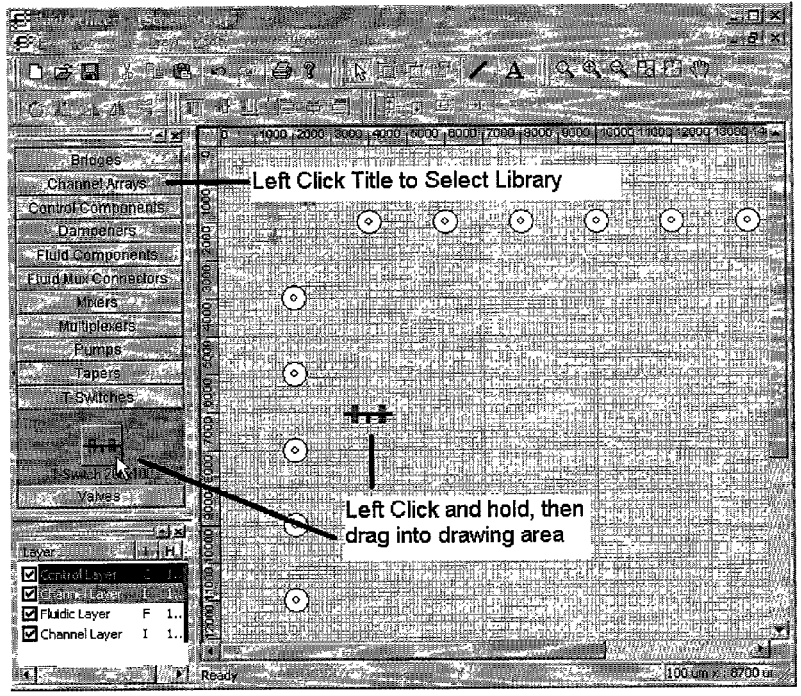

Figure 51 – Placing Components from the Libraries

The library contains a set of components that can be used in your design. Placement of the components accomplished by the following:

- Select the desired library by left clicking the mouse on the title of the library.

- Place the mouse over the desired component in the library window. The component will become selected and outlined.

- Left click and hold the mouse on the selected component and drag the component into the drawing area.

- Position the component where you would like to place it and release the left mouse button. The component will now be placed.

Figure 51 shows the process of placing the component from the library into the drawing area.

Note that the libraries provided are built specifically for use with our fabrication process. The components cannot be modified in any of its absolute dimensions. You only have control in its placement and its rotational position. If the component is rotated it should only be rotated in increments of +/- 90 degrees. Rotating using the free rotation tool can cause the component to become off grid and thus prevent it from being connected to other components or channels.

Ports of Channels and Components

After you have successfully dragged and dropped components onto the drawing area, the next step will be to connect the ports of the components with channels. Figure 52 shows the ports of a typical component.

- Ports are shown on components as black outlined white circles.
- Ports once successfully connected they appear as black filled circles. See Figure 53.
- Zooming in can help identify the ports on components and channels.

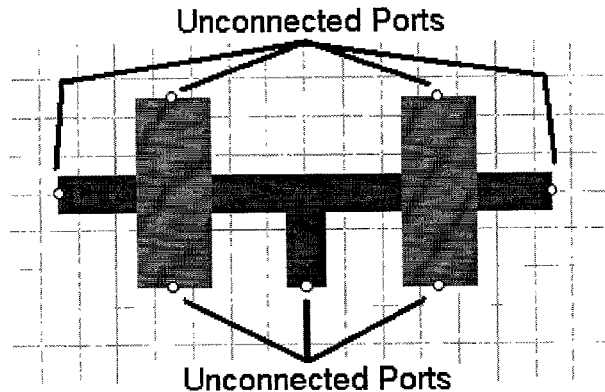

Figure 52 – Ports of a Component

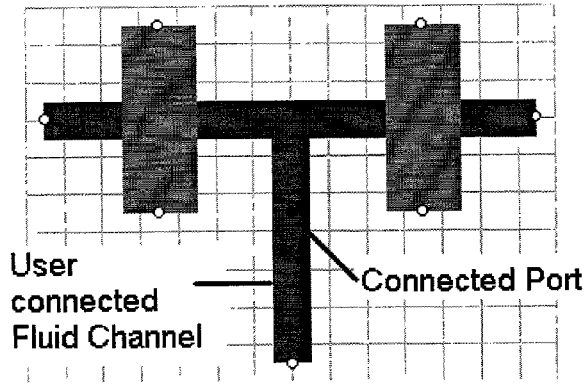

Figure 53 – Fluidic Channel Connect to a Component

Drawing Channels

Drawing channels to connect to other channels and components can be accomplished using the Draw Channel tool. Components are built up using channels in specific placement and physical dimensions. Thus, drawing channels to connect to components is the same as connecting to other drawn channels. The following are guidelines to keep in mind while drawing channels to make connections:

- Fluidic channels can only be connected to other fluidic channels.
- Control channels can only be connected to other control channels.
- Fluidic and Control channels cannot be drawn to overlap or cross each other.
- A 100um minimum separation between channels regardless of which layer the channels are members of.
- Only one layer can be set as "Active" so that any drawn channel is placed onto that layer.
- Widths of connecting channels must be the same.
- Channels can only be drawn orthogonally or parallel to the channel it is to be connected.

Procedure for Drawing a Channel

The *Channel* command under the Draw menu is used to enable the active drawing area for drawing channels. The following are the basic features to drawing channels.

- Selecting the Draw Channel command
- Left clicking to start one end point of the channel and dragging mouse to the location of the end point and double left click to end the channel.
- Single left clicking while drawing the channel will place vertex in the channel so that you can draw orthogonally from the placed vertex.
- Right clicking while drawing a channel will cancel the channel.
- When the drawn channel is within the "auto connect" area of a port or Input/Output, the cursor becomes a target (see *Target Tool* section). Left clicking twice will cause the drawn channel to become automatically connected.

Target Tool

Connecting channels to other channels and components is facilitated by the *Target Tool*, which is automatically engaged when drawing channels for interconnections. Figure 54 shows a channel being drawn from the right to left towards the unconnected port.

Figure 54a shows a channel being drawing towards the input of a component with the cursor identified as the "+" symbol. Figure 54b shows the cursor detecting a port on the component or channel and changing into a "target" cursor. When the target cursor is present you can double click the left mouse button and automatically the interconnection to the port of the channel or component. The result is shown in Figure 54c. where the port has turned black indicating that the port was successfully connected.

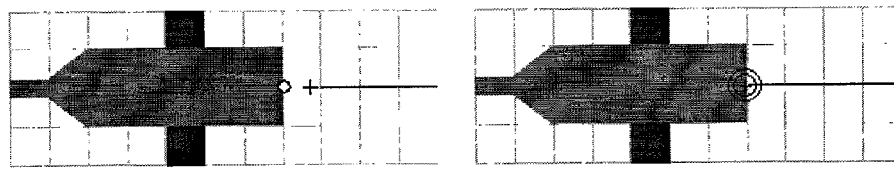

a.　　　　　　　　　　b.

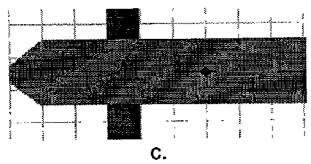

c.

Figure 54. a Channel Port Not Detected, b. Channel Port Detected, c. Channel Connected to Port

Input and Output Ports

The input and output ports, more commonly referred to as "I/O's", are the large circular figures on the template of the chip. Typically the I/O's are found near the perimeter of the chip. The I/O's are predetermined based on the template chosen in the Design Wizard.

I/O Ports are used to accomplish the following:

- Provide connections to fluid and material input and output from the chip.

- Provide connections to the control channels to input control signals such as air pressure.

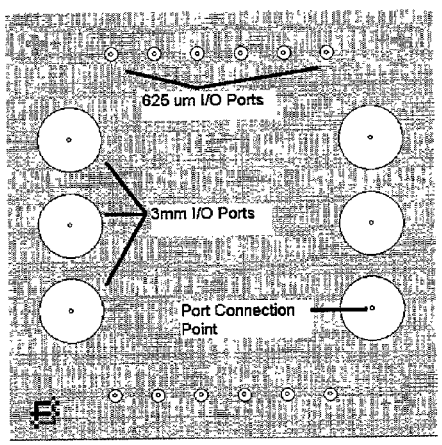

Figure 55 – Chip Template with 6 – 3mm and 12 – 625um I/O Ports

Figure 55 also shows a typical chip template with a preset I/O configuration. The connection point for each of the ports is illustrated in the figure as well. The connection point is the smaller concentric circle that is inside of the port. Connecting a channel to a port is can be accomplished by drawing a channel from a channel and when the target tool is engaged over the port, double left clicking the mouse will attach the to the I/O. Once successfully connected to the I/O, the I/O will turn blue and the inner circle will become a filled black circle. Figure 56 shows a connected I/O.

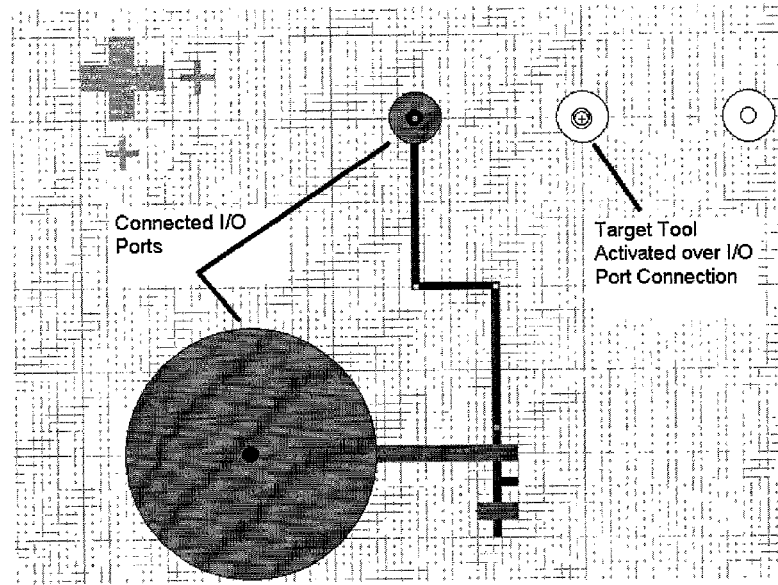

Figure 56 – Connected and Unconnected I/O Ports

Channel Properties

Components and channels can be assigned user defined names by accessing the Properties sheet for the component or channel. Channel Properties can be used to accomplish the following:

- Change Channel Instance Names

- Change Channel Widths (Fluidic and Control)

- List the connections to other components or channels

Figure 57 shows the channel dialog box for a selected control channel. You can change the width to any value in the drop down box as well as assign a new name to the channel. The channel is not currently connected to any other channel or component so the *Connections* list is empty.

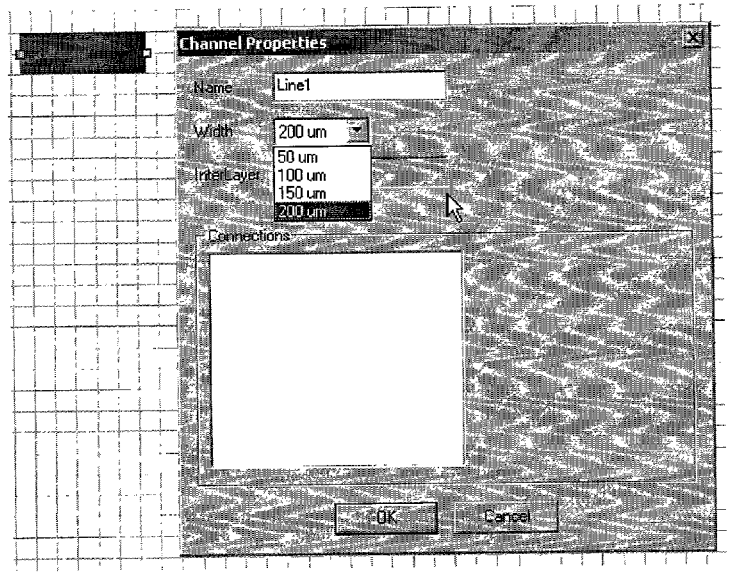

Figure 57 – Channel Properties Dialog Box

Component Properties

Library components are assigned a default name in the design. You can assign your own instance name to these components, as well as I/O's, to help identify them in the design.

Figure 58 shows a selected T-Switch that was placed from the library. To bring up the Properties dialog box do the following:

- Right click on the T-Switch and select *Properties…*

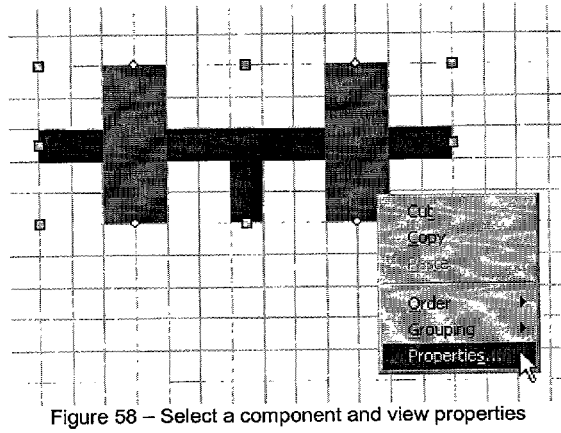

Figure 58 – Select a component and view properties

- The Component Properties dialog box will appear. In this case, this component has been named "*My_T-switch*". Figure 59 shows that type of component as well as two other tabs that contains placement information regarding the component.

44

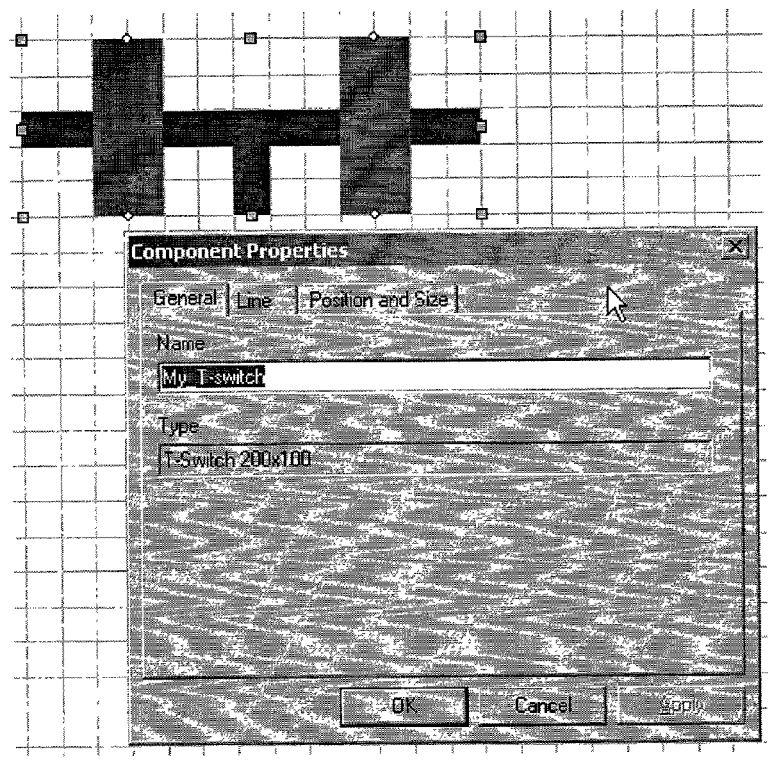
Figure 59 – Component Instance Property Dialog Box

Design Example

In the following design example a simple cell sorter, shown in Figure 60, is created using FluidArchitect. The pump drives into a T-Switch. The T-Switch is used to drive the fluid/material flow into one of two ports based on the detection region feedback to a system, which monitors and controls the flow. The design will illustrate the methods and procedures used to create the design in FluidArchitect.

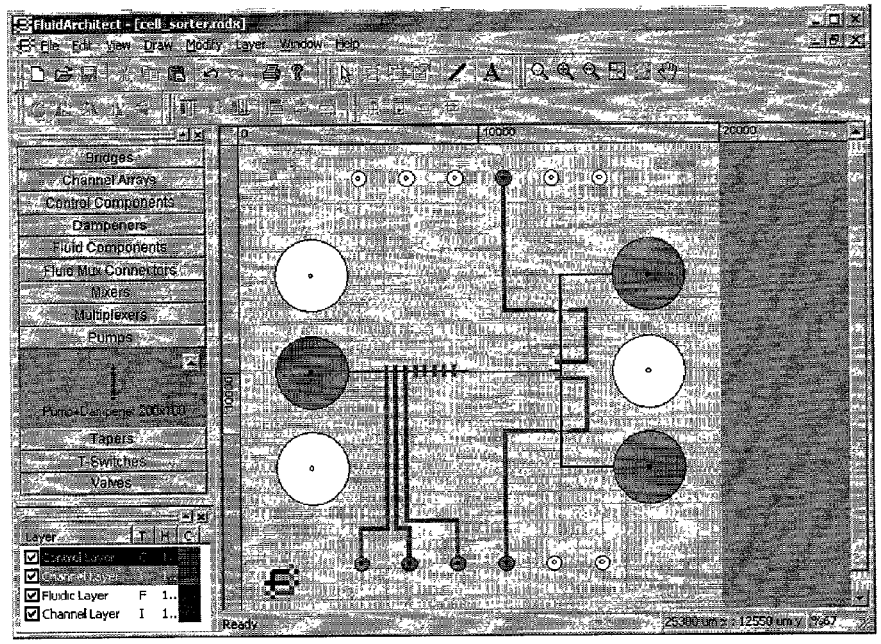

Figure 60 – Completed Design of the Simple Cell Sorter

Components Required

The components required to construct the simple cell sorter are:
- 1 - Peristaltic Pump
- 1 - T-Sorter
- 2 – 30 um–100 um Fluidic Tapers
- 2 – Bridges
- 3 – 3 mm I/O Ports
- 5 – 625 um I/O Ports

Basic Operation of the Design

Figure 61 shows the pump, T-Sorter, and the bridges connected in the drawing area. There are many ways to connect the components together and if the design rules are not violated the design will be valid.

Figure 61 also points out a "Detection Region". This region can be used by an optical detection system to control the direction of the flow through the T-Sorter. The detection region is not a component from the library but rather a user drawn 30 um fluidic channel connecting fluidic taper components forming the region.

Cells are pumped through the channel from the 3mm input port on the left side of the chip using the three control valves and five damping elements that constitutes the pump. An external detection system, such as an optical measuring system, detects cells as they flow through the "Detection Region". The cells can be directed in either direction to the 3mm output ports by actuation of the T-sorter valve switches. The Bridge components are used to enable the crossing of fluid lines by control lines without creating a parasitic valve. The Bridge components were used in this design to create an area clear of channels for the "Detection Region".

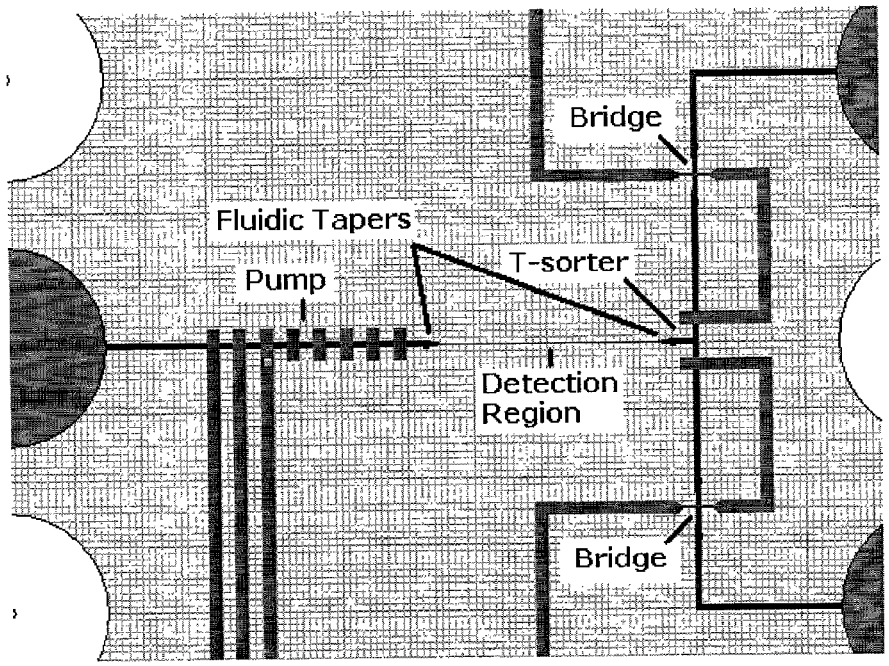

Figure 61 – Components of the Simple Cell Sorter

Creating the Design

Start the design by launching FluidArchitect from the *Start* menu > *FluidArchitect* > *FluidArchitect* on your PC.

Once the FluidArchitect is started, the next step is to select *File* menu > *New*. The design wizard will start and guide you through the setup for a new design.

Design Wizard Setup

The Figure 62 shows the Design Wizard screens as they appear in order querying for selections. Carefully read the screens shown by the Design Wizard to appropriately setup the design. Failure to setup the design correctly could lead to reiterations of the design to get the desired results.

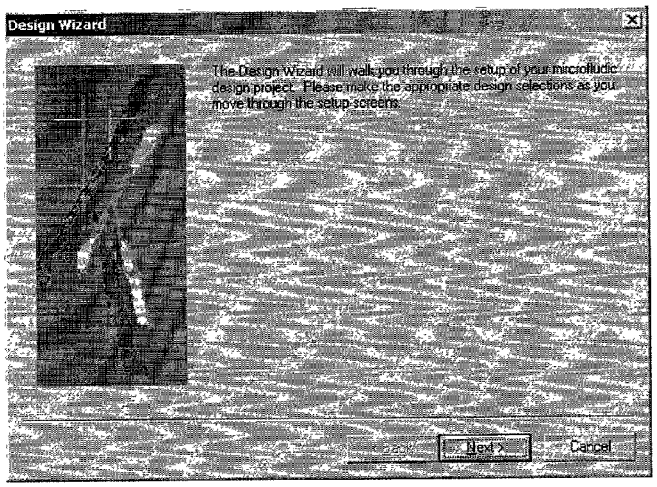

Figure 62 – First Design Wizard Screen

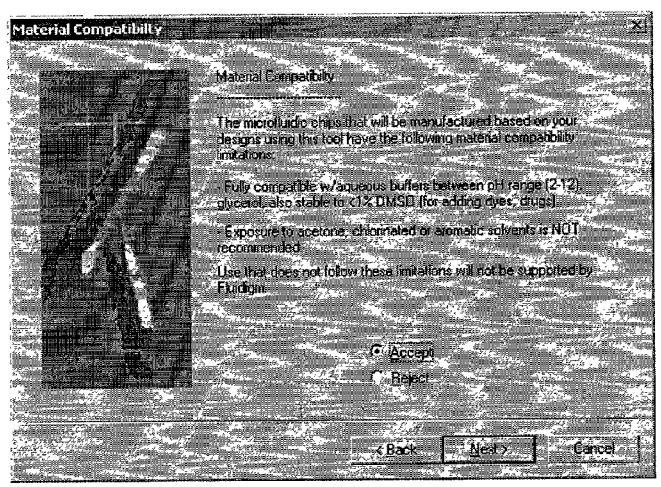

Figure 63 – Material Compatibility Design Wizard Screen

The material compatibility screen warns you to the materials that can and cannot be used with the microfluidic chips that are designed with the FluidArchitect system and fabricated by Fluidigm. Selecting "Accept" will allow you move forward with the design setup. If your needs are not met and you "Reject" the Design Wizard will not go forward. Please contact the factory for more details regarding your special needs.

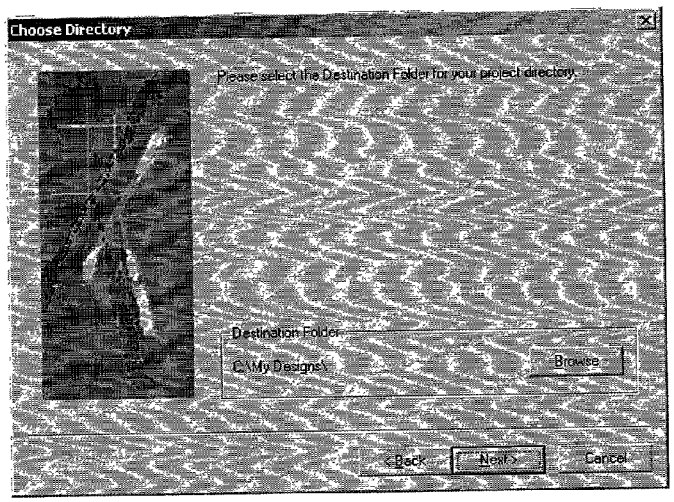

Figure 64 – Project Directory Selection

The Project Directory selection screen simply selects the directory where your design database will be stored.

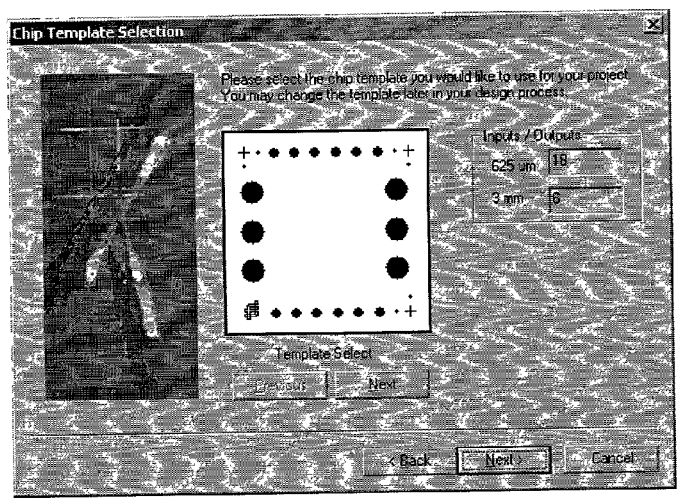

Figure 65 – Chip Template Selection

The chip template selection is very important. Please consider your design and how many inputs and outputs are needed. There are several templates to choose from and the number of 625 um and 3 mm input/output ports are shown in the page as you select the template need. Currently it is not possibly to change chip templates in the middle of a design.

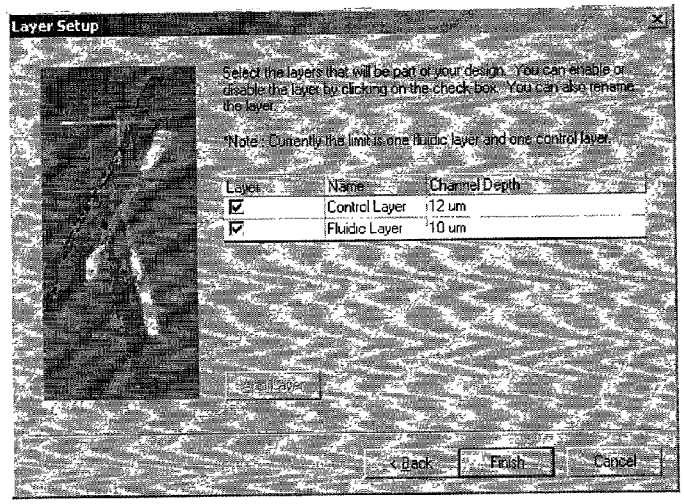

Figure 66 – Layer Setup

The layer setup page allows you to select the layers needed in your design. By default two layers are selected and this is necessary to create active fluidic circuits on the chip. Currently the system is restricted to having a maximum of two layers. Each layer has a channel depth associated with the layer that is fixed in depth.

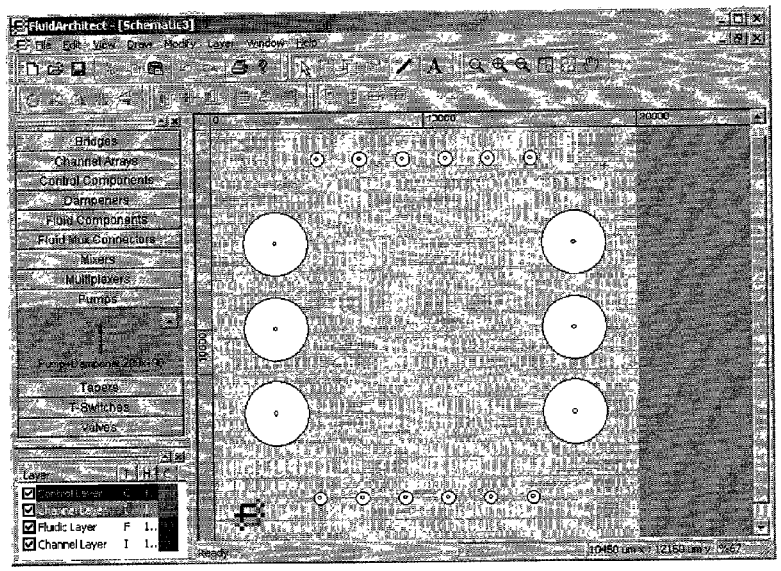

Figure 67 – Completed Design Wizard Setup View

Once you have completed the Design Wizard the chip template chosen will appear in the drawing area as shown in Figure 67. The library components are ready for selection and placement into your design. The layer manager indicates the color of the channels and two which layer they belong as well as the current "Active" layer which is highlighted in black.

Placing Components

Simply select the library from which to drag and drop the components and place them into the drawing area. Left click on the T-Switches title bar in the Library Manager to select the library. Figure 68 shows the T-Switch library being selected and the T-Switch being placed into the drawing area. As the T-Switch is being dragged and positioned it appears as outline of dashed lines. Once placed

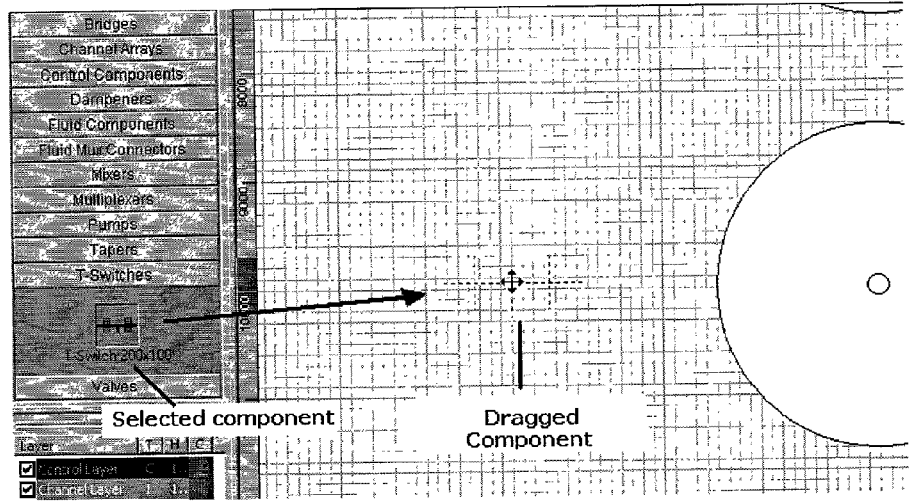

Figure 68 – Placing the T-Switch Component

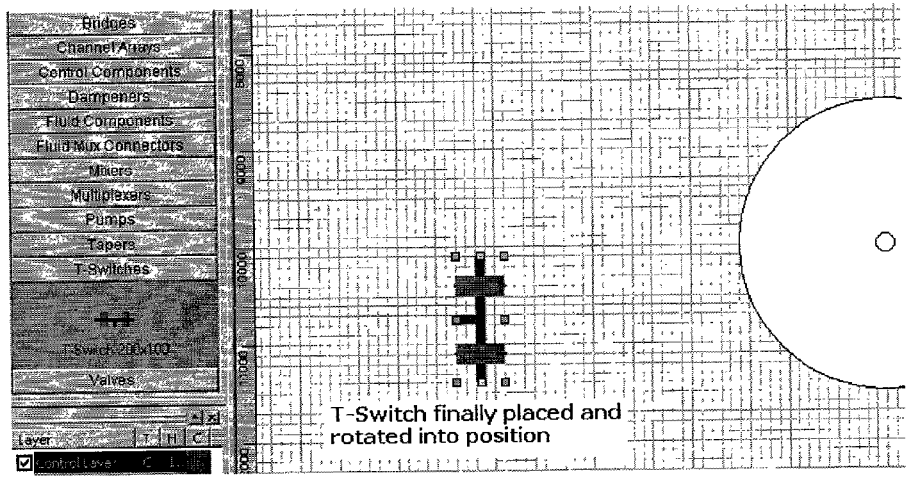

Figure 69 – Finally Placed T-Switch

The placed T-Switch component can now be selected by left clicking it. Once selected, it can be rotated or positioned depending on what is required.

Now, the steps above should be repeated to place the rest of the components for this design.

Connecting the Components

Once all of the components are placed, they must be connected. The components typically consist of channels from both the fluidic and control layers that are specifically positioned and dimensioned to insure proper operation.

Figure 70 shows the connection of the T-Switch to the "Detection Region", which consists two taper elements and a 30 um channel connecting between the two tapers. Recall that to select a component that only has channel in either the fluidic or control layer, the fluidic or control layer must be set "Active". This can be done in the Layer Manager by left clicking on the desired layer and right clicking to bring up the pop up menu to set the layer "Active" OR this can also be done by right clicking in the drawing area and bring up the pop up menu and selecting *Layer > Control* or *Fluidic*.

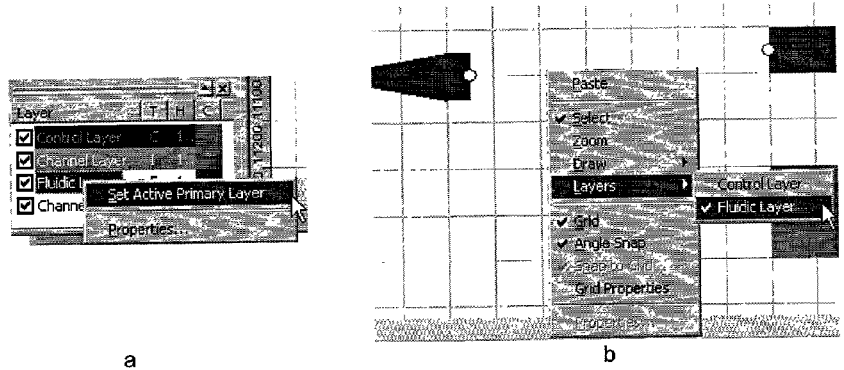

a                                       b

Figure 70. a. Selecting the "Active" Layer through the Layer Manager, b. Selecting the "Active Layer" through the right clicked pop up menu in the drawing area.

In this case the Fluidic Layer needed to be selected as the 30 um – 100 um Taper component was being connected to the input of the T-Switch. Figure 71 shows a channel being drawn from the right end of the Taper component to the input of the T-Switch. Once the cursor turns into the Target Tool a left click will cause a channel to be connected to the unconnected port.

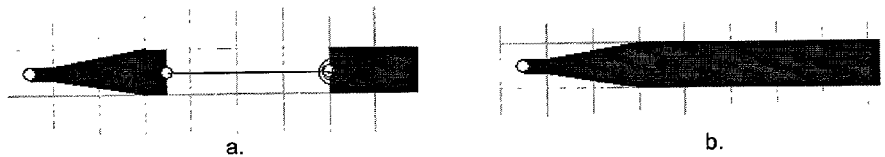

a.                                       b.

Figure 71 – a. Drawing a Fluidic Connecting Channel, b. Successfully Connected Channel.

Adding a Vertex While Drawing a Channel

While you are drawing a channel, you can single left click to place a vertex from which you can continue to draw a straight channel or draw the channel orthogonally from the placed vertex. Figure 72 shows an example of how to place a vertex and draw a channel with an orthogonal continuation.

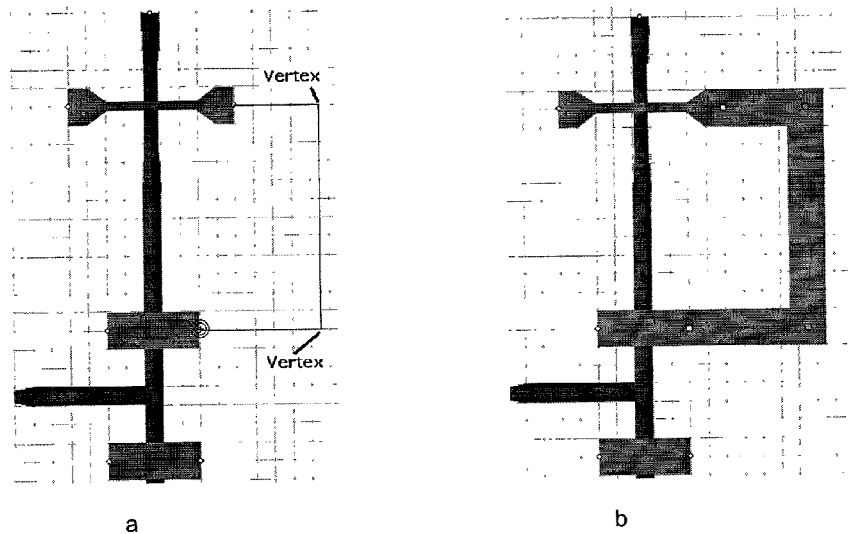

Figure 72 – a. Drawing the control channel and placing the two vertices as shown. b. Completing the connection and the control channel.

Changing the Channel Widths

The width of the drawn fluidic channel was set to 100 um as the default. The default setting for a new design is 100 um for a user drawn fluidic channel and 200 um for a user drawn control channel. FluidArchitect will keep the default width setting until the user changes the channel width through selecting a channel and changing its width. Figure 73 shows the how the drawn fluidic channel is originally drawn as 100 um but needs to be resized to match the components that it connects to.

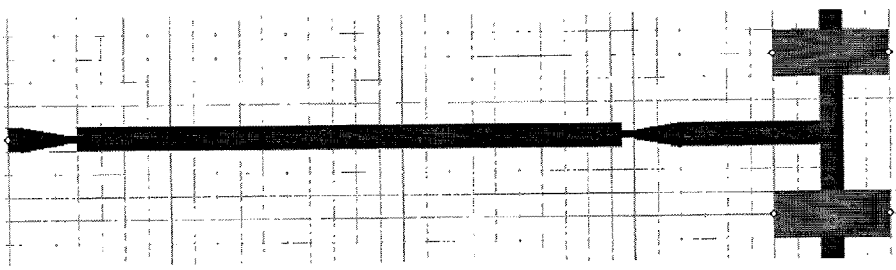

Figure 73 – Drawn Channel Not the Correct Width for Connection

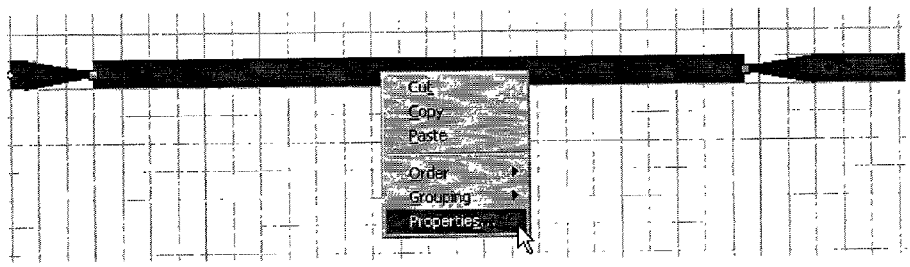

Figure 74 – Open the Channel Properties Dialog to Set Correct Channel Width

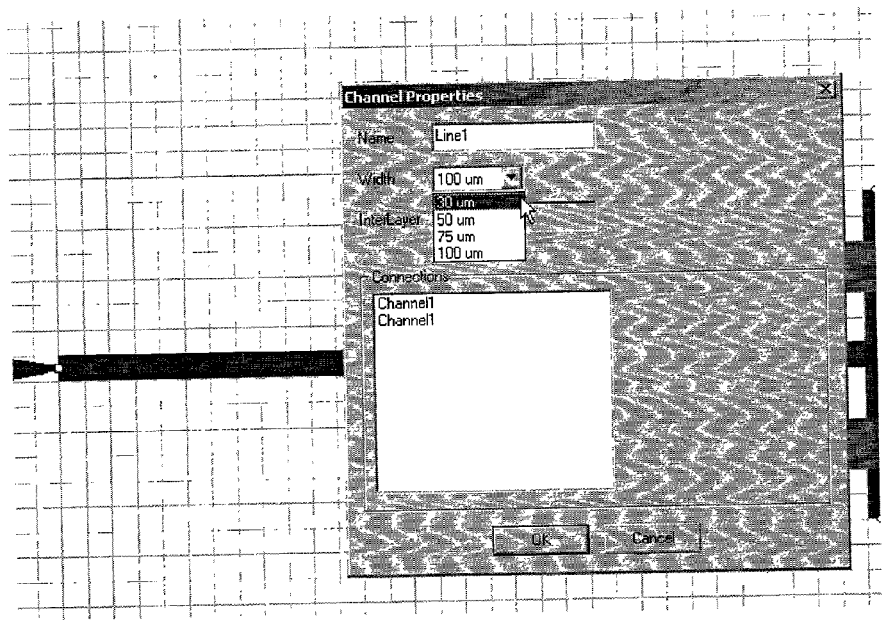

Figure 75 – Setting the Channel Width

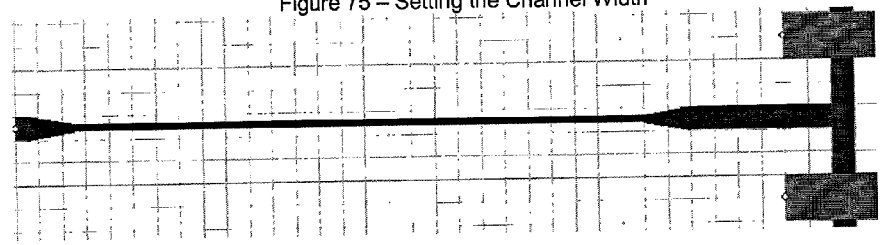

Figure 76 – Drawn Fluidic Channel Width is Now Correct

Connecting To I/O Ports

Once all of the components have been interconnected, the inputs and outputs (I/O) need to be connected. They are connected much in the same way that channels are connected with the help of the Target tool. Once the I/O's are successfully connected, the outlined ports will turn from white to black and the port will turn blue as well. Figure 77 shows an example of a successfully connected 625 um port.

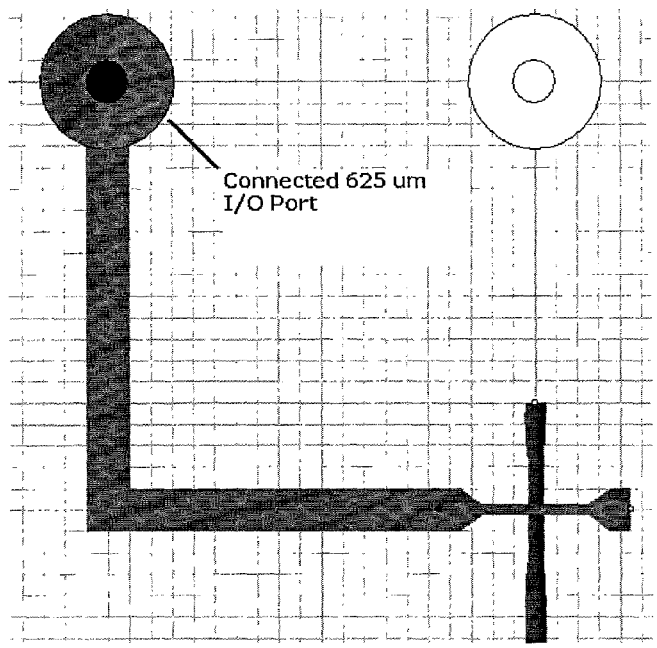

Figure 77 – Bridge Component Connected to an I/O Port

Conclusion

Using the techniques in the example design give above will help lead to successful microfluidic chip design using FluidArchitect. Recall, there are built in design rule checkers that will give you warnings and errors from time to time as you are designing based on what you are connecting and drawing.

What is claimed is:

1. A method, using a computer system, for designing a microfluidic circuit schematic comprising a plurality of microfluidic component symbols associated with a plurality of microfluidic components, said method comprising:
   placing a first component symbol of said plurality of microfluidic component symbols on a schematic, wherein said first component symbol has associated property;
   placing a second component symbol of said plurality of microfluidic component symbols on said schematic; and
   connecting said first component symbol to said second component symbol;
   wherein said associated property has at least one of physical scaling, physical property, layer assignment, and functional definition; and said physical property includes a physical dimension having depth information.

2. The method of claim 1 wherein said plurality of microfluidic component symbols are multilayered symbols.

3. The method of claim 1 wherein said plurality of microfluidic components comprise structures having an elastomeric material.

4. The method of claim 1 wherein said first component symbol comprises a first indication for a control channel and a second indication for a fluid channel.

5. The method of claim 4 wherein said first indication is placed on a first layer and said second indication is placed on a second layer.

6. The method of claim 1 wherein said first component symbol functions as a NAND gate.

7. The method of claim 1 wherein said first component symbol functions as a S-R latch.

8. The method of claim 1 wherein said plurality of microfluidic component symbols are selected from the group consisting of channel symbols, pump symbols, valve symbols, chamber symbols, multiplexer symbols, bridge symbols, macro symbols, user defined symbols, and layer interconnect symbols.

9. The method of claim 1 wherein said first component symbol comprises a first control channel symbol and a first fluid channel symbol, said second component symbol comprises a second control channel symbol and a second fluid channel symbol, and said connecting comprises connecting said first fluid channel symbol to said second fluid channel symbol.

10. The method of claim 1 wherein said first component symbol comprises a first control channel symbol and a first fluid channel symbol, said second component symbol comprises a second control channel symbol and a second fluid channel symbol, and said connecting comprises connecting said first control channel symbol to said second control channel symbol.

11. The method of claim 1 wherein said connecting includes a design rule check.

12. The method of claim 1 wherein selected component symbols of said microfluidic circuit schematic include functional information and are functionally simulated by applying control signals to said selected component symbols to show functional connectivity.

13. The method of claim 12 wherein functionally simulating selected component symbols comprises defining functional information of said selected component symbols as including Boolean expressions with operands based on control ports of the selected component symbols which control connections to input ports and output ports of the selected component symbols.

14. The method of claim 12 wherein functionally simulating selected component symbols comprises simulating actuation of said selected component symbols using control signals generated by a Boolean based language with timing constraints.

15. A method for capturing a design of a microfluidic system using a computer aided design tool, said method comprising:
   selecting a schematic having a plurality of layers;
   placing a first symbol representing a first component of a plurality of microfluidic components on said schematic, said first component comprising a first fluid channel symbol and a first control channel symbol, said first symbol having related functional information, said first fluid channel symbol and said first control channel being on different layers of said plurality of layers;
   placing on said schematic a second symbol representing a second component of said plurality of microfluidic components, said second component comprising a second fluid channel and a second control channel; and
   connecting said first symbol to said second symbol.

16. The method of claim 15 wherein said first symbol is an IDEF0 symbol.

17. The method of claim 16 wherein said second symbol is another IDEF0 symbol and said connecting includes connecting an output of said IDEF0 symbol to an input of said another IDEF0 symbol.

18. The method of claim 15 wherein said second symbol is a multilayered symbol having a first channel on a first layer and a second channel on a second layer.

19. The method of claim 15 wherein said first symbol includes a first indication for said first fluid channel and a second indication for said first control channel.

20. The method of claim 15 wherein said plurality of microfluidic components are selected from the group consisting of channels, pumps, valves, chambers, pressure oscillators, and layer interconnects.

21. The method of claim 15 wherein symbols are connected according to predetermined design rules.

22. The method of claim 15 wherein said first symbol is placed interactively on said schematic.

23. The method of claim 15 wherein said first symbol is placed automatically on said schematic.

24. A design capture system for capturing a microfluidic circuit comprising a plurality of microfluidic components, said design capture system comprising:
   a microfluidic component library comprising functional information and symbols associated with said plurality of microfluidic components, wherein each of said symbols has associated property; and
   a schematic entry module used for placing and connecting said symbols;
   wherein said associated property has at least one of physical scaling, physical property, layer assignment, and functional definition and said physical property includes a physical dimension having depth information.

25. The design capture system of claim 24 wherein said symbols are multilayered symbols.

26. The design capture system of claim 24 wherein said symbols have depth information.

27. The design capture system of claim 24 wherein one of said symbols includes a first indication for a fluid channel and a second indication for a control channel.

28. The design capture system of claim 24 wherein said plurality of microfluidic components comprise structures having an elastomeric material.

29. The design capture system of claim 24 wherein said placing of said symbols includes dragging and dropping a symbol from an active library area to an active drawing area.

30. The design capture system of claim 24 wherein said schematic entry module includes a window on a display, said window comprising a component library area and an active drawing area.

31. The design capture system of claim 30 wherein said window further includes a layer area, said layer area indicating a layer of a plurality of drawing layers in said active drawing area that has items on said layer displayed.

32. A computer program product stored in a computer readable medium for capturing a design of a microfluidic system using a computer aided design tool, said computer program product comprising:
    code for selecting a schematic having a plurality of layers;
    code for placing a first symbol representing a first component of a plurality of microfluidic components on a schematic, said first component comprising a first fluid channel and a first control channel;
    code for placing a first symbol representing a first component of a plurality of microfluidic components on said schematic, said first component comprising a first fluid channel symbol and a first control channel symbol, said first fluid channel symbol and said first control channel being on different layers of said plurality of layers;
    code for placing a second symbol representing a second component of said plurality of microfluidic components, on said schematic, said second component comprising a second fluid channel and a second control channel; and
    code for connecting said first symbol to said second symbol.

33. A method for synthesizing a network model of a microfluidic circuit comprising a plurality of microfluidic components, said method comprising:
    storing in a computer readable medium a synthesis program;
    selecting from a database, component models associated with said plurality of microfluidic components, said component models having layer information and channel depth information; and
    generating said network model by using said component models and said synthesis program, wherein said component models are connected together using said layer information and channel depth information.

34. The method of claim 33 wherein said plurality of microfluidic components comprise structures having an elastomeric material.

35. The method of claim 33 wherein one of said component models includes a symbol related to a component of said plurality of microfluidic components.

36. The method of claim 33 wherein said network model is displayed as a schematic, comprising symbols of said plurality of microfluidic components connected together.

37. The method of claim 33 wherein said database includes a macro library and a basic library of microfluidic components.

38. The method of claim 33 wherein said synthesis program comprises code selected from the group consisting of VHDL, Verilog, VHDL-AMS, Verilog-A, VHDL-A, Verilog-AMS, C, and C++.

39. A synthesis system for creating a schematic of a microfluidic circuit comprising a plurality of microfluidic components, said synthesis system comprising:
    a memory for storing synthesis code related to said schematic;
    a design library comprising a plurality of indications associated with said plurality of microfluidic components, said plurality of indications having layer information and channel depth information, wherein selected indications of said plurality of indications are selected using said synthesis code; and
    a synthesis module for creating said schematic by connecting said selected indications using layer information and channel depth information associated with said selected indications.

40. The synthesis system of claim 39 further comprising a display module for showing said schematic.

41. The synthesis system of claim 39 wherein said synthesis module is configured to optimize said schematic.

42. The synthesis system of claim 39 wherein said synthesis code comprises code selected from a group consisting of VHDL, Verilog, VHDL-AMS, Verilog-A, VHDL-A, Verilog-AMS, C or C++.

43. A computer program product stored in a computer readable medium for synthesizing a network model of a microfluidic circuit comprising a plurality of microfluidic components, said computer program product comprising:
    a synthesis program;
    code for selecting from a database, software component models associated with said plurality of microfluidic components, said software component models having layer information and channel depth information; and
    code for generating said network model by using said software component models, including said layer information and channel depth information and said synthesis program, wherein said software component models are connected together.

44. A method for functionally analyzing a schematic, having a control layer and a fluid layer, of a microfluidic circuit comprising a plurality of microfluidic components, said method comprising:
    selecting a functional model for a component of said plurality of microfluidic components;
    determining a logic control test sequence for said control layer of said schematic; and
    functionally simulating said schematic by using said functional model in said schematic and said logic control test sequence to show functional connectivity of the microfluidic circuit.

45. The method of claim 44 wherein said plurality of microfluidic components comprise structures having an elastomeric material.

46. The method of claim 44 wherein said functional model includes code selected from the group consisting of VHDL, Verilog, VHDL-AMS, Verilog-A, VHDL-A, Verilog-AMS, C, and C++.

47. The method of claim 44 wherein said logic control test sequence includes code from a digital simulation language.

48. The method of claim 44 wherein said logic control test sequence includes code selected from the group consisting of VHDL, Verilog, VHDL-AMS, Verilog-A, VHDL-A, Verilog-AMS, C, and C++.

49. The method of claim 44 wherein said logic control test sequence includes code from a Diagnostic Chip Control language (DCCL).

50. A system for functionally analyzing a schematic, having at least one control layer and at least one fluid layer, of a microfluidic circuit comprising a plurality of microfluidic components, said system comprising:
- a functional model for a component of said plurality of microfluidic components;
- a logic control test sequence for at least one control layer of said schematic; and
- a functional simulator for functionally simulating said schematic by using said functional model in said schematic and said logic control test sequence to show functional connectivity of the microfluidic circuit.

51. The method of claim 50 wherein said functional model includes code selected from the group consisting of VHDL, Verilog, VHDL-AMS, Verilog-A, VHDL-A, Verilog-AMS, C, and C++.

52. The method of claim 50 wherein said plurality of microfluidic components comprise structures having an elastomeric material.

53. A computer program product stored in a computer readable medium for functionally analyzing a schematic, having at least one control layer, of a microfluidic circuit comprising a plurality of microfluidic components, said computer program product comprising:
- code for selecting a functional model for a component of said plurality of microfluidic components;
- code for determining a logic control test sequence for at least one control layer of said schematic; and
- code for functionally simulating said schematic by using said functional model in said schematic and said logic control test sequence to show functional connectivity of the microfluidic circuit.

54. A computer program product stored in a computer readable medium for designing a microfluidic circuit schematic comprising a plurality of microfluidic component symbols associated with a plurality of microfluidic components, said computer program product comprising:
- code for placing a first component symbol of said plurality of microfluidic component symbols on a schematic, wherein said first component symbol has associated property;
- code for placing a second component symbol of said plurality of microfluidic component symbols on said schematic; and
- code for connecting said first component symbol to said second component symbol;
- wherein said associated property has at least one of physical scaling, physical property, layer assignment, and functional definition; and said physical property includes a physical dimension having depth information.

55. The method of claim 54 wherein said first component symbol comprises a first indication for a control channel and a second indication for a fluid channel.

56. A microfluidic circuit design system comprising:
- a synthesis module for synthesizing software of a design into a component level description of said design, said design comprising a plurality of microfluidic components, and said component level description comprising multilayered symbols associated with said plurality of microfluidic components;
- a design capture module, including a schematic entry tool, for placing and connecting said multilayered symbols on a schematic according to said design; and
- a functional analysis module for functionally simulating selected multilayered symbols of said schematic to show functional connectivity thereof.

57. The system of claim 56 wherein the modules comprise instructions stored in a computer-readable medium.

* * * * *